United States Patent
Okamura

(10) Patent No.: US 11,541,304 B2
(45) Date of Patent: Jan. 3, 2023

(54) RECORDING MEDIUM AND INFORMATION PROCESSING APPARATUS

(71) Applicant: Konami Digital Entertainment Co., Ltd., Tokyo (JP)

(72) Inventor: Noriaki Okamura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 17/111,979

(22) Filed: Dec. 4, 2020

(65) Prior Publication Data

US 2021/0086071 A1 Mar. 25, 2021

Related U.S. Application Data

(63) Continuation of application No. PCT/JP2019/019712, filed on May 17, 2019.

(30) Foreign Application Priority Data

Jun. 6, 2018 (JP) .............................. JP2018-108894
Oct. 5, 2018 (JP) .............................. JP2018-190441

(51) Int. Cl.
*A63F 13/2145* (2014.01)
*A63F 13/426* (2014.01)
(Continued)

(52) U.S. Cl.
CPC ........ *A63F 13/2145* (2014.09); *A63F 13/426* (2014.09); *G06F 3/016* (2013.01); *G06F 3/0488* (2013.01)

(58) Field of Classification Search
CPC ..... G06F 3/016; A63F 13/2145; A63F 13/426
See application file for complete search history.

(56) References Cited

U.S. PATENT DOCUMENTS

| | | | |
|---|---|---|---|
| 2011/0227916 A1* | 9/2011 | Kaneshige | A63F 13/10 345/419 |
| 2015/0057056 A1* | 2/2015 | Lee | A63F 13/573 463/2 |
| 2016/0367892 A1* | 12/2016 | Otani | G06F 3/016 |

FOREIGN PATENT DOCUMENTS

| | | |
|---|---|---|
| JP | 2014-044455 A | 3/2014 |
| JP | 2015-167758 A | 9/2015 |
| JP | 2017-119043 A | 7/2017 |

OTHER PUBLICATIONS

International Search Report dated Aug. 6, 2019 in Application No. PCT/JP2019/019712.

(Continued)

*Primary Examiner* — Andrea C Leggett
(74) *Attorney, Agent, or Firm* — Sughrue Mion, PLLC

(57) ABSTRACT

A computer readable recording medium storing a program that is executed by a processor. The program causes the processor to acquire touch position information on a touch panel, identify a first position based on the touch position information, if the touch position is in a first input region for receiving an input instruction in a first operation direction in a touch period during which continuous touching of the touch panel is carried out, and the touch position satisfies a first condition, identify a second position based on the touch position information, if the touch position is in a second input region for receiving an input of an instruction in a second operation direction in the touch period, and the touch position satisfies a second condition, and determine positions of the first input region and the second input region, based on the first position and the second position.

24 Claims, 36 Drawing Sheets

(51) Int. Cl.
*G06F 3/01* (2006.01)
*G06F 3/0488* (2022.01)

(56) References Cited

OTHER PUBLICATIONS

Written Opinion of the International Searching Authority dated Aug. 6, 2019 in Application No. PCT/2019/019712.
Office Action dated Jul. 5, 2022 issued by the Japanese Patent Office in Japanese Application No. 2019-193469.
Office Action dated Jul. 26, 2022 issued by the Korean Patent Office in Korean Application No. 10-2020-7036930.

* cited by examiner

RECORDING MEDIUM AND INFORMATION PROCESSING APPARATUS

CROSS REFERENCE TO RELATED APPLICATIONS

This Applications is a Continuation Application of PCT Application No. PCT/JP2019/019712, filed May 17, 2019, which is based on and claims priority from Japanese Patent Application Nos. 2018-108894, filed Jun. 6, 2018, and 2018-190441, filed Oct. 5, 2018, the entire contents of each of which are incorporated herein by reference.

BACKGROUND

Field of Invention

The present invention relates to recording mediums and relates to information processing apparatuses.

Description of Related Art

There are known devices that accept inputs of instructions from users using a touch panel (e.g., see Japanese Patent Application Laid-Open Publication No. 2014-044455).

In some cases, at a predetermined position on the touch panel, a predetermined input region is provided for receiving an input of a desired instruction. In such cases, a user can input the desired instruction by touching the predetermined input region on the touch panel.

However, in some cases, for example, when the user intends to touch the predetermined input region without viewing the touch panel, or when the user intends to touch the predetermined input region multiple times, the touch position that is touched by the user is sometimes outside of the position and is different from that in the predetermined input region. There has been a problem in that if the touch position by the user is out of the predetermined input region, the user fails to input the desired input.

SUMMARY

The present invention has been made in view of the situations described above and has an object to provide a technique that reduces the probability of an unintended input even in a case in which a touch position on the touch panel is outside of the position.

To achieve the stated object, a recording medium according to an aspect of the present invention is a non-transitory computer readable recording medium having recorded thereon a program that is executed by a processor, the program causes the processor to: acquire touch position information indicative of a touch position on a touch panel; identify, as a first position, a position based on a touch position indicated by the touch position information, if (a) the touch position is in a first input region for receiving an input of an instruction in a first operation direction, the instruction being related to a game to be input therein in a touch period during which continuous touching of the touch panel is carried out, and (b) the touch position satisfies a first condition related to the touch position; identify, as a second position, the position based on the touch position indicated by the touch position information, if (c) the touch position is in a second input region for receiving an input of an instruction in a second operation direction, the instruction being related to the game to be input therein in the touch period, and (d) the touch position satisfies a second condition related to the touch position; and determine positions of the first input region and the second input region, based on the first position and the second position.

An information processing apparatus according to an aspect of the present invention includes a memory storing instructions and; a processor that implements the instructions to: acquire touch position information indicative of a touch position on a touch panel; identify, as a first position, a position based on a touch position indicated by the touch position information, if (a) the touch position is in a first input region for receiving an input of an instruction in a first operation direction, the instruction being related to a game to be input therein in a touch period during which continuous touching of the touch panel is carried out, and (b) the touch position satisfies a first condition related to the touch position, and identify, as a second position, the position based on the touch position indicated by the touch position information, if (c) the touch position is in a second input region for receiving an input of an instruction in a second operation direction, the instruction being related to the game to be input therein in the touch period, and (d) the touch position satisfies a second condition related to the touch position; and determine positions of the first input region and the second input region, based on the first position and the second position.

To achieve the stated object, a recording medium according to another aspect of the present invention is a non-transitory computer readable recording medium having recorded thereon a program that is executed by a processor, the program causes the processor to: acquire touch position information indicative of a touch position on a touch panel; determine a first characteristic position, based on a touch position indicated by the touch position information, if the touch position is in a first region for receiving an input of an instruction in a first operation direction, the instruction being related to a game to be input therein, in a touch period during which continuous touching of the touch panel is carried out; determine a second characteristic position, based on the touch position, if the touch position is in a second region for receiving an input of an instruction in a second operation direction, the instruction being related to the game to be input therein; and determine, based on the first characteristic position and the second characteristic position, a position of a third region, the third region being arranged between the first region and the second region, and being for not receiving an instruction for an operation direction related to the game.

An information processing apparatus according to another aspect of the present invention includes a memory storing instructions and; a processor that implements the instructions to: acquire touch position information indicative of a touch position on a touch panel; determine a first characteristic position, based on a touch position indicated by the touch position information, if the touch position is in a first region for receiving an input of an instruction in a first operation direction, the instruction being related to a game to be input therein, in a touch period during which continuous touching of the touch panel is carried out; determine a second characteristic position, based on the touch position, if the touch position is in a second region for receiving an input of an instruction in a second operation direction, the instruction being related to the game to be input therein; and determine, based on the first characteristic position and the second characteristic position, a position of a third region, the third region being arranged between the first region and the second region, and being for not receiving an instruction for an operation direction related to the game.

MODES FOR CARRYING OUT THE INVENTION

Hereinafter, modes for carrying out the present invention will be described with reference to the drawings. In each diagram, the dimensions and scale of each element are appropriately different from actual ones. Embodiments described below are preferable specific examples of the present invention. Accordingly, technically preferable various limitations are applied. However, the scope of the present invention is not limited to these modes unless there is specific description for limiting the present invention.

A. First Embodiment

Hereinafter, a first embodiment of the present invention will be described.

A-1. Overview of Terminal Apparatus

Hereinafter, referring to FIGS. 1 to 4, an example of an overview of a terminal apparatus 10 according to this embodiment will be described.

FIGS. 1 to 4 are diagrams for illustrating examples of appearances of the terminal apparatus 10. The terminal apparatus 10 is, for example, a portable information processing apparatus, such as a smartphone, a tablet terminal, or a portable game apparatus. The terminal apparatus 10 may be, for example, a stationary information processing apparatus, such as a game apparatus for business purposes, or a desktop personal computer.

As shown in FIGS. 1 to 4, the terminal apparatus 10 includes a touch panel 1002. The touch panel 1002 serves as a display 12 that displays various images (see FIG. 5). The touch panel 1002 serves as an inputter 13 that receives an input of an instruction from a user of the terminal apparatus 10 (see FIG. 5). Specifically, when an object is in contact with the touch panel 1002, this touch panel 1002 detects a touch position P that is a contact position of the object on the touch panel 1002, and periodically outputs touch position information indicative of the detected touch position P. The touch panel 1002 may calculate, as the touch position P, an average of contact positions detected in a predetermined unit time period (a time period shorter than a period of outputting the touch position information), and may periodically output the touch position information indicative of the calculated touch position P. Hereinafter, an example case is assumed in which the object to be contact with the touch panel 1002 is a finger FG of the user.

In this embodiment, for the sake of illustration, as shown in FIGS. 1 to 4, a touch panel coordinate system ΣS that is a coordinate system fixed onto the touch panel 1002 is introduced. Specifically, for example, the touch panel coordinate system ΣS has an origin Os fixed to a predetermined position on the touch panel 1002, and is a two-axis orthogonal coordinate system that has an Xs axis and a Ys axis orthogonal to each other.

Figure 1:
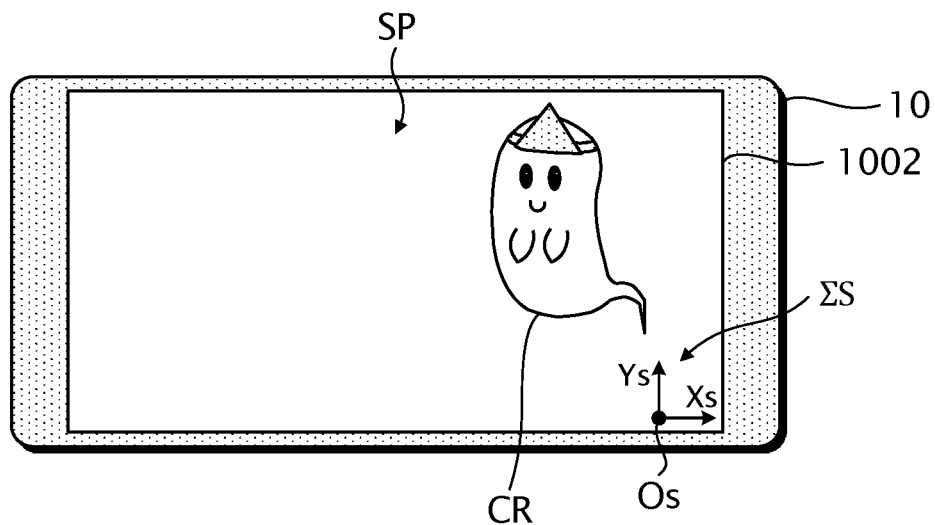
FIG. 1 illustrates an example of an appearance of a terminal apparatus 10 according to a first embodiment of the present invention.

In this embodiment, the terminal apparatus 10 executes a program according to a predetermined game (an example of a "program"), thereby displaying images related to the predetermined game on the touch panel 1002. Specifically, when the terminal apparatus 10 executes the predetermined game, the terminal apparatus 10 displays, on the touch panel 1002, for example, a virtual space SP related to the predetermined game, and a character CR that is present in the virtual space SP and is related to the predetermined game, as shown in FIG. 1.

Figure 2:
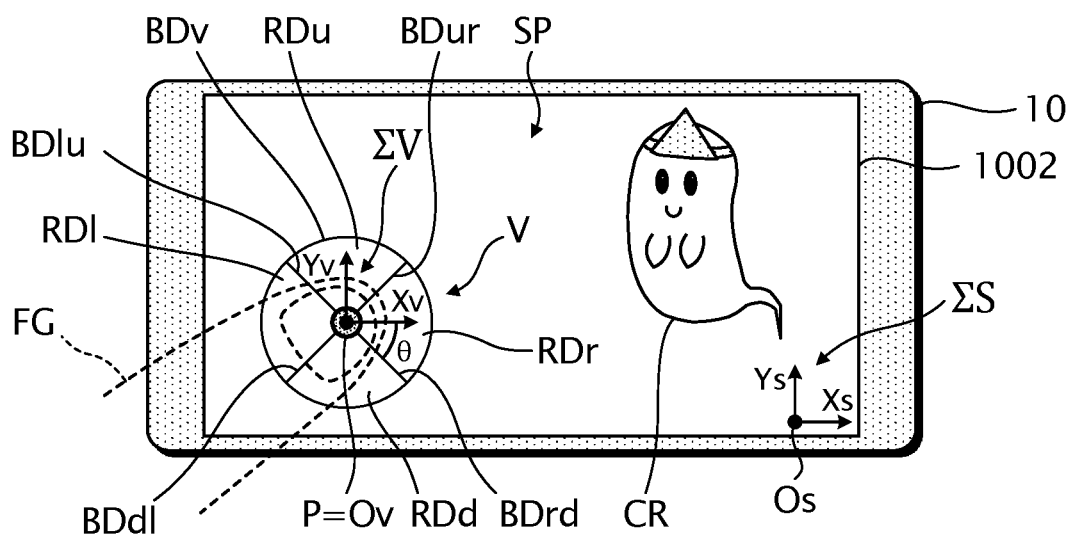
FIG. 2 illustrates an example of the appearance of the terminal apparatus 10.

In this embodiment, as shown in FIG. 2, when the finger FG of the user is changed from a state of being not in contact with the touch panel 1002 to a state of being in contact therewith, the terminal apparatus 10 sets the touch position P of the finger FG on the touch panel 1002 as a reference position Ov, and sets an operation region V with respect to a position based on the reference position Ov. The operation region V is what is called a virtual pad, and is a region for accepting an input related to an operation on the character CR by the user. In this embodiment, as shown in FIG. 2, an example case is assumed in which the operation region V is a region in a circle BDv that has a radius r and is centered at the reference position Ov. Furthermore, in this embodiment, an example case is assumed in which the operation region V is displayed on the touch panel 1002 in a manner viewable by the user. The operation region V may be a virtual region provided on the touch panel 1002 so as not to be viewed by the user. The operation region V is not limited to a circle. Hereinafter, change from the state in which the finger FG of the user is not in contact with the touch panel 1002 to the state of being in contact therewith is also referred to as "touch-in".

In this embodiment, the terminal apparatus 10 maintains the state in which the operation region V is set on the touch panel 1002 in the touch period that is a period during which the finger FG of the user is kept in contact with the touch panel 1002. When the finger FG of the user is changed from the state of being in contact with the touch panel 1002 to the state of not being in contact therewith, the terminal apparatus 10 removes the operation region V set on the touch panel 1002.

As shown in FIG. 2, in this embodiment, an example case is assumed in which the operation region V includes four input regions RD (RDr, RDl, RDu and RDd). Furthermore, in this embodiment, an example case is assumed in which each input region RD is a region for receiving an instruction in a direction in which a face of the character CR is oriented in the touch panel coordinate system ΣS. Each input region RD may be a region for receiving an instruction in a direction in which the face of the character CR is oriented in the virtual space SP. In this embodiment, the direction in which the face of the character CR is oriented is an example of "an operation direction related to a game".

Hereinafter, for the sake of illustration, an operation region coordinate system ΣV that is a coordinate system with the reference position Ov being adopted as the origin is introduced. Specifically, the operation region coordinate system ΣV is a two-axis orthogonal coordinate system that has the reference position Ov as the origin, and has an Xv axis and a Yv axis that are orthogonal to each other. In this embodiment, an example case is assumed in which the Xv axis and the Xs axis are in parallel with each other and the Yv axis and the Ys axis are in parallel with each other. Alternatively, the Xv axis may have a direction different from that of the Xs axis, and the Yv axis may have a direction different from that of the Ys axis. A part of the Xv axis being on the +Xv side from the reference position Ov is an example of a "first reference line". A part of the Xv axis being on the −Xv side from the reference position Ov is an example of a "second reference line". That is, the part of the Xv axis having higher coordinate values on the Xv axis than the reference position Ov is an example of the "first reference line". The part of the Xv axis having lower coordinate values on the Xv axis than the reference position Ov is an example of the "second reference line".

As described above, in this Description, there is a case in which one of two positions on the Xv axis is greater than the other one on the Xv axis. In this case, the relationship between the two positions is sometimes represented using "+Xv side", for example, "one position between two positions is positioned on the +Xv side with respect to the other position between the two positions". In contrast, there is a case in which one of two positions on the Xv axis is less than the other one on the Xv axis. In this case, the relationship between the two positions is sometimes represented using "−Xv side", for example, "one position between two positions is positioned on the −Xv side with respect to the other position between the two positions". Likewise, the relationship between two positions is sometimes represented as the "+Yv side" or the "−Yv side".

In this embodiment, for example, as shown in FIG. 2, the terminal apparatus 10 sets the input region RDr as a region that is at a position in the +Xv direction from the reference position Ov (an example of the "first direction"). Furthermore, the terminal apparatus 10 sets the input region RDl as a region that is at a position in the −Xv direction from the reference position Ov (an example of the "second direction"). The terminal apparatus 10 sets the input region RDu as a region that is at a position in the +Yv direction from the reference position Ov (an example of a "third direction"). Furthermore, the terminal apparatus 10 sets the input region RDd as a region that is at a position in the −Yv direction from the reference position Ov (another example of the "third direction"). More specifically, in this embodiment, the terminal apparatus 10 sets, as the input region RDr, a circular sector region enclosed by the following: (i) a line segment BDrd originating from the reference position Ov and extending in a direction inclined from the +Xv direction on the −Yv side by an angle θ (an example of a "first angle"); (ii) a line segment BDur originating from the reference position Ov and extending in a direction inclined from the +Xv direction on the +Yv side by the angle θ; and (iii) a circle BDv. The terminal apparatus 10 sets, as the input region RDl, a circular sector region enclosed by the following: (i) a line segment BDdl originating from the reference position Ov and extending in a direction inclined from the −Xv direction on the −Yv side by an angle θ (an example of "second angle"); (ii) a line segment BDlu originating from the reference position Ov and extending in a direction inclined from the −Xv direction on the +Yv side; and (iii) a circle BDv. The terminal apparatus 10 sets, as the input region RDu, a circular sector region enclosed by the line segment BDur, the line segment BDlu and the circle BDv. The terminal apparatus 10 sets, as the input region RDd, a circular sector region enclosed by the line segment BDrd, the line segment BDdl and the circle BDv. In this embodiment, an example case is assumed in which the angle θ is 45 degrees. The angle θ may be greater than 0 degrees and less than 90 degrees. In this embodiment, the first angle and the second angle are the same angle. Alternatively, the first angle and the second angle may be different angles.

Figure 3:
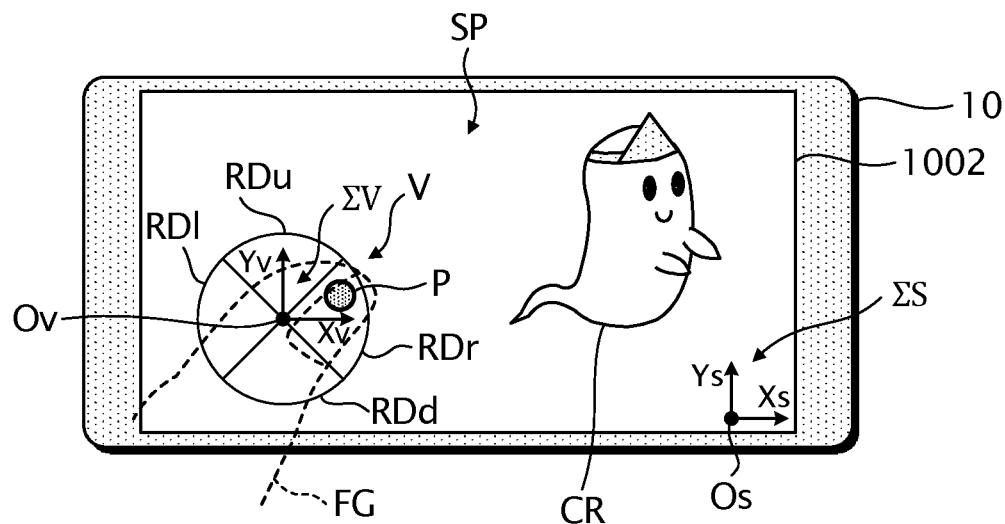
FIG. 3 illustrates an example of the appearance of the terminal apparatus 10.
Figure 4:
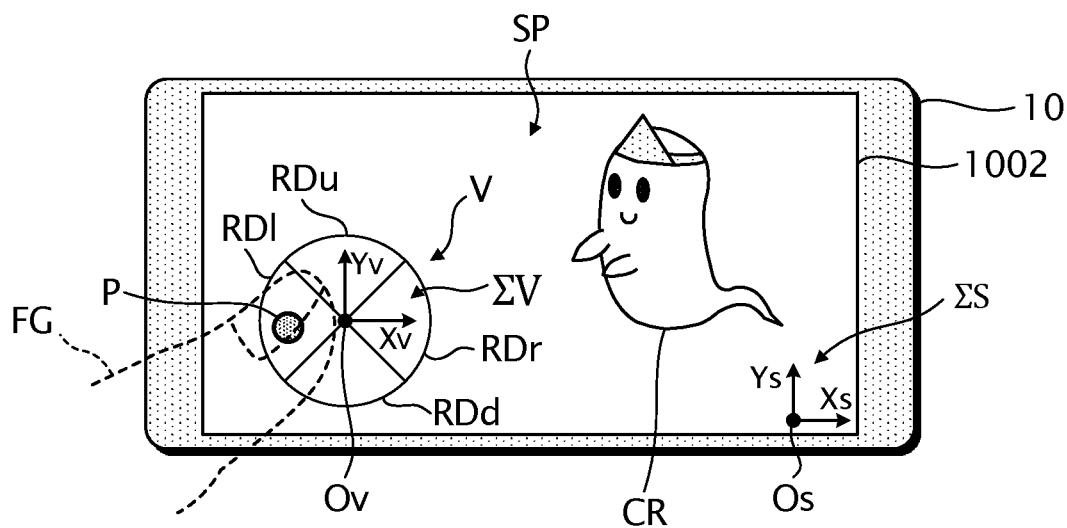
FIG. 4 illustrates an example of the appearance of the terminal apparatus 10.

After touch-in, the user inclines the finger FG while maintaining the state in which the finger FG is in contact with the touch panel 1002, thereby allowing touching any region among the input regions RDr, RDl, RDu and RDd in the operation region V, for example. When the touch position P of the finger FG is in the input region RD, the terminal apparatus 10 receives an instruction for orienting the face of the character CR in a direction. This direction is in the touch panel coordinate system ΣS and is a direction corresponding to the input region RD where the touch position P is present. Specifically, in this embodiment, as shown in FIG. 3, when the touch position P is in the input region RDr (an example of a "first input region"), the terminal apparatus 10 receives an instruction for causing the direction in which the face of the character CR is oriented in the touch panel coordinate system ΣS to be in the +Xs direction (an example of a "first operation direction"). In this embodiment, as shown in FIG. 4, when the touch position P is in the input region RDl (an example of a "second input region"), the terminal apparatus 10 receives an instruction for causing the direction in which the face of the character CR is oriented in the touch panel coordinate system ΣS to be in the −Xs direction (an example of a "second operation direction"). In this embodiment, when the touch position P is in the input region RDu (an example of a "third input region"), the terminal apparatus 10 receives an instruction for causing the direction in which the face of the character CR is oriented in the touch panel coordinate system ΣS to be in the +Ys direction (an example of a "third operation direction"). In this embodiment, when the touch position P is in the input region RDd (another example of the "third input region"), the terminal apparatus 10 receives an instruction for causing the direction in which the face of the character CR is oriented in the touch panel coordinate system ΣS to be in the −Ys direction (another example of the "third operation direction"). Hereinafter, a period during which a state of the touch position P being in the input region RDr is continued is also called an "input region touch period TRr". Similarly, a period during which a state of the touch position P being in the input region RDl is continued is also called an "input region touch period TRl". Furthermore, a period during which a state of the touch position P being in the input region RDu is continued is also called an "input region touch period TRu". A period during which a state of the touch position P being in the input region RDd is continued is also called an "input region touch period TRd". The input region touch periods TRr, TRl, TRu and TRd are also called an "input region touch period TR" in cases of not being specifically distinguished from each other.

Although described in detail later, the terminal apparatus 10 according to this embodiment identifies a characteristic position CPr (an example of a "first position") on the basis of the touch position P present in the input region RDr, and identifies a characteristic position CPl (an example of a "second position") on the basis of the touch position P present in the input region RDl. The terminal apparatus 10 can correct the position of the operation region V in the touch panel coordinate system ΣS on the basis of the characteristic position CPr and the characteristic position CPl. That is, the terminal apparatus 10 corrects the reference position Ov in the touch panel coordinate system ΣS on the basis of the characteristic position CPr and the characteristic position CPl, thereby correcting the position in the operation region coordinate system ΣV viewed from the touch panel coordinate system ΣS. The characteristic positions CPr and CPl are also called a characteristic position CP in cases of not being specifically distinguished from each other.

A-2. Configuration of Terminal Apparatus

Hereinafter, referring to FIGS. 5 and 6, an example of the configuration of the terminal apparatus 10 will be described.

Figure 5:
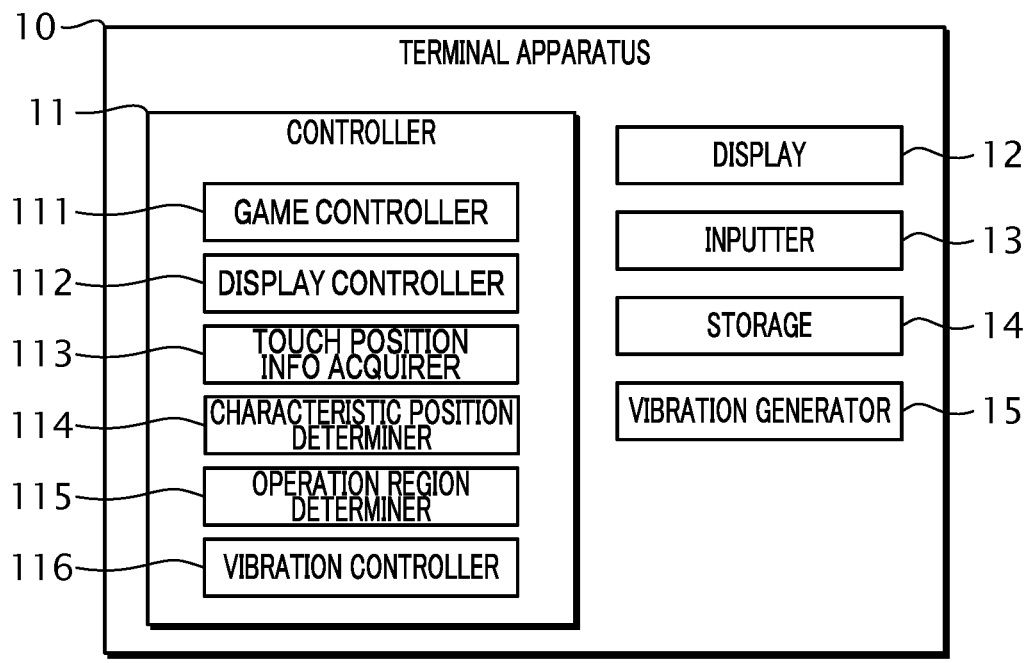
FIG. 5 is a block diagram showing an example of a configuration of the terminal apparatus 10.

FIG. 5 is a functional block diagram showing the example of the configuration of the terminal apparatus 10.

As shown in FIG. 5, the terminal apparatus 10 includes a controller 11 that controls each element of the terminal apparatus 10, a display 12 for displaying an image, an inputter 13 that receives an input of an instruction by the user of the terminal apparatus 10, a storage 14 that stores various pieces of information, and a vibration generator 15 that vibrates the terminal apparatus 10 including the touch panel 1002.

The storage 14 stores various pieces of information that include: a program related to a predetermined game; touch position history information indicative of a history of the touch position P indicated by the touch position information periodically output from the touch panel 1002, over the touch period; characteristic position information indicative of the characteristic position CP; and operation region information indicative of the position of the input region RD in the touch panel coordinate system ΣS.

The controller 11 includes a game controller 111, a display controller 112, a touch position information acquirer 113, a characteristic position determiner 114, an operation region determiner 115, and a vibration controller 116.

The game controller 111 controls the progress of the predetermined game. Specifically, when the touch position P is in the input region RD, the game controller 111 sets the direction in which the face of the character CR is oriented in the touch panel coordinate system ΣS, to a direction corresponding to the input region RD where the touch position P is present. The display controller 112 controls the display 12 such that the display 12 displays the virtual space SP, the character CR, and the operation region V. The touch position information acquirer 113 (an example of an "acquirer") acquires the touch position information periodically output from the inputter 13. The characteristic position determiner 114 (an example of a "identifier") identifies the characteristic position CP on the basis of the touch position P present in the input region RD in the input region touch period TR. The operation region determiner 115 (an example of a "determiner") determines the position of the operation region V on the touch panel 1002 on the basis of the characteristic position CPr and the characteristic position CPl. When the touch position P is changed from a state of being absent in the input region RD to a state of being present in the input region RD, the vibration controller 116 controls the vibration generator 15 such that the vibration generator 15 vibrates the terminal apparatus 10. Alternatively, the vibration controller 116 may control the vibration generator 15 such that the vibration generator 15 vibrates the terminal apparatus 10 when the touch position P is changed from the state of being present in the input region RD to the state of being absent in the input region RD. The vibration controller 116 may control the vibration generator 15 such that the vibration generator 15 vibrates the terminal apparatus 10 when touch-in occurs. It is to be noted that the configuration of the terminal apparatus 10 is not limited to the example shown in FIG. 5. For example, the vibration generator 15 may be omitted from the terminal apparatus 10. In this case, the vibration controller 116 may be omitted from the controller 11.

Figure 6:
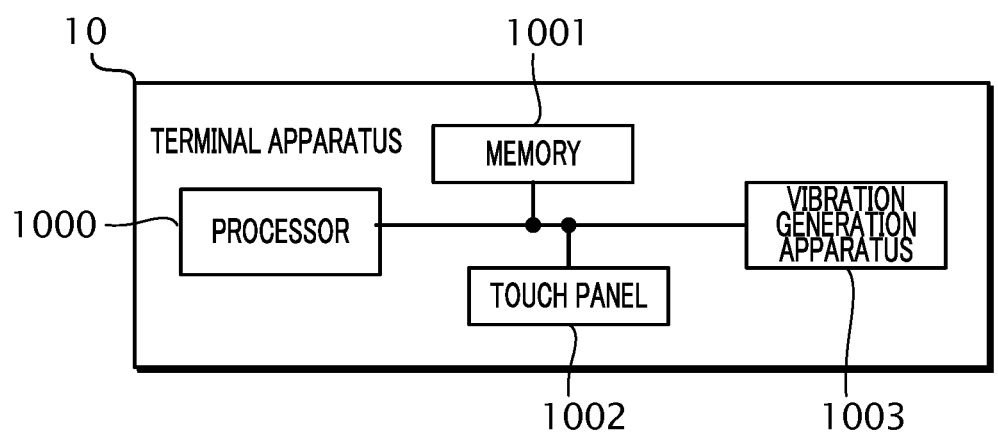
FIG. 6 is a block diagram showing an example of a hardware configuration of the terminal apparatus 10.

FIG. 6 is a hardware configuration diagram showing an example of the hardware configuration of the terminal apparatus 10.

As shown in FIG. 6, the terminal apparatus 10 includes a processor 1000 (an example of an "information processing apparatus") that controls each element of the terminal apparatus 10, a memory 1001 that stores various pieces of information, the touch panel 1002, and a vibration generation apparatus 1003.

The memory 1001 is a non-transitory recording medium that includes a volatile memory, such as RAM (Random Access Memory) serving as an working space for the processor 1000, and a nonvolatile memory, such as EEPROM (Electrically Erasable Programmable Read-Only Memory) storing various pieces of information such as the program related to the predetermined game, for example. The memory 1001 serves as the storage 14. In this embodiment, the memory 1001 is exemplified as the "recording medium" that records the program related to the predetermined game. However, the present invention is not limited to such an aspect. The "recording medium" that records the program related to the predetermined game may be a storage apparatus provided for an external apparatus that is present outside of the terminal apparatus 10. For example, the "recording medium" that records the program related to the predetermined game may be a storage apparatus that is present outside of the terminal apparatus 10, is provided in a distribution server that distributes the program related to the predetermined game, and stores the program related to the predetermined game. The processor 1000 is a CPU (Central Processing Unit), for example. The processor 1000 executes the program related to the predetermined game stored in the memory 1001, and operates according to the program, thereby serving as the controller 11. As described above, the touch panel 1002 serves as the display 12 and the inputter 13.

The vibration generation apparatus 1003 is a vibration motor that generates vibrations, for example. The vibration generation serves as the vibration generator 15.

The processor 1000 includes, in addition to the CPU or instead of the CPU, hardware, such as a GPU (Graphics Processing Unit), a DSP (Digital Signal Processor) or an FPGA (Field Programmable Gate Array). In this case, a part of, or the entirety of, controller 11 achieved by the processor 1000 may be achieved by hardware, such as a DSP. Alternatively, the processor 1000 may include some or all of one or more CPUs and one or more hardware elements. For example, in a case in which the processor 1000 includes CPUs, the function of a part of, or the entirety of, controller 11 may be achieved by cooperation of these CPUs according to the program related to the predetermined game.

A-3. Relationship Between Touch Position and Operation Region

Hereinafter, referring to FIGS. 7 to 10, an example of the relationship between the touch position P of finger FG and the operation region V on the touch panel 1002 will be described.

FIGS. 7 to 10 are diagrams for illustrating an example of change of the relationship between (i) the touch position P of finger FG on the touch panel 1002 and (ii) the operation region V set on the touch panel 1002, in a period from a time t1 to a time t10 (hereinafter, also called "touch position changing example"). Hereinafter, the touch position P at a time t is also called a touch position P[t], and the operation region V at the time t is also called an operation region V[t]. The operation region coordinate system ΣV at the time t is also called an operation region coordinate system ΣV[t], and the reference position Ov at the time t is also called a reference position Ov[t].

Figure 7:
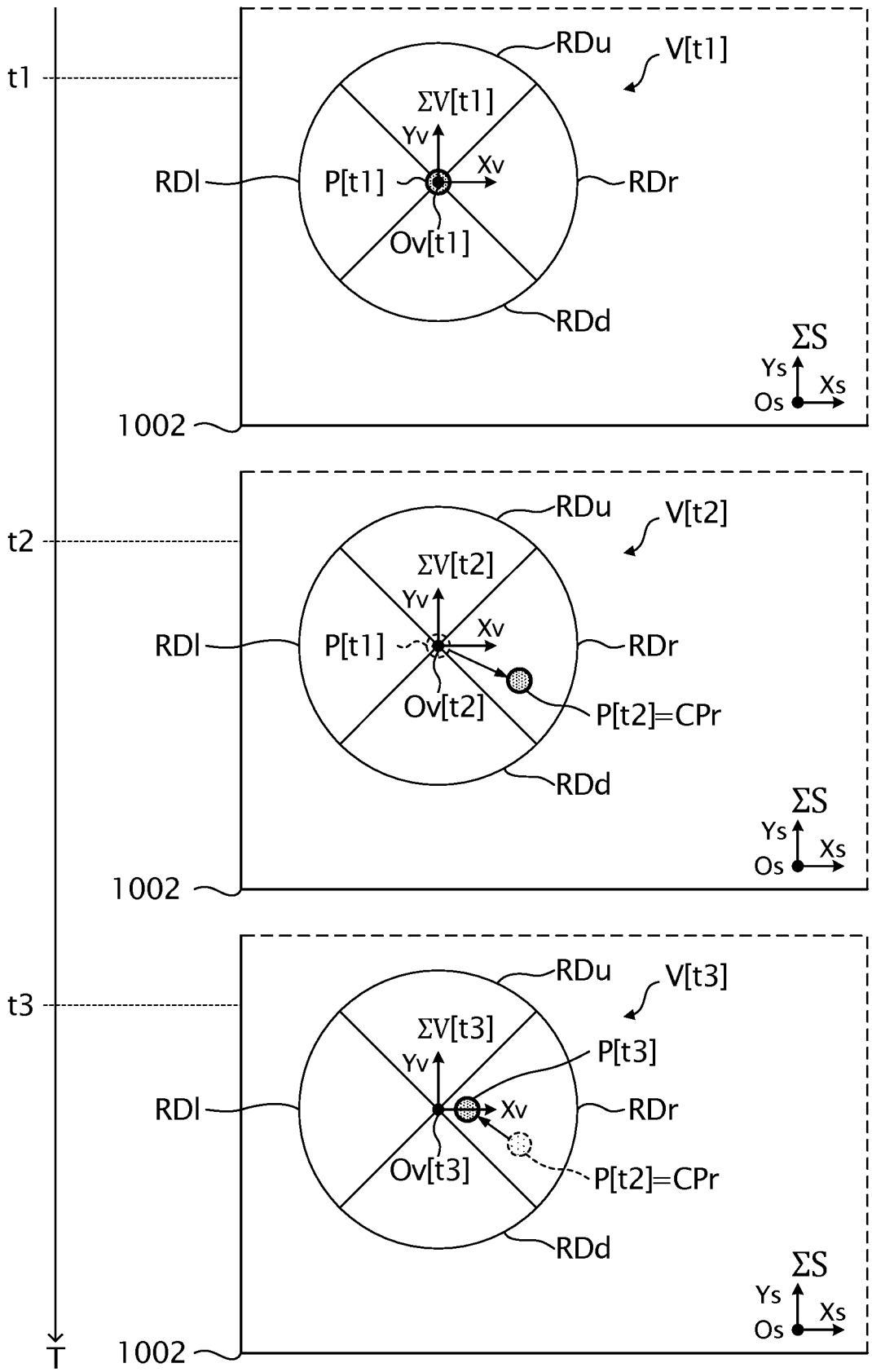
FIG. 7 illustrates a touch position changing example.

As shown in FIG. 7, the touch position changing example assumes a case in which finger FG comes into touch-in at a touch position P[t1] at the time t1. That is, in the touch position changing example, the touch period is started from the time t1. In this case, the operation region determiner 115 sets an operation region coordinate system ΣV[t1] with the touch position P[t1] being adopted as a reference position Ov[t1]. Then, the operation region determiner 115 sets an operation region V[t1] including the input regions RDr, RDl, RDu and RDd at a position corresponding to the reference position Ov[t1]. When the operation region V is set, the operation region determiner 115 stores the position of the input region RD included in the operation region V, as the operation region information, in the storage 14.

As shown in FIG. 7, the touch position changing example assumes a case in which the finger FG moves the input region RDr from the touch position P[t1] to a touch position P[t2] while being in contact with the touch panel 1002, from the time t1 to a time t2. The touch position changing example assumes a case in which the touch position P[t2] at the time t2 is in the input region RDr. That is, in the touch position changing example, at a certain time between the time t1 and the time t2, the touch position P enters the input region RDr. In other words, in the touch position changing example, an input region touch period TRr (an example of a "first touch period") is started from the time between the time t1 and the time t2.

In this embodiment, if the following condition (an example of a "first condition") is satisfied, the characteristic position determiner 114 identifies, as the characteristic position CPr, a touch position P corresponding to a certain time in the input region touch period TRr. The condition indicates that the touch position P indicative of the touch position information acquired by the touch position information acquirer 113 at the certain time is positioned farthest on the +Xv side, among one or more touch positions P, where the touch positions P are indicated by one or more pieces of touch position information acquired by the touch position information acquirer 113 in a period from the time of the start of the input region touch period TRr to the certain time. In other words, in this embodiment, the condition indicates that the touch position P is a position farthest in the +Xv direction from the reference position Ov in the input region touch period TRr. If the condition is satisfied, the characteristic position determiner 114 identifies the touch position P as the characteristic position CPr. The touch position changing example assumes the case in which the touch position P[t2] is the position farthest in the +Xv direction from the reference position Ov among the touch positions P in the period from the time t1 to the time t2. Accordingly, in the touch position changing example, the characteristic position determiner 114 identifies the touch position P[t2] as the characteristic position CPr at the time t2.

As described above, the operation region determiner 115 corrects the positions of the operation region coordinate system ΣV, the reference position Ov and the operation region V, on the basis of the characteristic position CPr and the characteristic position CPl. However, as shown in FIG. 7, in the touch position changing example, at the time t2, the characteristic position CPr is identified but the characteristic position CPl is not identified. Accordingly, in the touch position changing example, the operation region determiner 115 sets the reference position Ov[t2] and the operation region coordinate system V[t2] such that the operation region V[t2] and the operation region V[t1] are at the same position.

As shown in FIG. 7, the touch position changing example assumes a case in which finger FG moves the input region RDr from the touch position P[t2] to a touch position P[t3] while being in contact with the touch panel 1002, from the time t2 to a time t3. The touch position changing example assumes a case in which the touch position P[t3] at the time t3 is positioned farther on the −Xv side than the touch position P[t2] in the input region RDr. That is, in the touch position changing example, the touch position P[t2] is positioned farther on the +Xv side than the touch position P[t3]. Accordingly, in the touch position changing example, the characteristic position determiner 114 maintains the state in which the touch position P[t2] is identified as the characteristic position CPr, also at the time t3. It is to be noted that in the touch position changing example, also at the time t3, the characteristic position CPl is not identified. Accordingly, in the touch position changing example, the operation region determiner 115 sets the reference position Ov[t3] and the operation region coordinate system V[t3] such that the operation region V[t3] and the operation region V[t2] are at the same position.

Figure 8:
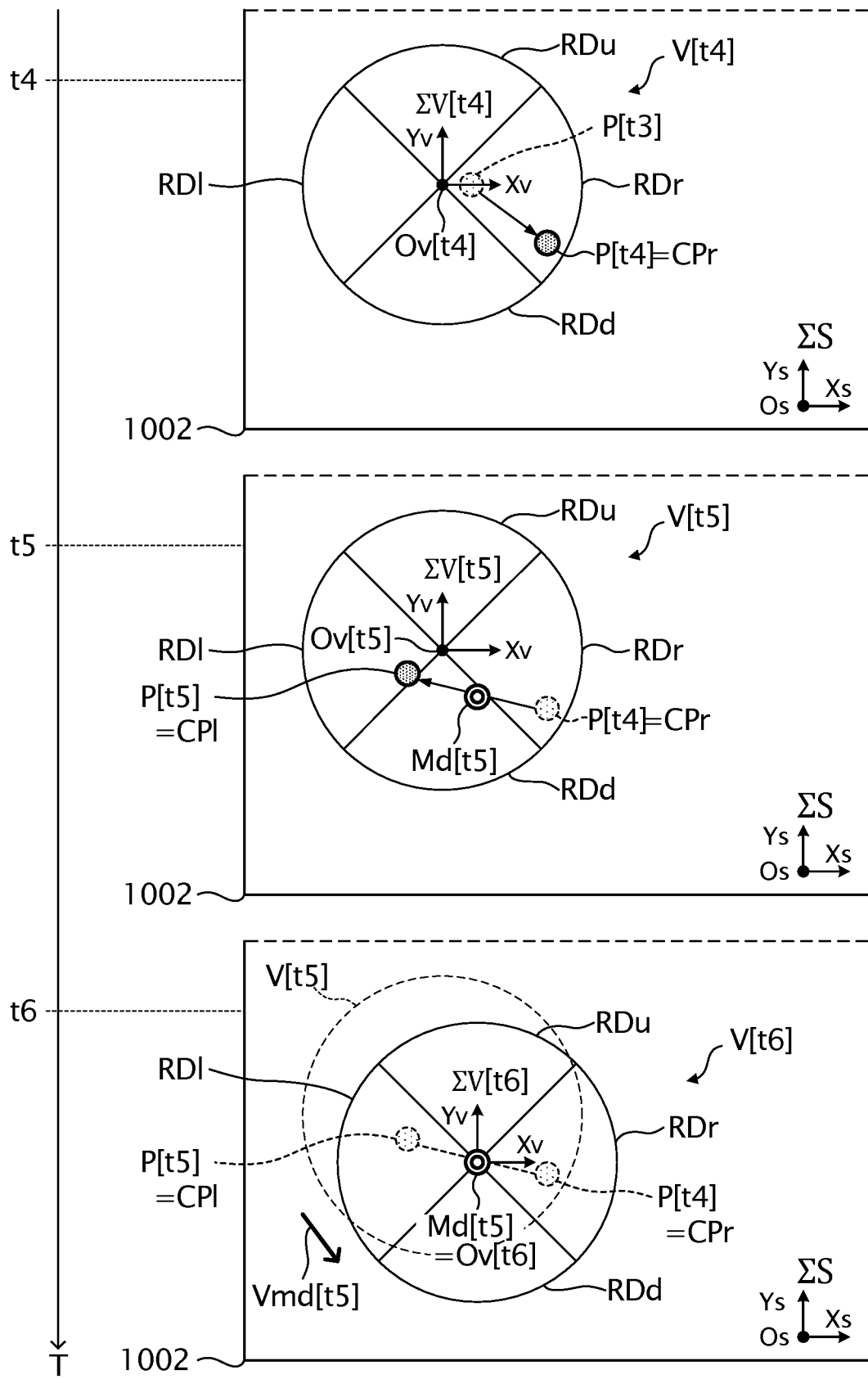
FIG. 8 illustrates a touch position changing example.

As shown in FIG. 8, the touch position changing example assumes a case in which finger FG moves the input region RDr from the touch position P[t3] to a touch position P[t4] while being in contact with the touch panel 1002, from the time t3 to a time t4. The touch position changing example assumes a case in which the touch position P[t4] at the time t4 is positioned farther on the +Xv side than the touch position P[t2] and the touch position P[t3] in the input region RDr. Accordingly, in the touch position changing example, the characteristic position determiner 114 identifies the touch position P[t4] as the characteristic position CPr at the time t4. In other words, in the touch position changing example, the characteristic position determiner 114 updates the characteristic position CPr from the touch position P[t2] to the touch position P[t4] at the time t4. It is to be noted that in the touch position changing example, also at the time t4, the characteristic position CPl is not identified. Accordingly, in the touch position changing example, the operation region determiner 115 sets the reference position Ov[t4] and the operation region coordinate system ΣV [t4] such that the operation region V[t4] and the operation region V[t3] are at the same position.

As shown in FIG. 8, the touch position changing example assumes a case in which finger FG moves from the touch position P[t4] to a touch position P[t5] in the input region RDr and the input region RDd while being in contact with the touch panel 1002, from the time t4 to a time t5. The touch position changing example assumes a case in which the touch position P enters the input region RDl at the time t5. That is, in the touch position changing example, the input region touch period TRr finishes at a time between the time t4 to the time t5, and an input region touch period TRl (an example of a "second touch period") is started at the time t5.

In this embodiment, if the following condition (an example of the "second condition") is satisfied, the characteristic position determiner 114 identifies, as the characteristic position CPl, a touch position P corresponding to a certain time in the input region touch period TRl. The condition indicates that the touch position P indicative of the touch position information acquired by the touch position information acquirer 113 at the certain time in the input region touch period TRl is positioned farthest on the −Xv side, among one or more touch positions P, where the touch positions P are indicated by one or more pieces of touch position information acquired by the touch position information acquirer 113 in a period from the time of the start of the input region touch period TRl to the certain time. In other words, in this embodiment, the condition indicates that the touch position P is a position farthest in the −Xv direction from the reference position Ov in the input region touch period TRl. If the condition is satisfied, the characteristic position determiner 114 identifies the touch position P as the characteristic position CPl. Hereinafter, the first condition and the second condition are sometimes collectively called a characteristic position identification condition. The touch position changing example assumes a case in which the input region touch period TRl is started at the time t5. That is, in the touch position changing example, the touch position P[t5] is at a position farthest in the −Xv direction from the reference position Ov among the touch positions P in a period from the start of the input region touch period TRl to the time t5. Accordingly, in the touch position changing example, the characteristic position determiner 114 identifies the touch position P[t5] as the characteristic position CPl at the time t5.

In some cases, after the touch position P moves from one input region RD to the outside of the one input region RD, the touch position P reenters is the one input region RD. For example, in some cases, after completion of one input region touch period TRr, during which the touch position P is in the input region RDr, another input region touch period TRr, during which the touch position P is in the input region RDr, is started again. In this case, during a period from completion of the one input region touch period TRr to start of the other input region touch period TRr, the characteristic position determiner 114 maintains an identification result of the characteristic position CPr at the time of completion of the one input region touch period TRr. In this case, when the other input region touch period TRr is started, the characteristic position determiner 114 discards the identification result of the characteristic position CPr at the time of completion of the one input region touch period TRr, and identifies a new characteristic position CPr in the other input region touch period TRr. More specifically, when the characteristic position determiner 114 identifies the characteristic position CPr in the one input region touch period TRr, this determiner stores the identified characteristic position CPr, as characteristic position information, in the storage 14. When the characteristic position determiner 114 identifies the characteristic position CPr in the other input region touch period TRr, this determiner updates the characteristic position information with the identified characteristic position CPr. A process of updating the characteristic position CPl when the touch position P reenters the input region RDl is similar to the process of updating the characteristic position CPr when the touch position P reenters the input region RDr.

The touch position changing example assumes a case in which the characteristic position determiner 114 identifies the touch position P[t4] at the time t4, as the characteristic position CPr, at the time of completion of the input region touch period TRr. Accordingly, as shown in FIG. 8, in the touch position changing example, the characteristic position determiner 114 maintains the state in which the touch position P[t4] is identified as the characteristic position CPr, also at the time t5 after completion of the input region touch period TRr.

In this embodiment, the operation region determiner 115 corrects the position of the operation region V on the basis of the characteristic position CPr and the characteristic position CPl, as described above. Specifically, in this embodiment, first, the operation region determiner 115 defines a corrected position Md on the basis of the characteristic position CPr and the characteristic position CPl as described above. Next, the operation region determiner 115 defines an operation region motion vector Vmd having an initial point that is the reference position Ov and a terminal point that is the corrected position Md. The operation region determiner 115 moves the reference position Ov, the operation region coordinate system ΣV and the operation region V, by a movement amount corresponding to the operation region motion vector Vmd. Accordingly, the operation region determiner 115 can correct the positions of the reference position Ov in the touch panel coordinate system ΣS, the operation region coordinate system ΣV, and the operation region V such that the reference position Ov coincides with the corrected position Md. When the operation region determiner 115 corrects the position of the operation region V, this determiner updates the operation region information stored in the storage 14, with the position of the input region RD included in the operation region V. Hereinafter, the operation region motion vector Vmd defined at the time t is also called an operation region motion vector Vmd[t]. This embodiment exemplifies a case in which the operation region determiner 115 moves the reference position Ov by the movement amount corresponding to the operation region motion vector Vmd to thereby correct the reference position Ov. However, the present invention is not limited to such an aspect. The operation region determiner 115 may simply set, as the reference position Ov, the corrected position Md defined based on the characteristic position CPr and the characteristic position CPl. In other words, for example, if the operation region determiner 115 determines the corrected position Md at a certain time, this determiner may determine the reference position Ov at another time after the certain time, on the basis of the determined corrected position Md, without consideration of the reference position Ov at the certain time.

In this embodiment, for example, the operation region determiner 115 defines, as the corrected position Md, the midpoint between the characteristic position CPr and the characteristic position CPl. Alternatively, for example, the operation region determiner 115 may define a position between the characteristic position CPr and the characteristic position CPl as the corrected position Md, or may define a position having the same distance from the characteristic position CPr and the characteristic position CPl as the corrected position Md. In short, the operation region determiner 115 may define, as the corrected position Md, a position defined by the characteristic position CPr and the characteristic position CPl. For example, the operation region determiner 115 may define, as the corrected position Md, a position in a reference region where the distance between this position and the line segment connecting the characteristic position CPr and the characteristic position CPl is equal to or less than a predetermined reference distance.

For example, provided that (i) a characteristic position CP that is identified first between the characteristic position CPr and the characteristic position CPl is called a "former-identified characteristic position", and (ii) a characteristic position CP that is identified later between the characteristic position CPr and the characteristic position CPl is called a "latter-identified characteristic position", the operation region determiner 115 may define, as the corrected position Md, a position closer to the latter-identified characteristic position than the former-identified characteristic position. In this case, the corrected position Md is provided adjacent to the latest touch position P of finger FG. Accordingly, in comparison with a case in which the corrected position Md is set at a position closer to the former-identified characteristic position than the latter-identified characteristic position, the movement amount of the finger FG can be small, the finger being in a situation of changing the touch position P from an input region RD corresponding to the latter-identified characteristic position to an input region RD corresponding to the former-identified characteristic position. That is, in this example, in comparison with the case in which the corrected position Md is set at a position closer to the former-identified characteristic position than the latter-identified characteristic position, it is possible to maintain the operability of an operation of moving the finger FG such that the touch position P reciprocates between the input region RDr and the input region RDl.

For example, the operation region determiner 115 may define, as the corrected position Md, a position closer to the latter-identified characteristic position than the former-identified characteristic position in the reference region. In this example, the operability of an operation of moving finger FG such that the touch position P can reciprocate between the input region RDr and the input region RDl can be favorably maintained.

For example, the operation region determiner 115 may define the following position as the corrected position Md. The position is on a line segment connecting the characteristic position CPr and the characteristic position CPl or is in the reference region and is closer to the latter-identified characteristic position than the former-identified characteristic position. Then, the position has an interval with the latter-identified characteristic position that is equal to or greater than a predetermined reference interval. If the interval between the corrected position Md and the latter-identified characteristic position is less than the predetermined reference interval, the interval is also less than the predetermined reference interval, where the interval is between the latest touch position P present in the input region RD corresponding to the latter-identified characteristic position and the input region RD corresponding to the former-identified characteristic position. If the interval between the corrected position Md and the latter-identified characteristic position is less than the predetermined reference interval, there is an increase in the probability of the occurrence of an unintended operation input in which the user accidentally touches, with finger FG, the input region RD corresponding to the former-identified characteristic position even though the user intended to touch the input region RD corresponding to the latter-identified characteristic position with finger FG. In contrast, in this example, the corrected position Md is provided at a position away from the latter-identified characteristic position by the predetermined reference interval or more. Consequently, the interval can be configured to be equal to or larger than the predetermined reference interval, where the interval is between (i) the latest touch position P present in the input region RD corresponding to the latter-identified characteristic position and (ii) the input region RD corresponding to the former-identified characteristic position. Accordingly, in this example, in comparison with a case in which the interval between the corrected position Md and the latter-identified characteristic position is less than the predetermined reference interval, there is a reduced probability of the occurrence of an unintended operation input in which the user accidentally touches, with finger FG, an input region RD that is different from an input region RD intended by the user.

For example, the operation region determiner 115 may define, as the corrected position Md, a position having an interval with the latter-identified characteristic position being equal to or larger than the predetermined reference interval among positions closer to the latter-identified characteristic position than the former-identified characteristic position. In this example, in comparison with the case in which the interval between the corrected position Md and the latter-identified characteristic position is less than the predetermined reference interval, there is a reduced probability of the occurrence of an unintended operation input that the user accidentally touches, with finger FG, an input region RD different from an input region RD intended by the user.

For example, the operation region determiner 115 may define the corrected position Md such that the following ratio is equal to or greater than a predetermined value $\eta$ ($\eta$ is a natural number satisfying "$0<\eta<1$"). The ratio refers to a ratio of (i) the distance between the corrected position Md and the latter-identified characteristic position to (ii) the distance between the characteristic position CPr and the characteristic position CPl, among positions that are in the reference region and are closer to the latter-identified characteristic position than the former-identified characteristic position. In this example, in comparison with a case in which the ratio of the distance between the corrected position Md and the latter-identified characteristic position to the distance between the characteristic position CPr and the characteristic position CPl is less than the predetermined value $\eta$, there is a reduced probability of the occurrence of an unintended operation input in which the user accidentally touches, with finger FG, an input region RD different from an input region RD intended by the user.

For example, the operation region determiner 115 may define the corrected position Md such that the following ratio is equal to or greater than a predetermined value $\eta$. The ratio refers to a ratio of (i) the distance between the corrected position Md and the latter-identified characteristic position to (ii) the distance between the characteristic position CPr and the characteristic position CPl, among positions that are closer to the latter-identified characteristic position than the former-identified characteristic position. In this example, in comparison with a case in which the ratio of the distance between the corrected position Md and the latter-identified characteristic position to the distance between the characteristic position CPr and the characteristic position CPl is less than the predetermined value $\eta$, there is a reduced probability of the occurrence of an unintended operation in which the user accidentally touches, with finger FG, an input region RD different from an input region RD intended by the user. Hereinafter, the corrected position Md defined by the operation region determiner 115 at the time t is also called the corrected position Md[t].

In the touch position changing example, as shown in FIG. 8, the operation region determiner 115 defines the midpoint between the characteristic position CPr and the characteristic position CPl as the corrected position Md[t5] at the time t5. The operation region determiner 115 further defines an operation region motion vector Vmd[t5] having an initial point that is the reference position Ov[t5] and a terminal point that is the corrected position Md[t5]. At the time t6, the operation region determiner 115 defines a position of the terminal point of the operation region motion vector Vmd[t5] as the reference position Ov[t6], the position being a position in the case in which the initial point of the operation region motion vector Vmd[t5] is set as the reference position Ov[t5]. The operation region determiner 115 sets the operation region coordinate system $\Sigma V$[t6] such that the reference position Ov[t6] is set as the origin. The operation region determiner 115 sets the operation region V[t6] at a position corresponding to the operation region coordinate system $\Sigma V$[t6] at the time t6. In the touch position changing example, the time t6 is a time after the time t5, but may be a time identical to the time t5.

Figure 9:
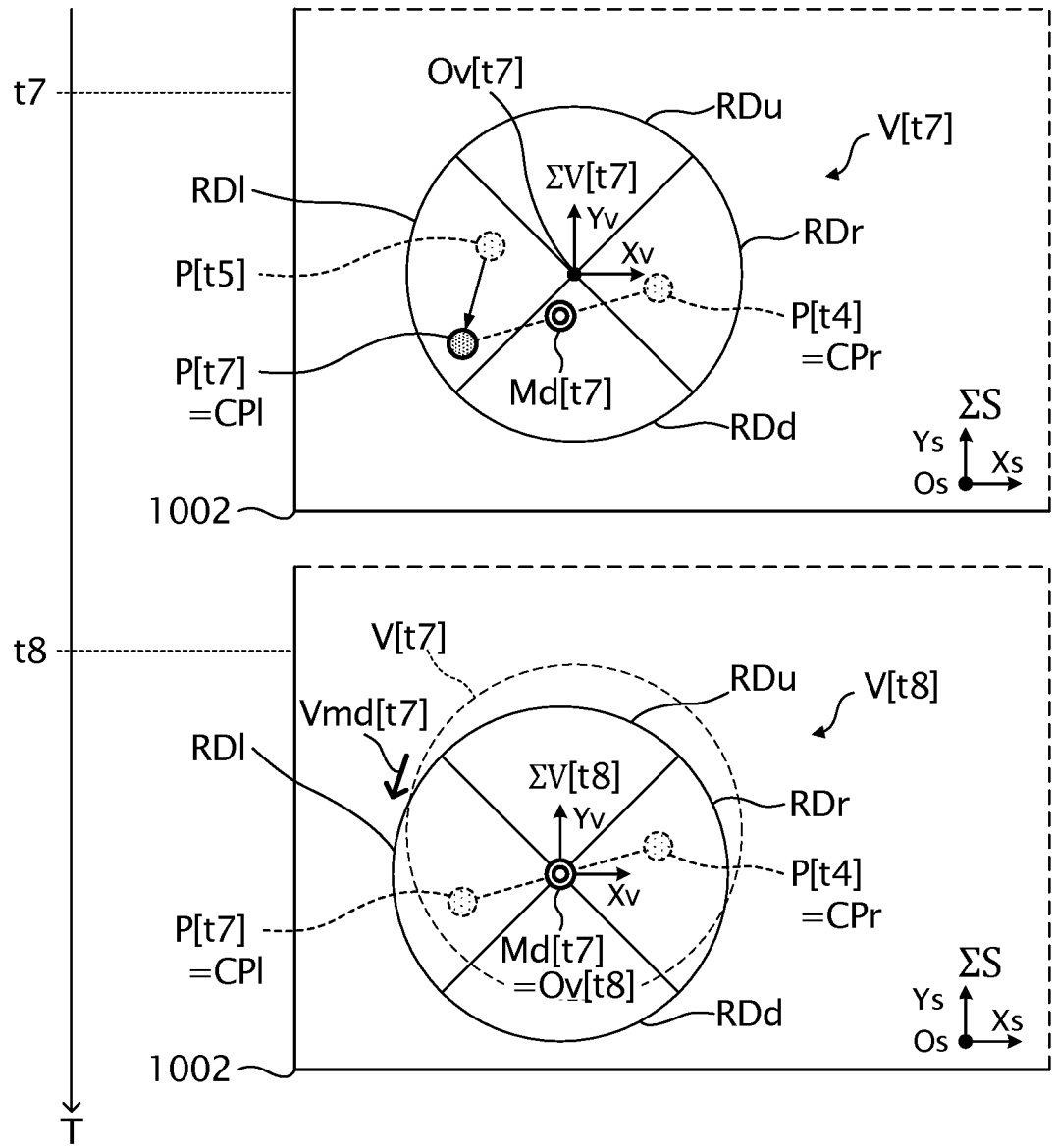
FIG. 9 illustrates a touch position changing example.

As shown in FIG. 9, the touch position changing example assumes a case in which finger FG moves the input region RDl from the touch position P[t5] to a touch position P[t7] while being in contact with the touch panel 1002, from the time t6 to a time t7. The touch position changing example assumes a case in which the touch position P[t7] at the time t7 is positioned farther on the −Xv side than the touch position P[t5] in the input region RDl. Accordingly, in the touch position changing example, the characteristic position determiner 114 identifies the touch position P[t7] as the characteristic position CPl at the time t7. In other words, in the touch position changing example, the characteristic position determiner 114 updates the characteristic position CPl from the touch position P[t5] to the touch position P[t7] at the time t7.

In the touch position changing example, as shown in FIG. 9, the operation region determiner 115 defines the midpoint between the characteristic position CPr and the characteristic position CPl as the corrected position Md[t7] at the time t7. The operation region determiner 115 further defines an operation region motion vector Vmd[t7] having an initial point that is the reference position Ov[t7] and a terminal point that is the corrected position Md[t7]. The operation region determiner 115 then moves the reference position Ov[t7], the operation region coordinate system $\Sigma V$[t7] and the operation region V[t7] by a movement amount corresponding to the operation region motion vector Vmd[t7] at the time t8, thereby setting the reference position Ov[t8], the operation region coordinate system V[t8] and the operation region V[t8]. In other words, the operation region determiner 115 sets the reference position Ov[t8], the operation region coordinate system V[t8] and the operation region V[t8] such that the reference position Ov[t8] is the same as the corrected position Md[t7]. In the touch position changing example, the time t8 is a time after the time t7, but it may be a time identical to the time t7.

Figure 10:
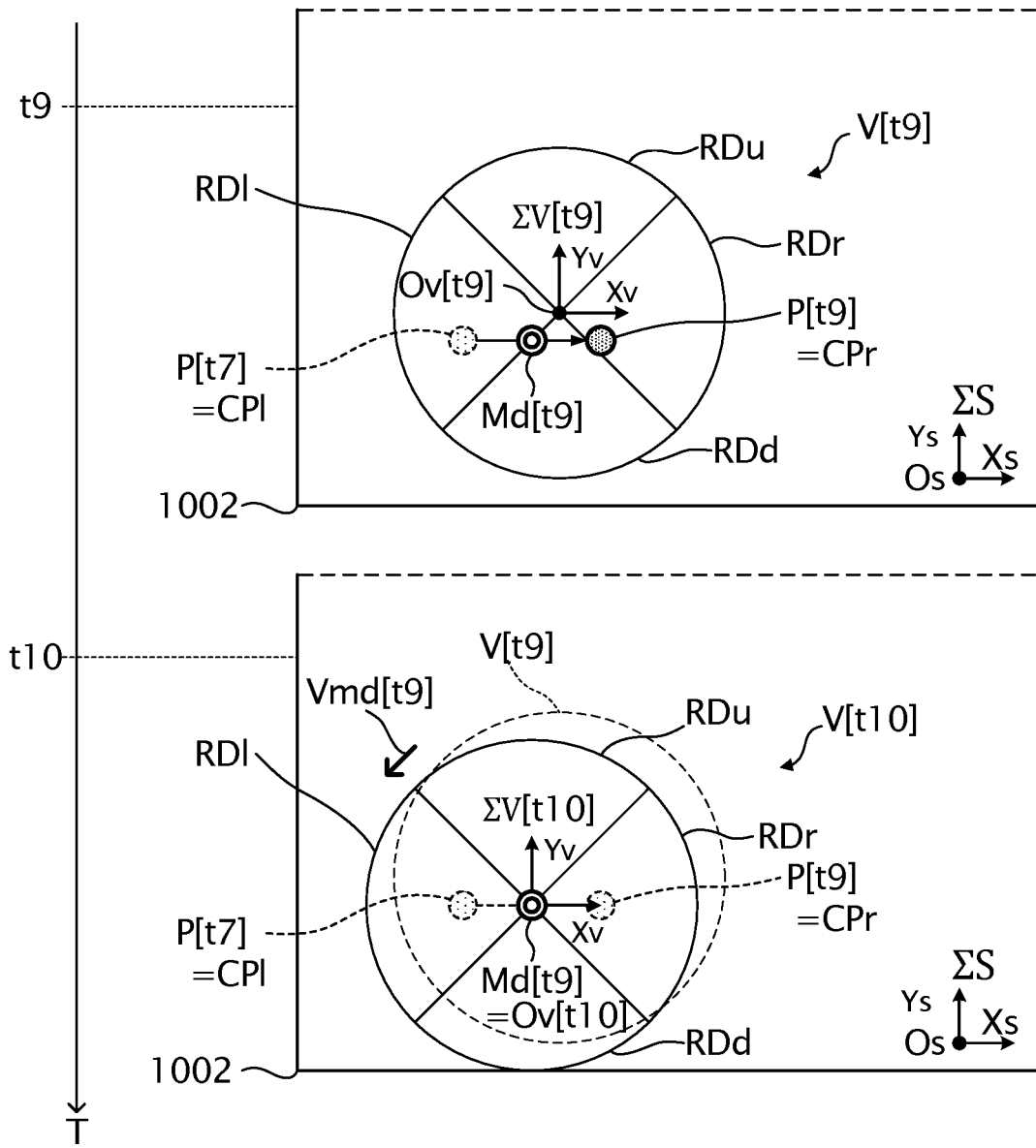
FIG. 10 illustrates a touch position changing example.

As shown in FIG. 10, the touch position changing example assumes a case in which finger FG moves from the touch position P[t7] to a touch position P[t9] in the input region RDl and the input region RDd while being in contact with the touch panel 1002, from the time t8 to a time t9. The touch position changing example assumes a case in which the touch position P reenters the input region RDr at the time t9. That is, in the touch position changing example, the input region touch period TRl finishes at a time between the time t8 to the time t9, and an input region touch period TRr is restarted at the time t9. Hereinafter, for the sake of illustration, in some cases, the input region touch period TRr started at a time between the time t1 and the time t2 is called a "former input region touch period TRr". The input region touch period TRr started at the time t9 is called a "latter input region touch period TRr".

As described above, in this embodiment, when the latter input region touch period TRr is started, the characteristic position determiner 114 discards the identification result of the characteristic position CPr at the time of completion of the former input region touch period TRr. In addition, the characteristic position determiner 114 identifies a new characteristic position CPr in the latter input region touch period TRr. Accordingly, in the touch position changing example, as shown in FIG. 10, the characteristic position determiner 114 identifies the touch position P[t9] as the characteristic position CPr at the time t9. In other words, in the touch position changing example, the characteristic position determiner 114 updates the characteristic position CPr from the touch position P[t4] to the touch position P[t9] at the time t9.

In the touch position changing example, as shown in FIG. 10, the operation region determiner 115 defines the midpoint between the characteristic position CPr and the characteristic position CPl as the corrected position Md[t9] at the time t9. The operation region determiner 115 further defines an operation region motion vector Vmd[t9] having an initial point that is the reference position Ov[t9] and a terminal point that is the corrected position Md[t9]. The operation region determiner 115 then moves the reference position Ov[t9], the operation region coordinate system V[t9] and the operation region V[t9] by a movement amount corresponding to the operation region motion vector Vmd[t9] at the time t10, thereby setting the reference position Ov[t10], the operation region coordinate system ΣV[t10] and the operation region V[t10]. In other words, the operation region determiner 115 sets the reference position Ov[t10], the operation region coordinate system ΣV[t10] and the operation region V[t10] such that the reference position Ov[t10] is the same as the corrected position Md[t9]. In the touch position changing example, the time t10 is a time after the time t9, but the time t10 may be a time identical to the time t9.

A-4. Operations of Terminal Apparatus

Hereinafter, referring to FIG. 11, an example of the operations of the terminal apparatus 10 will be described.

Figure 11:
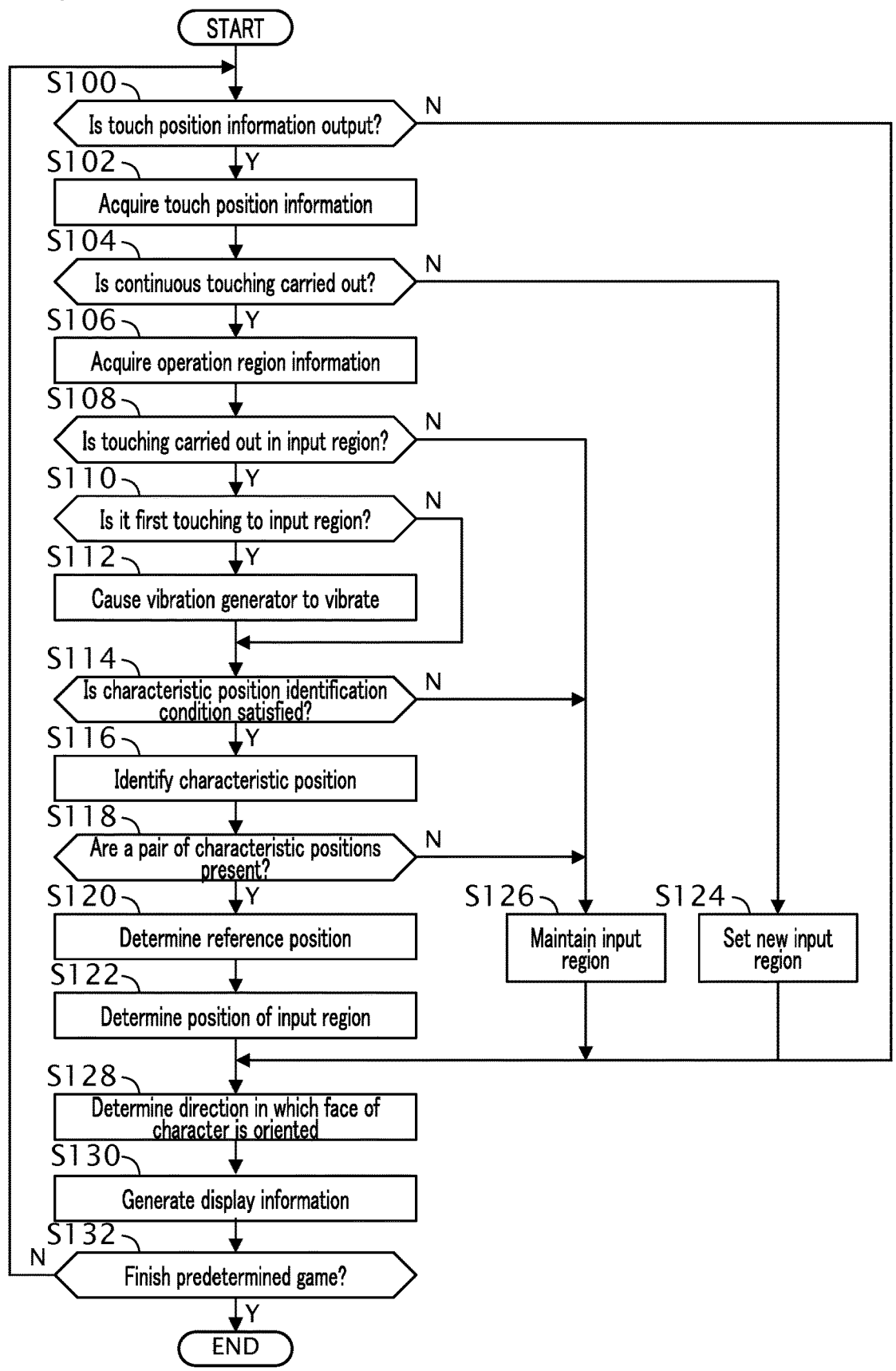
FIG. 11 is a flowchart showing an example of operations of the terminal apparatus 10.

FIG. 11 is a flowchart showing an example of the operations of the terminal apparatus 10 in a case in which the terminal apparatus 10 executes a predetermined game. In this embodiment, for example, when the user of the terminal apparatus 10 inputs a predetermined start operation for starting the predetermined game through the touch panel 1002, the terminal apparatus 10 is assumed to start the predetermined game.

As shown in FIG. 11, when the predetermined game is started, the touch position information acquirer 113 determines whether the touch panel 1002 outputs the touch position information or not (S100). If the result of determination in step S100 is negative, the touch position information acquirer 113 then advances the processing to step S128. In contrast, if the result of the determination in step S100 is affirmative, the touch position information acquirer 113 acquires the touch position information output from the touch panel 1002 (S102). The touch position information acquirer 113 updates the touch position history information stored in the storage 14 on the basis of the touch position information acquired in step S102. Specifically, the touch position information acquirer 113 associates the touch position information acquired in step S102 with the time when the touch position information is acquired, and includes them in the touch position history information. The touch position history information may include information indicative of a region where the touch position P at each time is present among the input regions RDr, RDl, RDu and RDd. Alternatively, the touch position history information may include information indicative of an input region touch period including the time when the touch position information is acquired among the input region touch periods TRr, TRl, TRu and TRd, instead of the information indicative of the input region RD where the touch position P is present.

Next, the characteristic position determiner 114 determines whether or not the time when the touch position information acquirer 113 acquires the touch position information in step S102 is a time after touch-in by finger FG of the user on the touch panel 1002 (S104). Specifically, for example, the characteristic position determiner 114 refers to the touch position history information in step S104 to thereby determine whether or not the touch position information acquired by the touch position information acquirer 113 in step S102 is touch position information acquired at the second time or thereafter, among one or more pieces of touch position information acquired by the touch position information acquirer 113 after start of the touch period. If the result of determination in step S104 is negative, the characteristic position determiner 114 then advances the processing to step S124. In contrast, if the result of the determination in step S104 is affirmative, the characteristic position determiner 114 acquires the operation region information stored in the storage 14, and identifies the position of each input region RD (S106).

Next, the characteristic position determiner 114 determines whether or not the touch position P, which is indicated by the touch position information acquired by the touch position information acquirer 113 in step S102, is in the input region RD (S108). If the result of the determination in step S108 is affirmative, the time when the touch position information acquirer 113 acquires the touch position information in step S102 is included in the input region touch period TR corresponding to the input region RD where the touch position P is present. The characteristic position determiner 114 may update the touch position history information on the basis of the determination result in step S108. If the result of determination in step S108 is negative, the characteristic position determiner 114 then advances the processing to step S126.

In contrast, if the result of the determination in step S108 is affirmative, the vibration controller 116 determines whether or not the touch position information acquired by the touch position information acquirer 113 in step S102 is the first acquired touch position information among one or more pieces of touch position information acquired by the touch position information acquirer 113 in the input region touch period TR to be determined (S110). It is to be noted that the input region touch period TR to be determined is the input region touch period TR corresponding to input region RD in which the touch position P is present and which has been determined in step S108. If the result of determination in step S110 is negative, the vibration controller 116 then advances the processing to step S114. In contrast, if the result of the determination in step S110 is positive, the vibration controller 116 controls the vibration generator 15 such that the vibration generator 15 vibrates the terminal apparatus 10 (S112).

Next, the characteristic position determiner 114 determines whether or not the touch position P indicated by the touch position information acquired by the touch position information acquirer 113 in step S102 satisfies the characteristic position identification condition (S114). Specifically, if the touch position P, which is indicated by the touch position information acquired by the touch position information acquirer 113 in step S102, is in the input region RDr, the characteristic position determiner 114 determines whether or not the touch position P satisfies the first condition in step S114. If the touch position P, which is indicated by the touch position information acquired by the touch position information acquirer 113 in step S102, is in the input region RDl, the characteristic position determiner 114 determines whether or not the touch position P satisfies the second condition in step S114. If the touch position P, which is indicated by the touch position information acquired by the touch position information acquirer 113 in step S102, is in the input region RDu or the input region RDd, the characteristic position determiner 114 determines that the characteristic position identification condition is not satisfied in step S114. If the result of determination in step S114 is negative, the characteristic position determiner 114 then advances the processing to step S126.

In contrast, if the result of the determination in step S114 is positive, the characteristic position determiner 114 identifies, as the characteristic position CP, the touch position P indicated by the touch position information acquired by the touch position information acquirer 113 in step S102 (S116). Specifically, if the touch position P, which is indicated by the touch position information acquired by the touch position information acquirer 113 in step S102, satisfies the first condition, the characteristic position determiner 114 identifies the touch position P as the characteristic position CPr. If the touch position P, which is indicated by the touch position information acquired by the touch position information acquirer 113 in step S102, satisfies the second condition, the characteristic position determiner 114 identifies the touch position P as the characteristic position CPl. It is to be noted that the characteristic position determiner 114 updates the characteristic position information stored in the storage 14, on the basis of the identification result in step S116.

Next, the operation region determiner 115 determines whether or not both the characteristic position CPr and the characteristic position CPl are present (S118). If the result of determination in step S118 is negative, the operation region determiner 115 then advances the processing to step S126. In contrast, if the result of the determination in step S118 is affirmative, the operation region determiner 115 determines the reference position Ov on the basis of the characteristic position CPr and the characteristic position CPl (S120).

Next, the operation region determiner 115 determines the positions of the input regions RDr, RDl, RDu and RDd in the touch panel coordinate system ΣS, on the basis of the reference position Ov determined in step S120 (S122). It is to be noted that the operation region determiner 115 updates the operation region information stored in the storage 14, with the position of the input region RD determined in step S122.

In contrast, if the result of the determination in step S104 is negative, the operation region determiner 115 sets (i) the reference position Ov as the touch position P indicated by the touch position information acquired by the touch position information acquirer 113 in step S102, and (ii) the operation region V including the input regions RDr, RDl, RDu and RDd to the position based on the reference position Ov (S124).

If the result of the determination in step S108, S114 or S118 is negative, the operation region determiner 115 does not change and maintains the position of the input region RD (S126).

Subsequently, the game controller 111 determines the direction in which the face of the character CR is oriented in the touch panel coordinate system ΣS (S128). Specifically, if finger FG is in contact with the touch panel 1002 (S100: Y) in step S128 and the touch position P is in the input region RD (S108: Y), the game controller 111 sets the direction in which the face of the character CR is oriented in the touch panel coordinate system ΣS, to the direction corresponding to the input region RD in which the touch position P is present and which has been determined in step S108. If finger FG is in contact with the touch panel 1002 (S100: Y) in step S128 and the touch position P is not in the input region RD (S108: N), the game controller 111 sets the direction in which the face of the character CR is oriented in the touch panel coordinate system ΣS, to a predetermined direction, for example, a front direction as shown in FIG. 1. If finger FG is not in contact with the touch panel 1002 (S100: N) in step S128, the game controller 111 sets the direction in which the face of the character CR is oriented in the touch panel coordinate system ΣS, to the predetermined direction, for example, the front direction as shown in FIG. 1.

Next, the display controller 112 generates display information for displaying the virtual space SP, the character CR and the operation region V, and controls the display 12 to display an image based on the display information (S130).

Subsequently, the game controller 111 determines whether or not the user has input a predetermined finish operation for finishing the predetermined game through the touch panel 1002 (S132). If the result of the determination in step S132 is negative, the game controller 111 then advances the processing to step S100. If the result of the determination in step S132 is positive, this controller finishes the predetermined game.

A-5. Summary of First Embodiment

As described above, in this embodiment, the operation region determiner 115 determines the position of the operation region V including the input regions RDr, RDl, RDu and RDd on the basis of the characteristic position CPr and the characteristic position CPl. Consequently, in this embodiment, even if the touch position P in the operation region V gradually deviates, the operation region determiner 115 can correct the operation region V in response to the gap of the touch position P. Accordingly, in this embodiment, for example, in comparison with a case in which the position of the operation region V is fixed on the touch panel 1002, the probability of an unintended input due to the gap of the touch position P is reduced.

In general, there is a high probability that the following (i) and (ii) are defined according to (A) the shape and size of the finger FG in contact with the touch panel 1002, and (B) the way of touching of each user, such as the pressure of the finger FG of the user coming into contact with the touch panel 1002, and the way of moving the finger FG.

(i) The relative positional relationship between two characteristic positions CP that are the characteristic position CPr and the characteristic position CPl, and (ii) The interval between the two characteristic positions CP that are the characteristic position CPr and the characteristic position CPl.

In contrast, in this embodiment, the operation region determiner 115 determines the position of the operation region V including the input region RDr and the input region RDl, on the basis of the two characteristic positions CP that are the characteristic position CPr and the characteristic position CPl. Accordingly, in this embodiment, for example, in comparison with a case in which the position of the input region RD is defined on the basis of one characteristic position CP, the operation region V including the input region RDr and the input region RDl can be set at a position in consideration of the way of touching for each user. Accordingly, in this embodiment, for example, in comparison with a case in which the position of the input region RD is defined on the basis of the one characteristic position CP, the operability of an operation of touching the input region RD with finger FG can be favorably maintained for any user.

In a specific type of game, the frequency of inputs of one direction related to the game is higher than the frequency of inputs of the other directions related to the game. Hereinafter, an instruction in the +Xs direction related to the predetermined game, and an instruction in the −Xs direction related to the predetermined game are collectively called Xs direction instructions in some cases. Likewise, an instruction in the +Ys direction related to the predetermined game, and an instruction in the −Ys direction related to the predetermined game are collectively called the Ys direction instructions in some cases. For example, in the predetermined game, the frequency of inputs of the Xs direction instruction is higher than the frequency of inputs of the Ys direction instruction. Determining the position of the input region RD on the basis of the touch position P related to an input of an instruction having a low frequency causes a probability that the input region RD is set at a position that does not correspond to the temporal gap of the position of finger FG of the user.

In contrast, in this embodiment, the operation region determiner 115 determines the positions of the input region RDu and the input region RDd, on the basis of the touch position P, that is, in the input region RDr and the input region RDl, and corresponds to the input of the Xs direction instruction. Accordingly, in this embodiment, in a case in which the frequency of inputs of the Xs direction instruction is greater than the frequency of inputs of the Ys direction instruction, there can be an increase in the probability that the operation region V is set at a position correctly corresponding to the gap of the touch position P, in comparison with the following case. In this case, the positions of the input region RDu and the input region RDd are determined based on the touch position P that is in the input region RDu and the input region RDd and corresponds to the input of the Ys direction instruction, for example.

A-6. Modifications of First Embodiment

Each mode described above can be variously modified. Specific modified modes will be exemplified below. Two or more modes freely selected from among the following examples can be appropriately combined in a range that does not conflict. In the modifications exemplified below, elements having operations and functions equivalent to those of the embodiment are also assigned the symbols referred to in the above description, and detailed descriptions of the elements are omitted as appropriate.

Modification A1

In the embodiment described above, the characteristic position determiner 114 identifies (i) the characteristic position CPr based on the touch position P present in the input region RDr, and (ii) the characteristic position CPl based on the touch position P present in the input region RDl. Furthermore, the operation region determiner 115 defines (iii) the position of the operation region V in a direction, which includes the +Xv direction and the −Xv direction, and (iv) the position of the operation region V in a direction, which includes the +Yv direction and the −Yv direction, on the basis of the characteristic position CPr and the characteristic position CPl. However, the present invention is not limited to such an aspect. For example, the characteristic position determiner 114 may identify a characteristic position CPu on the basis of the touch position P present in the input region RDu in addition to the characteristic position CPr and the characteristic position CPl. Then, the characteristic position determiner 114 may identify a characteristic position CPd based on the touch position P present in the input region RDd. It is to be noted that the characteristic position CPr, the characteristic position CPl, the characteristic position CPu and the characteristic position CPd are collectively called characteristic positions CP, in cases without specific discrimination. Specifically, if the following condition (an example of a "third condition") is satisfied, the characteristic position determiner 114 may identify, as the characteristic position CPu, the touch position P corresponding to a certain time in the input region touch period TRu during which the touch position P is in the input region RDu. The condition indicates that the touch position P indicated by the touch position information acquired by the touch position information acquirer 113 at the certain time is positioned farthest on the +Yv side, among one or more touch positions P, where the touch positions P are indicated by one or more pieces of touch position information acquired by the touch position information acquirer 113 in a period from the time of the start of the input region touch period TRu to the certain time. If the following condition (an example of a "fourth condition") is satisfied, the characteristic position determiner 114 may identify, as the characteristic position CPd, the touch position P corresponding to a certain time in the input region touch period TRd during which the touch position P is in the input region RDd. The condition indicates that the touch position P indicated by the touch position information acquired by the touch position information acquirer 113 at the certain time is positioned farthest on the −Yv side, among one or more touch positions P, where the touch positions P are indicated by one or more pieces of touch position information acquired by the touch position information acquirer 113 in a period from the time of the start of the input region touch period TRd to the certain time. In this case, the operation region determiner 115 may define the position of the operation region V in a direction, which includes the +Xv direction and the −Xv direction, on the basis of the characteristic position CPr and the characteristic position CP. The operation region determiner 115 may identify the position of the operation region V in a direction, which includes the +Yv-axis direction and the −Yv direction, on the basis of the characteristic position CPu and the characteristic position CPd. Hereinafter, the first condition, the second condition, the third condition and the fourth condition are sometimes collectively referred to as characteristic position identification conditions.

Figure 12:
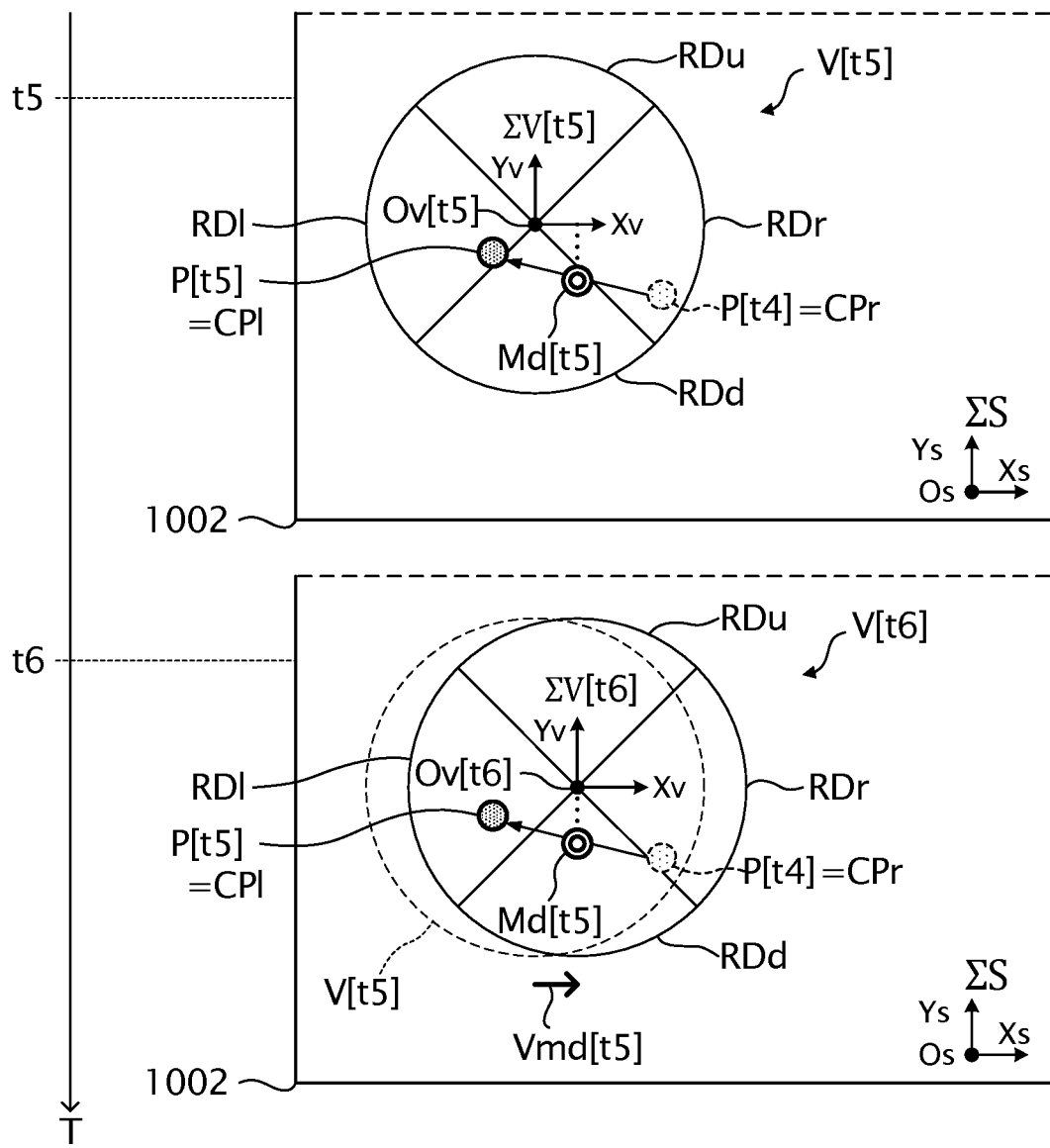
FIG. 12 illustrates a touch position changing example according to Modification A1.
Figure 13:
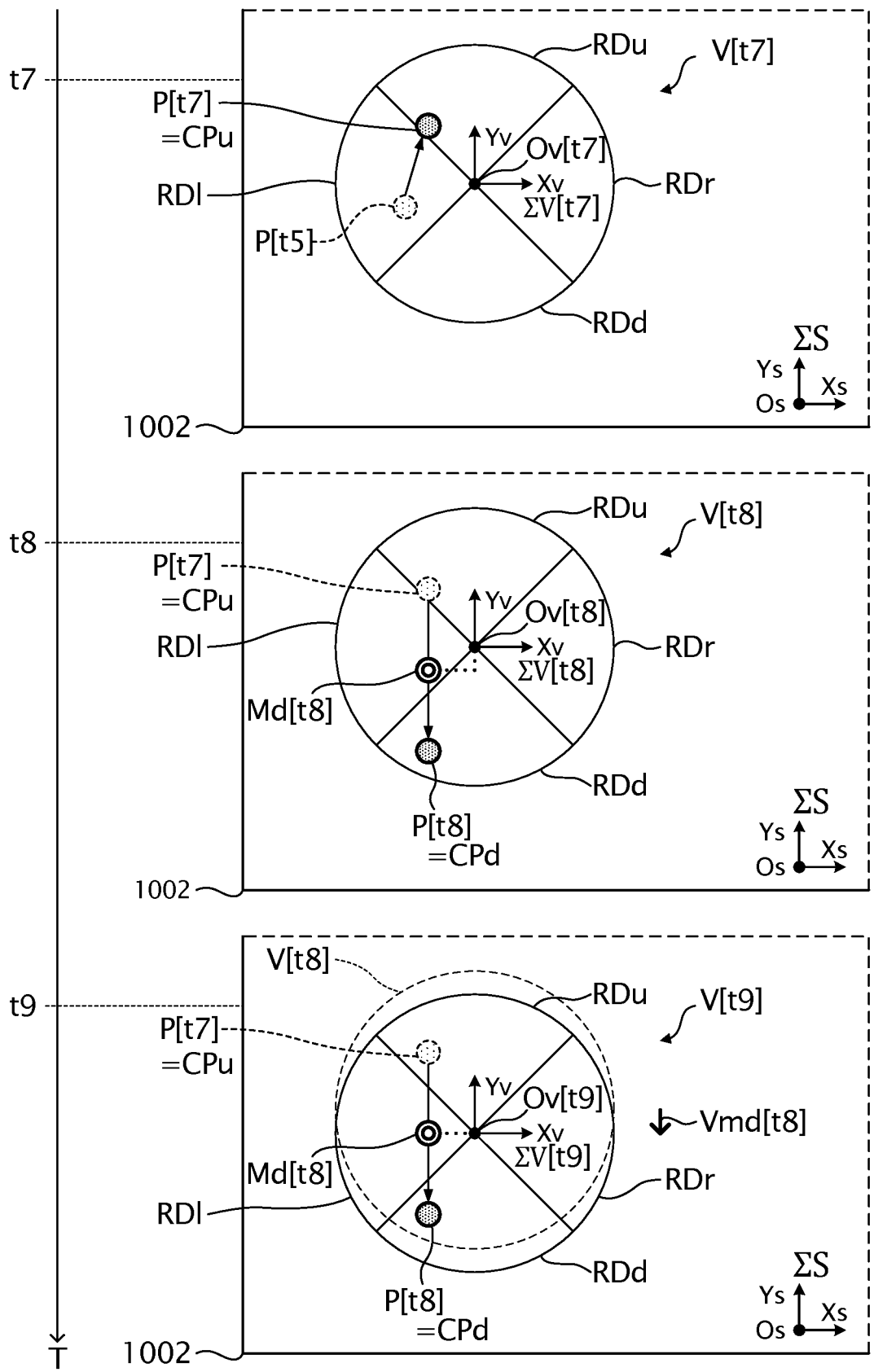
FIG. 13 illustrates a touch position changing example according to Modification A1.

FIGS. 12 and 13 are diagrams for illustrating the touch position changing example according to this modification. It is assumed that the period from the time t1 to the time t4 in the touch position changing example according to this modification is similar to that in the touch position changing example according to the embodiment shown in FIGS. 7 and 8.

As shown in FIG. 12, the touch position changing example according to this modification assumes a case in which finger FG moves from the touch position P[t4] to the touch position P[t5] in the input region RDr and the input region RDd while being in contact with the touch panel 1002, from the time t4 to the time t5, and enters the input region RDl at the time t5. In the touch position changing example according to this modification, the characteristic position determiner 114 identifies the touch position P[t5] as the characteristic position CPl at the time t5. The touch position changing example according to this modification assumes a case in which the characteristic position determiner 114 identifies the touch position P[t4] as the characteristic position CPr at the time t5. In the touch position changing example according to this modification, the operation region determiner 115 defines the midpoint between the characteristic position CPr and the characteristic position CPl as the corrected position Md[t5] at the time t5. The operation region determiner 115 further defines, as an operation region motion vector Vmd[t5], a vector obtained by taking only the Xv component from a vector having (i) an initial point that is the reference position Ov[t5] and (ii) a terminal point that is the corrected position Md[t5]. The operation region determiner 115 then moves the reference position Ov[t5], the operation region coordinate system ΣV[t5] and the operation region V[t5] by a movement amount corresponding to the operation region motion vector Vmd[t5] at the time t6, thereby setting the reference position Ov[t6], the operation region coordinate system ΣV [t6] and the operation region V[t6]. In the touch position changing example according to this modification, the time t6 is a time after the time t5, but the time t6 may be a time identical to the time t5.

As shown in FIG. 13, the touch position changing example according to this modification assumes a case in which finger FG moves from the touch position P[t5] to the touch position P[t7] in the input region RDl while being in contact with the touch panel 1002, from the time t6 to the time t7, and enters the input region RDu at the time t7. In the touch position changing example according to this modification, the characteristic position determiner 114 identifies the touch position P[t7] as the characteristic position CPu at the time t7. Subsequently, a case is assumed in which finger FG moves the input region RDu, the input region RDl and the input region RDd from the touch position P [t7] to the touch position P [t8] while being in contact with the touch panel 1002, from the time t7 to the time t8. In the touch position changing example according to this modification, the characteristic position determiner 114 identifies the touch position P[t8] as the characteristic position CPd at the time t8. In the touch position changing example according to this modification, the operation region determiner 115 defines the midpoint between the characteristic position CPu and the characteristic position CPd as the corrected position Md[t8] at the time t8. The operation region determiner 115 further defines, as an operation region motion vector Vmd[t8], a vector obtained by taking only the Yv component from a vector having (i) an initial point that is the reference position Ov[t8] and (ii) a terminal point that is the corrected position Md[t8]. The operation region determiner 115 then moves the reference position Ov[t8], the operation region coordinate system V[t8] and the operation region V[t8] by a movement amount corresponding to the operation region motion vector Vmd[t8] at the time t9, thereby setting the reference position Ov[t9], the operation region coordinate system V[t9] and the operation region V[t9]. In the touch position changing example according to this modification, the time t9 is a time after the time t8, but the time t9 may be a time identical to the time t8.

As described above, in this modification, the operation region determiner 115 determines the positions of the input region RDr and the input region RDl on the basis of the touch position P present in the input region RDr and the input region RDl. Then, the operation region determiner 115 determines the positions of the input region RDu and the input region RDd on the basis of the touch position P present in the input region RDu and the input region RDd. Accordingly, in this embodiment, for example, in comparison to a case in which the position of the input region RD is fixed on the touch panel 1002, the probability of an unintended input due to the gap of the touch position P is reduced.

Modification A2

In the embodiment described above, the inclination of the operation region coordinate system ΣV from the touch panel coordinate system ΣS is not changed. However, the present invention is not limited to such an aspect. For example, the operation region determiner 115 may change the inclination of the operation region coordinate system ΣV from the touch panel coordinate system ΣS, on the basis of characteristic positions CP. More specifically, if the characteristic position determiner 114 identifies the characteristic position CPr and the characteristic position CPl, the operation region determiner 115 may determine, as the +Xv direction, the direction from the reference position Ov to the characteristic position CPr. Furthermore the operation region determiner 115 may define, as the −Xv direction, the direction from the reference position Ov to the characteristic position CPl, thereby setting the operation region coordinate system ΣV.

Figure 14:
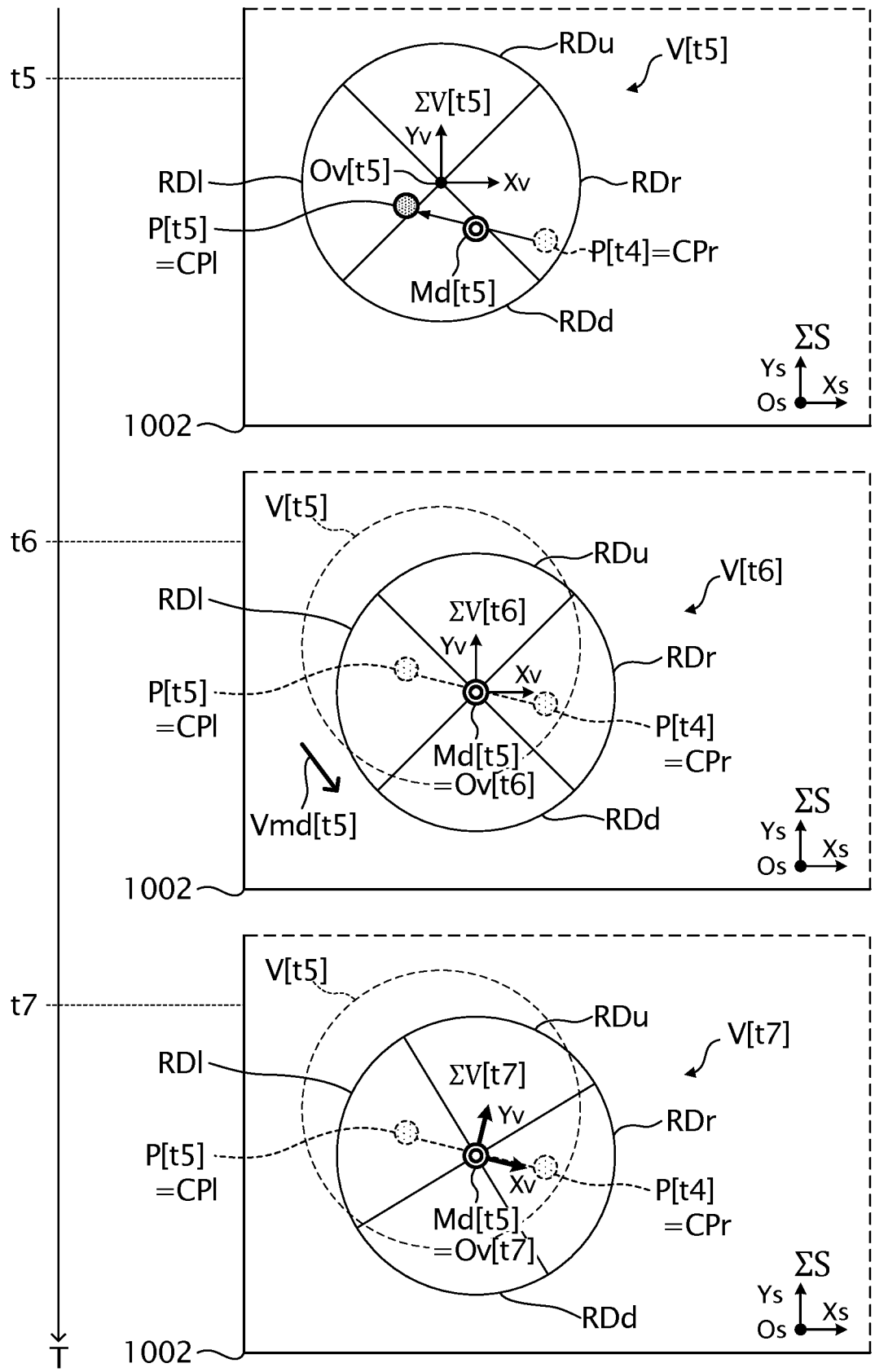
FIG. 14 illustrates a touch position changing example according to Modification A2.

FIG. 14 is a diagram for illustrating the touch position changing example according to this modification. It is assumed that the period from the time t1 to the time t4 in the touch position changing example according to this modification is similar to that in the touch position changing example according to the embodiment shown in FIGS. 7 and 8.

As shown in FIG. 14, the touch position changing example according to this modification assumes a case in which finger FG moves from is the touch position P[t4] to the touch position P[t5] in the input region RDr and the input region RDd while being in contact with the touch panel 1002, from the time t4 to the time t5, and enters the input region RDl at the time t5. In the touch position changing example according to this modification, the characteristic position determiner 114 identifies the touch position P[t5] as the characteristic position CPl at the time t5. The touch position changing example according to this modification assumes a case in which the characteristic position determiner 114 identifies the touch position P[t4] as the characteristic position CPr at the time t5. In the touch position changing example according to this modification, the operation region determiner 115 defines the midpoint between the characteristic position CPr and the characteristic position CPl as the corrected position Md[t5] at the time t5. The operation region determiner 115 further defines a vector having (i) an initial point that is the reference position Ov[t5] and (ii) a terminal point that is the corrected position Md[t5], as the operation region motion vector Vmd[t5]. The operation region determiner 115 then moves the reference position Ov[t5], the operation region coordinate system ΣV[t5] and the operation region V[t5] by a movement amount corresponding to the operation region motion vector Vmd[t5] at the time t6, thereby setting the reference position Ov[t6], the operation region coordinate system ΣV[t6] and the operation region V[t6]. More specifically, the operation region determiner 115 moves the reference position Ov from the time t5 to the time t6 such that the reference position Ov[t6] coincides with the corrected position Md[t5]. Subsequently, at the time t7, the operation region determiner 115 defines, as the +Xv direction, the direction from the corrected position Md[t5] to the characteristic position CPr. Furthermore, the operation region determiner 115 defines, as the +Yv direction, the direction that is from the corrected position Md[t5] to the input region RDu and is orthogonal to the direction from the corrected position Md[t5] to the characteristic position CPr, thereby setting the operation region coordinate system ΣV[t7]. The operation region determiner 115 sets the input regions RDr, RDl, RDu and RDd at positions based on the operation region coordinate system V[t7] at the time t7. Specifically, at the time t7, the operation region determiner 115 sets (i) the input region RDr in the +Xv direction from the reference position Ov[t7], (ii) the input region RDl in the −Xv direction from the reference position Ov[t7], (iii) the input region RDu in the +Yv direction from the reference position Ov[t7], and (iv) the input region RDd in the −Yv direction from the reference position Ov[t7]. In the touch position changing example according to this modification, the time t6 and the time t7 are times after the time t5, but the time t6 and the time t7 may be a time identical to the time t5.

As described above, in this modification, the operation region determiner 115 determines the inclinations of the Xv axis and the Yv axis that the operation region coordinate system ΣV has, on the basis of the characteristic position CPr and the characteristic position CPl. Accordingly, in this embodiment, for example, in comparison with a case in which the inclination of the operation region coordinate system ΣV is fixed on the touch panel 1002, the probability of an unintended input due to the gap of the touch position P is reduced.

Modification A3

In the embodiment and modification A1 and the modification A2 described above, the touch position P present in the input region RD is identified as the characteristic position CP. However, the present invention is not limited to such an aspect. For example, the characteristic position determiner 114 may identify the characteristic position CP on the basis of the touch position P, the touch position P being present in an extended region RDX that includes the input region RD and is wider than the input region RD. An example shown in FIG. 15 assumes a case in which four extended regions RDX (RDXr, RDXl, RDXu and RDXd) are defined.

Specifically, if the following condition is satisfied, the characteristic position determiner 114 identifies, as the characteristic position CP, the touch position P corresponding to a certain time in an extended region touch period TX during which the state of the touch position P being present in an extended region RDX is continued. The condition indicates that the touch position P indicated by the touch position information acquired by the touch position information acquirer 113 at the certain one time is at a position farthest from the reference position Ov in the direction indicative of the extended region RDX, among one or more touch positions P, where the touch positions P are indicated by one or more pieces of touch position information acquired by the touch position information acquirer 113 in a period from the time of the start of the extended region touch period TX to the one time.

Figure 15:
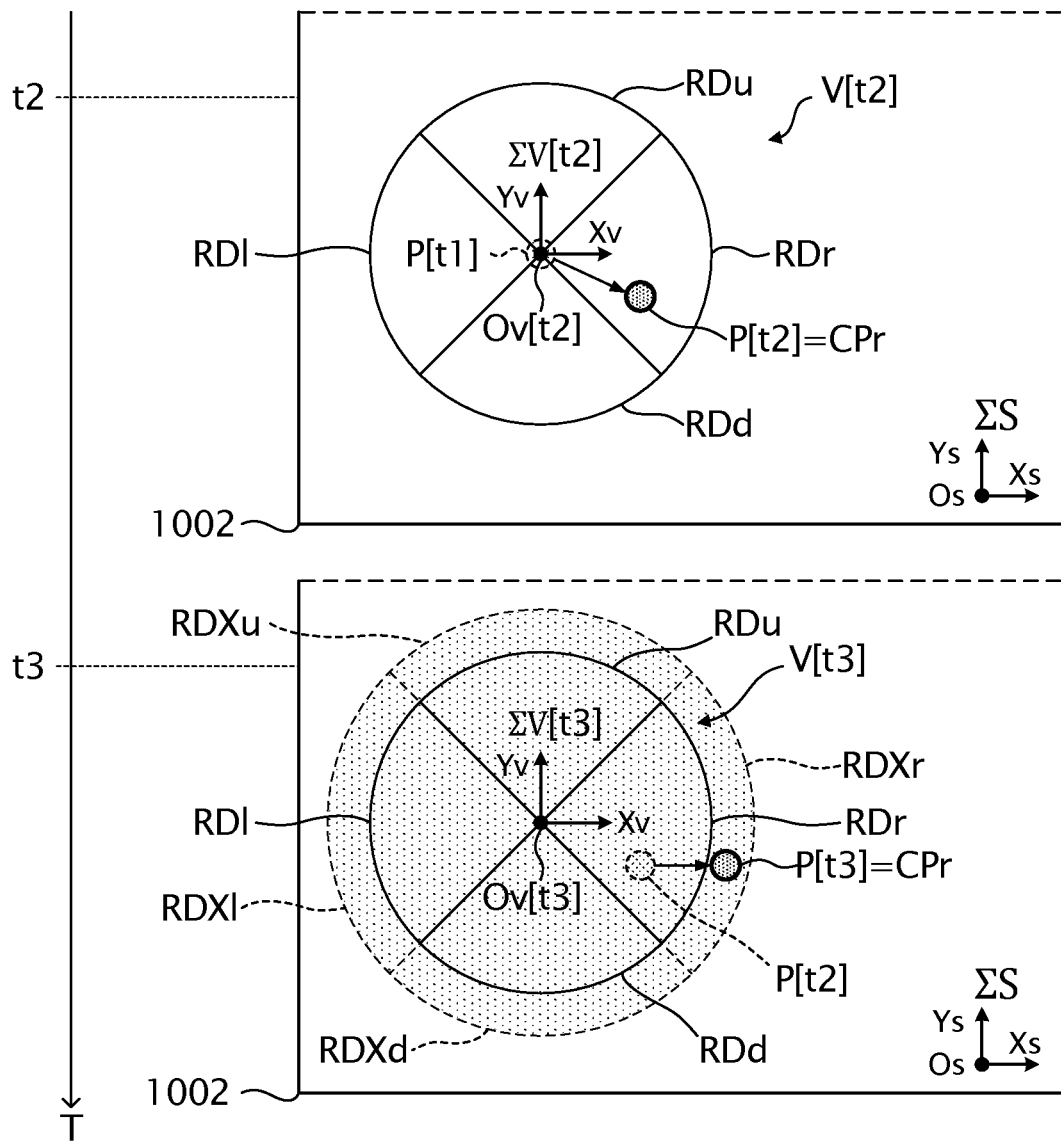
FIG. 15 illustrates a touch position changing example according to Modification A3.

Specifically, as shown in FIG. 15, if the following condition (another example of the "first condition") is satisfied, the characteristic position determiner 114 identifies, as the characteristic position CPr, the touch position P corresponding to a certain time. The condition indicates that the touch position P indicated by the touch position information acquired by the touch position information acquirer 113 at the certain time in an extended region touch period TXr during which the state of the touch position P being present in an extended region RDXr (an example of the "first region") is continued is positioned farthest on the +Xv side, among one or more touch positions P, where the touch positions P are indicated by one or more pieces of touch position information acquired by the touch position information acquirer 113 in a period from the time of the start of the extended region touch period TXr to the one time. If the following condition (another example of the "second condition") is satisfied, the characteristic position determiner 114 identifies the touch position P corresponding to a certain time as the characteristic position CPl in an extended region touch period TXl during which the state of the touch position P being present in an extended region RDXl (an example of the "second region") is continued. The condition indicates that the touch position P indicated by the touch position information acquired by the touch position information acquirer 113 at the certain time is positioned farthest on the −Xv side, among one or more touch positions P, where the touch positions P are indicated by one or more pieces of touch position information acquired by the touch position information acquirer 113 in a period from the time of the start of the extended region touch period TXl to the one time.

As described above, in this modification, the characteristic position determiner 114 identifies the characteristic position CP on the basis of the touch position P present in the extended region RDX including the input region RD, and determines the position of the input region RD on the basis of the characteristic position CP. Accordingly, in this modification, for example, in comparison with a case in which the position of the input region RD is fixed on the touch panel 1002, the probability of an unintended input due to the gap of the touch position P is reduced.

Modification A4

In the embodiment and the modifications A1 to A3 described above, the characteristic position identification condition indicates that the touch position P is a position farthest from the reference position Ov in the direction indicative of the input region RD from the reference position Ov, in the input region touch period TR. If the characteristic position identification condition is satisfied, the characteristic position determiner 114 identifies the touch position P as the characteristic position CP. However, the present invention is not limited to such an aspect. For example, if the following condition is satisfied, the characteristic position determiner 114 may identify, as the characteristic position CP, the touch position P corresponding to a certain time in the input region touch period TR. The condition indicates that the touch position P indicated by the touch position information acquired by the touch position information acquirer 113 at the certain time is apart, in the direction indicative of the input region RD from the reference position Ov, from a referring position defined based on one or more touch positions P, where the touch positions P are indicated by one or more pieces of touch position information acquired by the touch position information acquirer 113 in a period from the time of the start of the input region touch period TR to the certain time.

Specifically, if the following condition (another example of the "first condition") is satisfied, the characteristic position determiner 114 may identify, as the characteristic position CPr, the touch position P corresponding to a certain time in the input region touch period TRr. The condition indicates that the touch position P indicated by the touch position information acquired by the touch position information acquirer 113 at the certain time is at a position farther in the +Xv direction than a first referring position (an example of a "first referring position") defined based on one or more touch positions P, where the touch positions P are indicated by one or more pieces of touch position information acquired by the touch position information acquirer 113 in a period from the time of the start of the input region touch period TRr to the certain time. If the following condition (another example of the "second condition") is satisfied, the characteristic position determiner 114 may identify, as the characteristic position CPl, the touch position P corresponding to a certain time. The condition indicates that the touch position P indicated by the touch position information acquired by the touch position information acquirer 113 at the certain time in the input region touch period TRl is at a position farther in the −Xv direction than a second referring position (an example of a "second referring position") defined based on one or more touch positions P, where the touch positions P are indicated by one or more pieces of touch position information acquired by the touch position information acquirer 113 in a period from the time of the start of the input region touch period TRl to the certain time.

The referring position may be an average position of one or more touch positions P indicated by one or more pieces of touch position information, the touch position information being acquired by the touch position information acquirer 113, in a period from the time of the start of the input region touch period TR to a certain time, for example. Alternatively, the referring position may be the touch position P farthest from the reference position Ov in the direction indicative of the input region RD from the reference position Ov among some touch positions P of one or more touch positions P.

Modification A5

In the embodiment and the modifications A1 to A4 described above, if the characteristic position identification condition is satisfied in the input region touch period TR, the characteristic position determiner 114 identifies the touch position P as the characteristic position CP. However, the present invention is not limited to such an aspect. The characteristic position determiner 114 may identify the characteristic position CP on the basis of some or all the touch positions P among one or more touch positions P, where the touch positions P are indicated by the one or more pieces of touch position information acquired by the touch position information acquirer 113 in the input region touch period TR.

Figure 16:
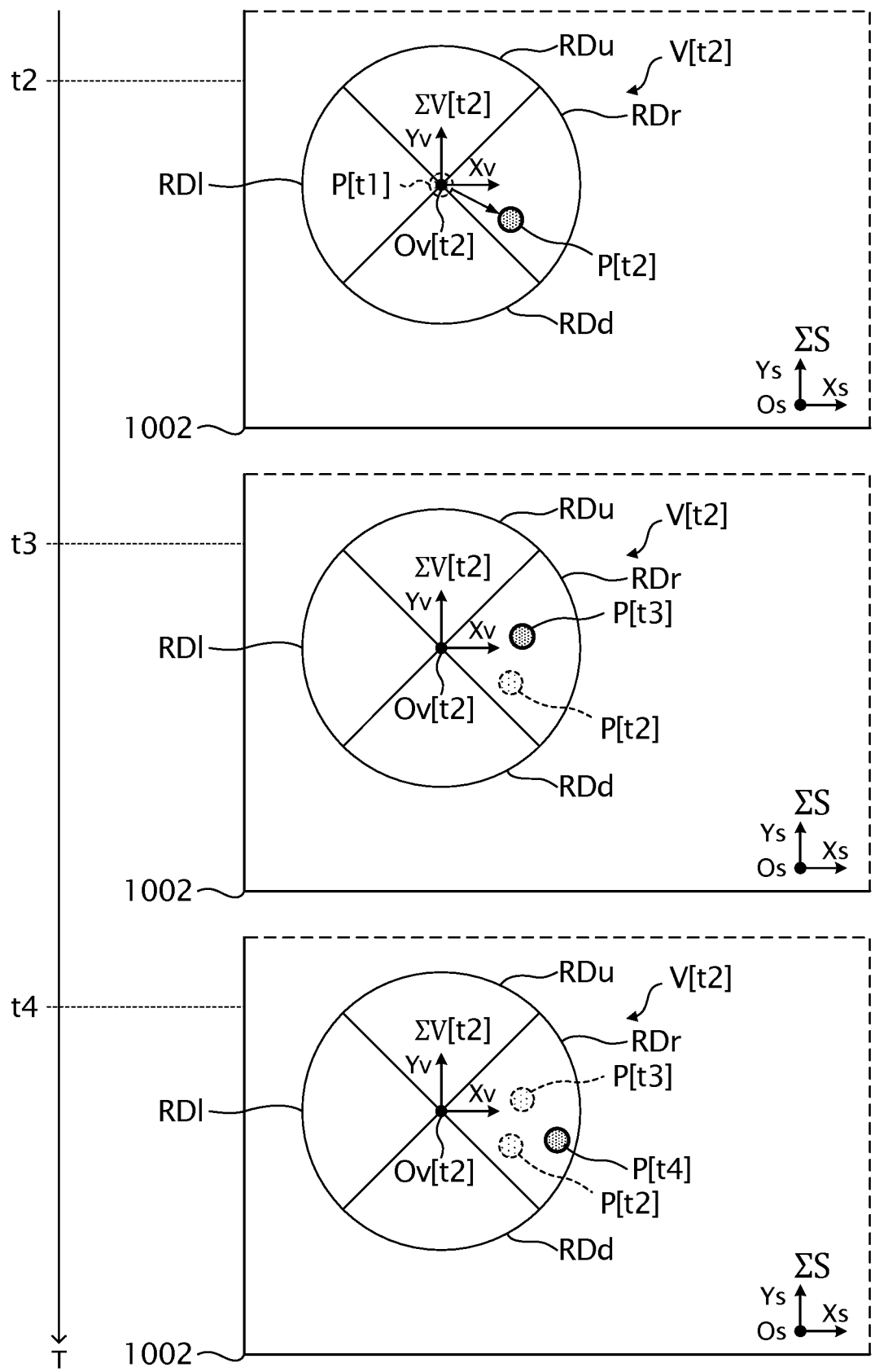
FIG. 16 illustrates a touch position changing example according to Modification A5.

Specifically, the characteristic position determiner 114 may identify, as the characteristic position CP, an average position of some or all the touch positions P among one or more touch positions P, where the touch positions P are indicated by the one or more pieces of touch position information acquired by the touch position information acquirer 113. For example, in an example shown in FIG. 16, if three pieces of touch position information, which are acquired by the touch position information acquirer 113 in the input region touch period TRr, indicate the touch positions P[t2], P[t3] and P[t4], the characteristic position determiner 114 may identify, as the characteristic position CPr, the average position of the three touch positions P[t2], P[t3] and P[t4].

For example, the characteristic position determiner 114 may identify, as the characteristic position CP, the touch position P indicative of the touch position information acquired last time among one or more touch positions P, where the touch positions P are indicated by the one or more pieces of touch position information, which are acquired by the touch position information acquirer 113, in the input region touch period TR. Specifically, in an example shown in FIG. 16, if three pieces of touch position information, which are acquired by the touch position information acquirer 113 in the input region touch period TRr, indicate the touch positions P[t2], P[t3] and P[t4], the characteristic position determiner 114 may identify, as the characteristic position CPr, the touch position P[t4] corresponding to the touch position information acquired last time.

For example, if two or more touch positions P are present at substantially identical positions for at least the predetermined time period among touch positions P, the touch positions P being indicated by the pieces of touch position information acquired by the touch position information acquirer 113 in the input region touch period TR, the characteristic position determiner 114 may identify the two or more touch positions P as the characteristic position CP. Here, "one touch position P and another touch position P are present at substantially identical positions" may mean that (i) one touch position P and another touch position P are present at the identical position, or (ii) the interval between one touch position P and another touch position P is equal to or less than a predetermined distance, for example.

Modification A6

Figure 17:
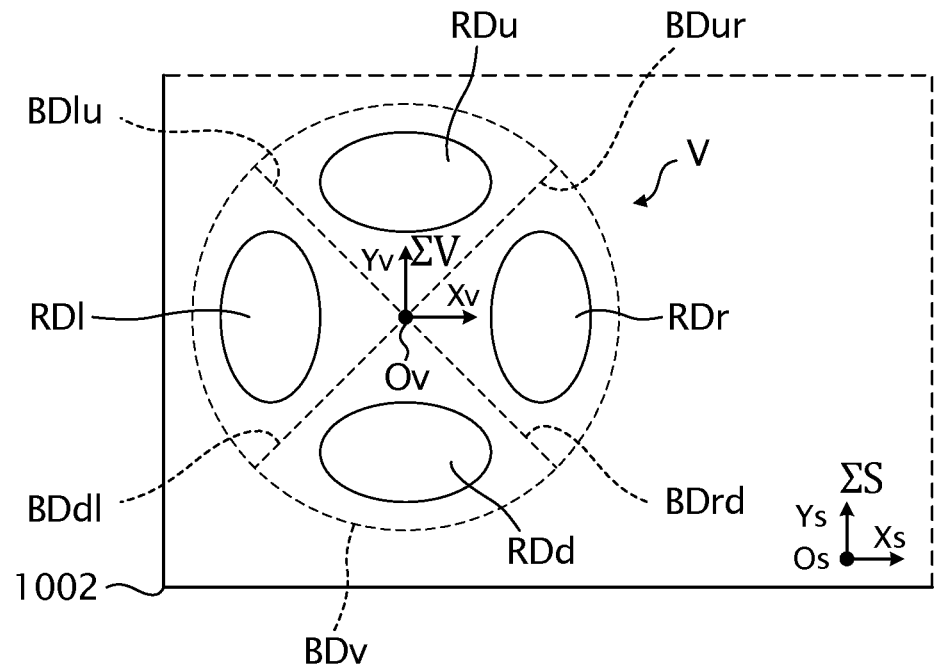
FIG. 17 illustrates an input region RD according to Modification A6.

The embodiment and the modifications A1 to A5 exemplify the case in which each input region RD is the circular sector region. However, the present invention is not limited to such an aspect. Each input region RD may be, for example, an elliptical region, or a polygonal region, as shown in FIG. 17.

Modification A7

Figure 18:
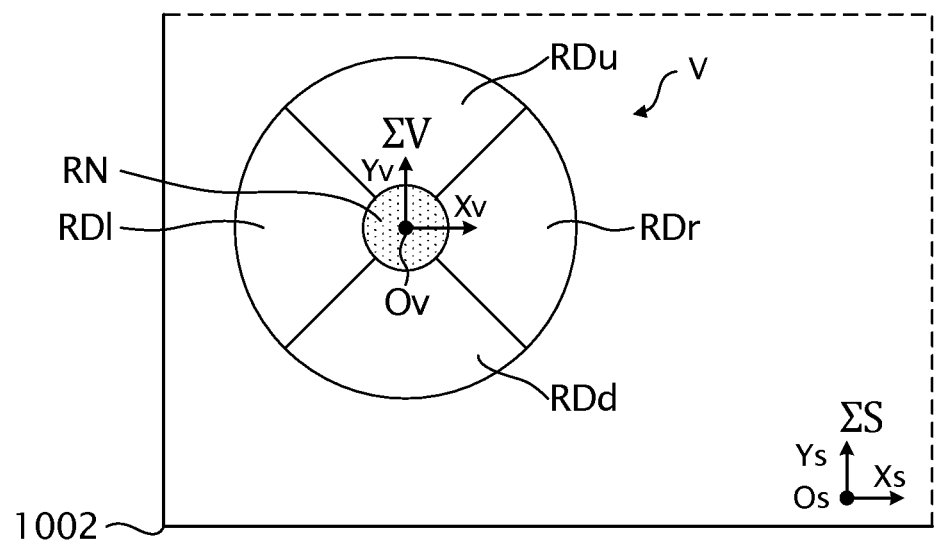
FIG. 18 illustrates an operation region V according to Modification A7.

The embodiment and the modifications A1 to A6 described above exemplify the cases in which the operation region V is made up of the input regions RDr, RDl, RDu and RDd that are regions for inputting the instruction in the direction in which the face of the character CR is oriented. However, the present invention is not limited to such an aspect. The operation region V may include a neutral region RN that is a region where the input of the instruction in the direction in which the face of the character CR is oriented is not received. In this case, for example, as shown in FIG. 18, the neutral region RN may be provided as a region that includes the center of each of the input regions RDr, RDl, RDu and RDd, that is, the reference position Ov. A specific example of the modification 7 will be described in a second embodiment below.

Modification A8

Figure 19:
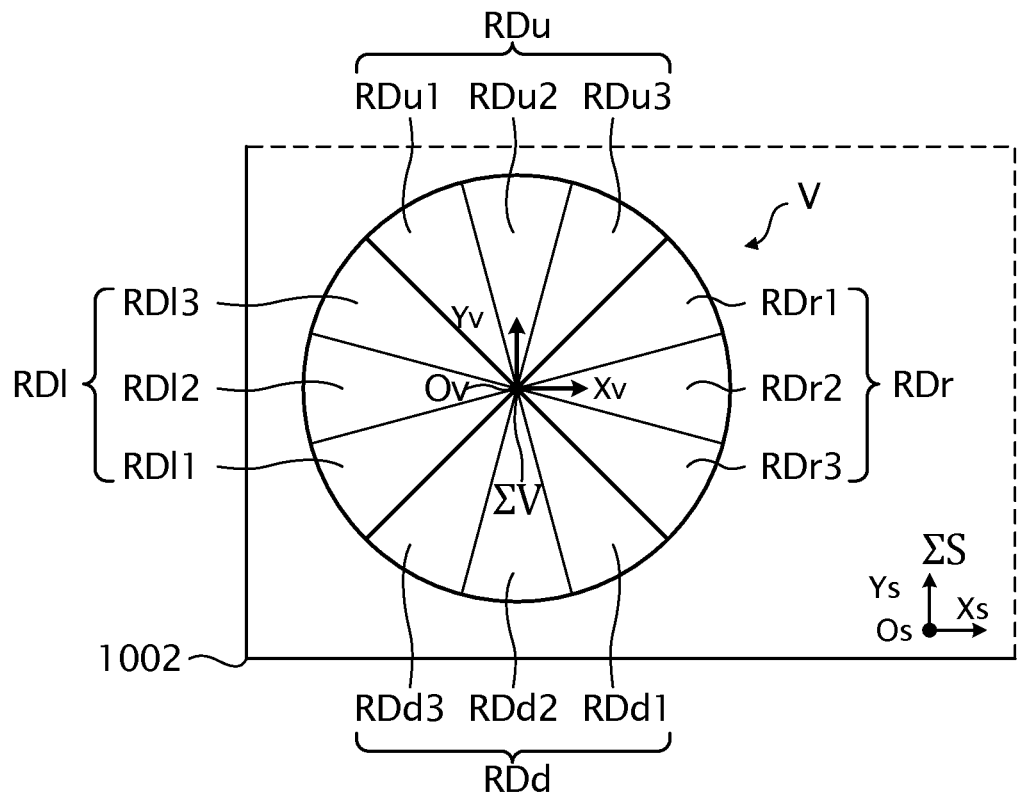
FIG. 19 illustrates an operation region V according to Modification A8.

In the embodiment and the modifications A1 to A7, the input region RD is a region for inputting an instruction in a single direction related to the predetermined game. However, the present invention is not limited to such an aspect. For example, as shown in FIG. 19, each input region RD may include K subregions for inputting instructions in K directions (K is a natural number of two or more). In an example shown in FIG. 19, the input region RDr includes subregions RDr1, RDr2 and RDr3. The input region RDl includes subregions RDl1, RDl2 and RDl3. The input region RDu includes subregions RDu1, RDu2 and RDu3. The input region RDd includes subregions RDd1, RDd2 and RDd3.

Modification A9

Figure 20:
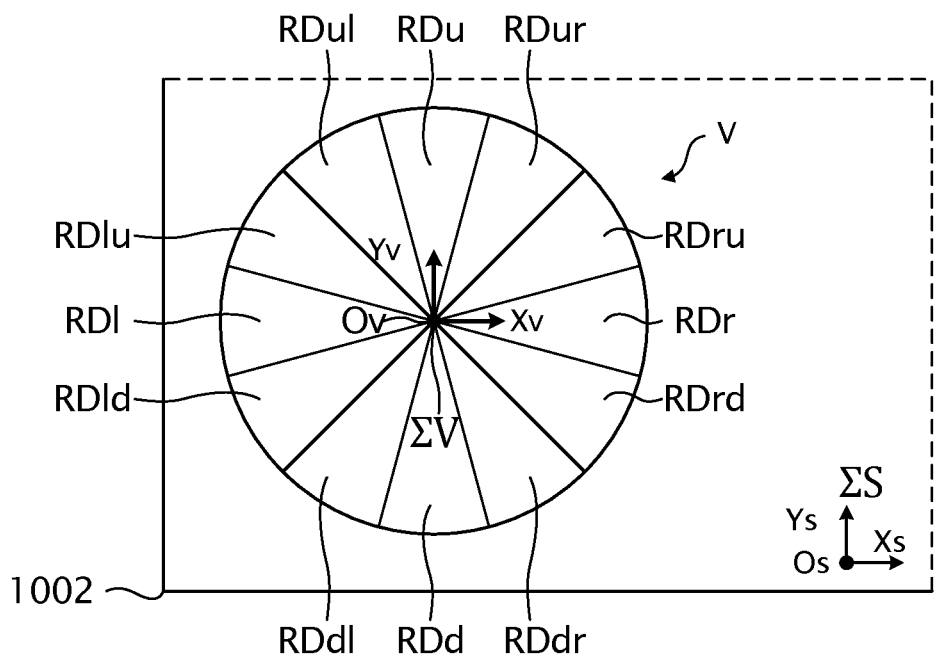
FIG. 20 illustrates an operation region V according to Modification A9.

The embodiment and the modifications A1 to A8 described above exemplify cases in which the operation region V includes four input regions RDs (RDr, RDl, RDu and RDd). However, the present invention is not limited to such an aspect. The operation region V is only required to include M input regions RDs (M is a natural number of two or more). For example, as shown in FIG. 20, the operation region V may include 12 input regions RDs (RDru, RDr, RDrd, RDdr, RDd, RDdl, RDld, RDl, RDlu, RDul, RDu and RDur). In this modification, the number M of input regions may be an even number. In this case, as exemplified in FIG. 20, the input region RDr and the input region RDl may be provided at symmetrical positions with respect to the reference position Ov.

Modification A10

In the embodiment and the modifications A1 to A9 described above, the first direction indicative of the input region RDr from the reference position Ov, and the second direction indicative of the input region RDl from the reference position Ov are opposite directions. However, the present invention is not limited to such an aspect. The angle between the first direction and the second direction may be an angle greater than 0 degrees and less than 180 degrees.

Modification A11

In the embodiment and the modifications A1 to A10, the input region RD is a region for inputting an instruction in the direction in which the face of the character CR is oriented. However, the present invention is not limited to such an aspect. The input region RD may be a region for inputting an instruction related to the predetermined game. For example, the input region RDr may be a region for inputting an instruction for an attack by the character CR in the predetermined game (an example of a "first instruction") The input region RDl may be a region for inputting an instruction for a defense by the character CR in the predetermined game (an example of a "second instruction"). For example, the input region RD may be a region for inputting an instruction for the movement direction of the character CR in the touch panel coordinate system ΣS or the virtual space SP. Specifically, for example, the input region RDr may be a region for inputting an instruction for moving the character CR in one direction in the touch panel coordinate system ΣS or the virtual space SP. The input region RDl may be a region for inputting an instruction for moving the character CR in another direction in the touch panel coordinate system ΣS or the virtual space SP.

Modification A12

In the embodiment and Modifications A1 to A11, description has been given with the program related to the predetermined game being exemplified as the program. However, the present invention is not limited to such an aspect. The program may be a program related to any application. In this case, the first instruction may be any instruction related to any application. The second instruction may be an instruction that is related to this application and is different from the first instruction.

Modification A13

In the embodiment and the modifications A1 to A12, the predetermined game is executed by the terminal apparatus 10. However, the present invention is not limited to such an aspect. The predetermined game may be executed by a configuration element other than the terminal apparatus 10.

Figure 21:
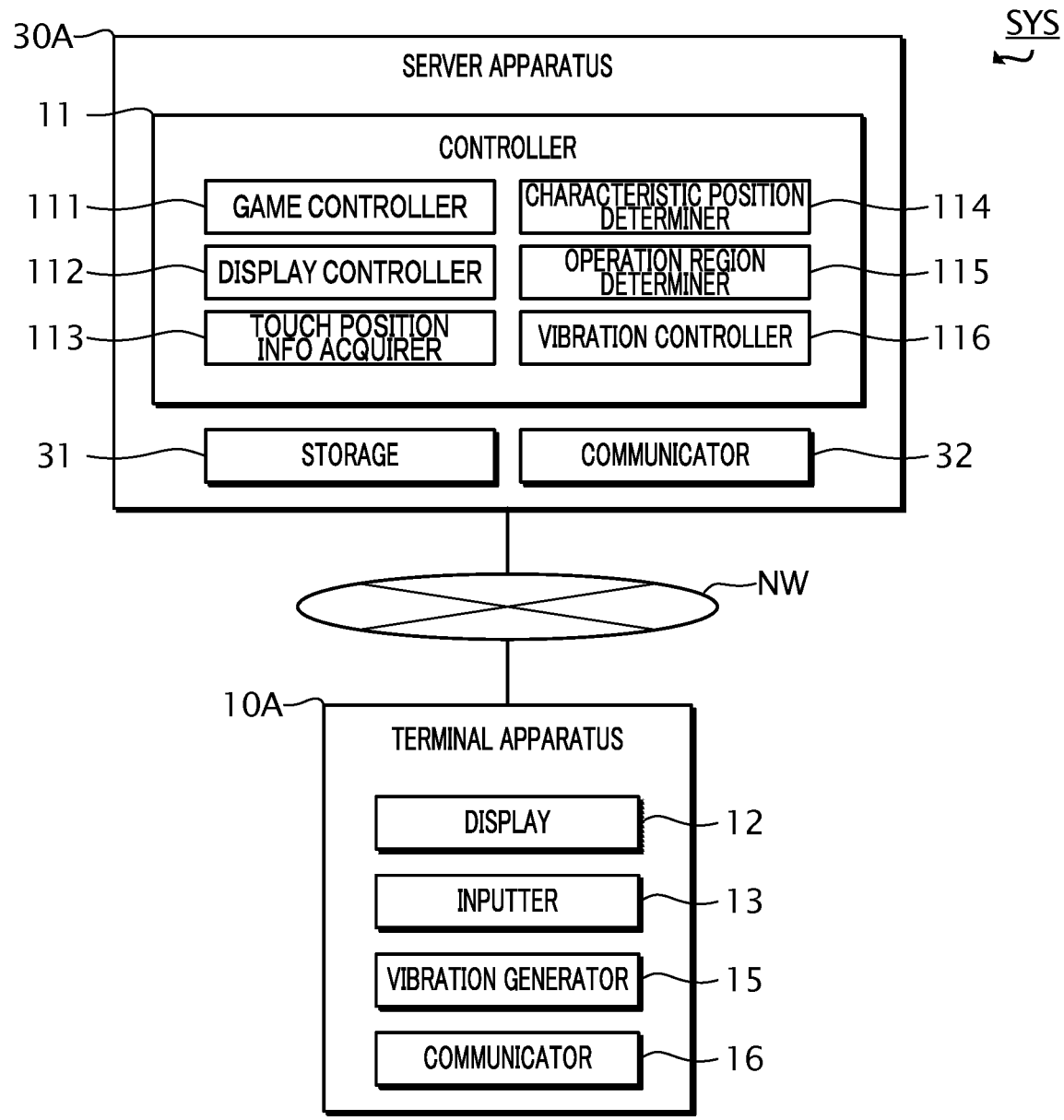
FIG. 21 is a block diagram showing an example of a configuration of an information processing system SYS according to Modification A13.

FIG. 21 illustrates an overview of an information processing system SYS according to this modification. The information processing system SYS includes a server apparatus 30A, and a terminal apparatus 10A. The server apparatus 30A can execute a predetermined game, and can communicate with the terminal apparatus 10A via a network NW. Specifically, the server apparatus 30A includes: a controller 11 that controls each element of the server apparatus 30A; a storage 31 that stores various pieces of information, such as a program related to the predetermined game; and a communicator 32 for executing communication with an external apparatus, such as the terminal apparatus 10A. The terminal apparatus 10A further includes a communicator 16 for executing communication with an external apparatus, such as the server apparatus 30A, in addition to the display 12, the inputter 13 and the vibration generator 15. The display 12 and the inputter 13 are implemented as the touch panel 1002 as described above. The server apparatus 30A generates display information on the basis of information input through the inputter 13 of the terminal apparatus 10A. The display 12 included in the terminal apparatus 10A displays an image related to the predetermined game on the basis of the display information generated in the server apparatus 30A.

B. Second Embodiment

Hereinafter, a second embodiment of the present invention will be described. Elements similar to the elements described in FIGS. 1 to 22 are assigned similar symbols, and detailed description thereof is omitted.

B-1. Overview of Terminal Apparatus

Hereinafter, referring to FIGS. 22 to 25, an example of an overview of the terminal apparatus 10B according to this embodiment will be described. The terminal apparatus 10B is similar to the terminal apparatus 10 according to the first embodiment except that the operation region V, which includes the neutral region RN and the input region RD, is set at a predetermined position on the touch panel 1002 at the start of the predetermined game.

Figure 22:
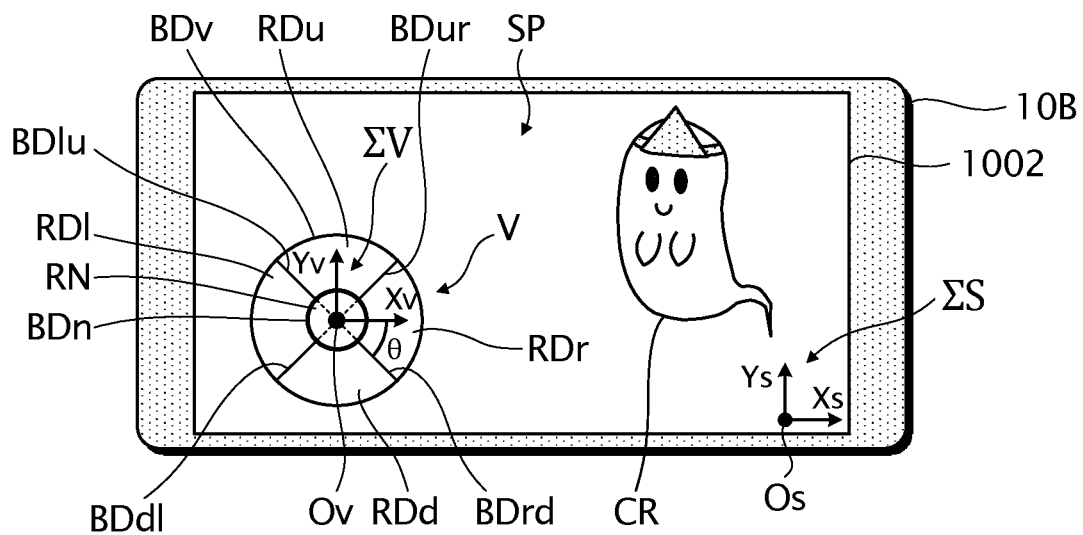
FIG. 22 illustrates an example of an appearance of a terminal apparatus 10B according to a second embodiment of the present invention.

FIG. 22 is a diagram for illustrating an example of the appearance of the terminal apparatus 10B. For example, the terminal apparatus 10B executes a program according to the predetermined game (an example of the "program"), thereby displaying images related to the predetermined game on the touch panel 1002. Specifically, when the terminal apparatus 10B executes the predetermined game, the terminal apparatus 10B displays a virtual space SP related to the predetermined game, a character CR that is present in the virtual space SP, and an operation region V, such as a virtual pad, on the touch panel 1002.

In this embodiment, the operation region V is set on a predetermined position on the touch panel 1002, when the predetermined game is activated. In this embodiment also, the operation region V is not limited to a circle. For example, a left half of a screen of the touch panel 1002 may be set as the operation region V. The operation region V may be a virtual region provided so as to be invisible to the user.

In this embodiment, an example case is assumed in which the operation region V includes: four input regions RDs (RDr, RDl, RDu and RDd) that are regions for inputting an instruction in the direction in which the face of the character CR is oriented in the touch panel coordinate system ΣS; and the neutral region RN that is a region that does not receive an input of an instruction in the direction in which the face of the character CR is oriented. The input region RD may be a region for receiving an instruction in a direction in which the face of the character CR is oriented in the virtual space SP. In this embodiment, the direction in which the face of the character CR is oriented is an example of "an operation direction related to a game". The input region RDr is an example of a "first region". The input region RDl is an example of a "second region". The neutral region RN is an example of a "third region".

In this embodiment, the neutral region RN is arranged between the input region RDr and the input region RDl in a viewable way on the touch panel 1002, but may be arranged between the input region RDr and the input region RDl in an invisible way on the touch panel 1002. The description "the state in which the neutral region RN is arranged between the input region RDr and the input region RDl" refers to a state in which the input region RDr, the input region RDl and the neutral region RN have a positional relationship of having endpoints in the input region RDr and the input region RDl, and allowing a line passing through the neutral region RN to be drawn.

In this embodiment, the terminal apparatus 10B sets the neutral region RN as a region including the reference position Ov, for example. Furthermore, the terminal apparatus 10B sets the input region RDr as a region that is at a position in the +Xv direction from the neutral region RN (an example of the "first direction"). The terminal apparatus 10B sets the input region RDl as a region that is at a position in the −Xv direction from the neutral region RN (an example of the "second direction"). Furthermore, the terminal apparatus 10B sets the input region RDu as a region that is at a position in the +Yv direction from the neutral region RN. The terminal apparatus 10B sets the input region RDd as a region that is at a position in the −Yv direction from the neutral region RN.

More specifically, in this embodiment, the terminal apparatus 10B sets, as the neutral region RN, a region in a circle BDn centered at the reference position Ov. It is to be noted that the circle BDn is smaller than the circle BDv. The terminal apparatus 10B sets, as the input region RDr, a region formed by removing the neutral region RN from a circular sector region enclosed by the following: (i) a line segment BDrd originating from the reference position Ov and extending in a direction inclined from the +Xv direction on the −Yv side by the angle θ; (ii) a line segment BDur originating from the reference position Ov and extending in a direction inclined from the +Xv direction on the +Yv side by the angle θ; and (iii) the circle BDv. The terminal apparatus 10B sets, as the input region RDl, a region formed by removing the neutral region RN from a circular sector region enclosed by the following: (iv) a line segment BDdl originating from the reference position Ov and extending in a direction inclined from the −Xv direction on the −Yv side by the angle θ, (v) a line segment BDlu originating from the reference position Ov and extending in a direction inclined from the −Xv direction on the +Yv side by the angle θ; and (vi) the circle BDv. The terminal apparatus 10B sets, as the input region RDu, a region formed by removing the neutral region RN from a circular sector region enclosed by the line segment BDur, the line segment BDlu and the circle BDv. The terminal apparatus 10B sets, as the input region RDd, a region formed by removing the neutral region RN from a circular sector region enclosed by the line segment BDrd, the line segment BDdl and the circle BDv.

In this embodiment, an example case is assumed in which the angle θ is 45 degrees. The angle θ may be greater than 0 degrees and less than 90 degrees. In this embodiment, the angle between the line segment BDrd and the line segment BDur is equal to the angle between the line segment BDdl and the line segment BDlu. However, the angle between the line segment BDrd and the line segment BDur may differ from the angle between the line segment BDdl and the line segment BDlu. Next, referring to FIGS. 23 to 25, an overview of operations using the operation region V will be described.

Figure 23:
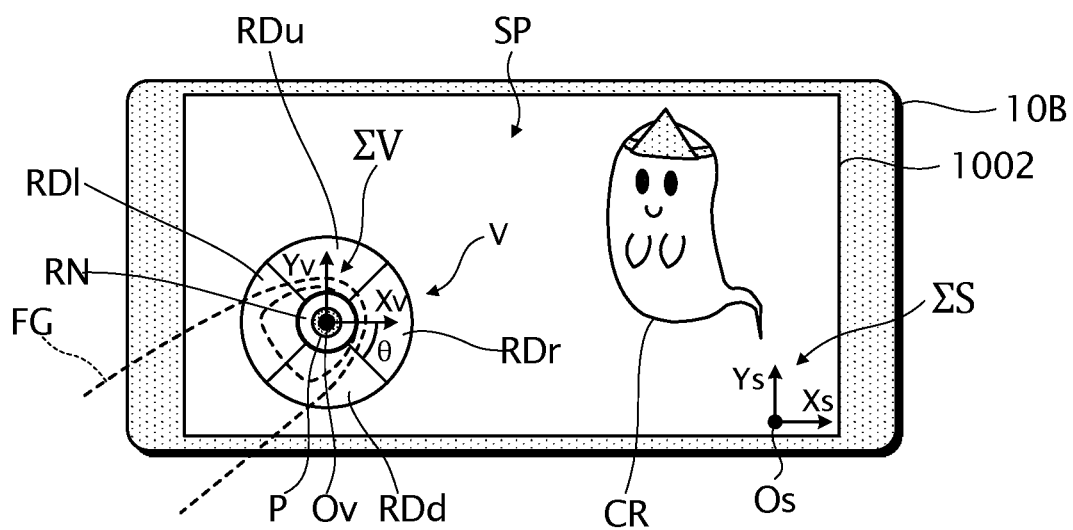
FIG. 23 illustrates an example of an appearance of the terminal apparatus 10B when a touching of the operation region V is carried out.

FIG. 23 is a diagram for illustrating an example of the appearance of the terminal apparatus 10B when a touching of the operation region V is carried out. The user is able to change the orientation of the face of the character CR by touching any region among the input regions RDr, RDl, RDu and RDd in the operation region V. In this embodiment, in a case in which the neutral region RN is touched with finger FG in a predetermined game, the terminal apparatus 10B performs processes similar to those in a case in which finger FG is away from the touch panel 1002.

For example, in a case in which finger FG is away from the touch panel 1002 and then the direction in which the face of the character CR is oriented in the touch panel coordinate system ΣS is maintained in the same direction as that before finger FG was moved away from the touch panel 1002, the direction in which the face of the character CR is oriented is not changed even when the neutral region RN is touched with finger FG. In the example shown in FIG. 23, the first touch after activation of the predetermined game is a touch with the neutral region RN. In this case, the orientation of the face of the character CR is maintained in the orientation shown in FIG. 22 (the front direction in the touch panel coordinate system ΣS). That is, when the touch position P of finger FG is in the neutral region RN, the orientation of the face of the character CR is maintained in an orientation identical to the orientation before the user touches the neutral region RN with the finger FG. It is to be noted that there is a case in which finger FG is away from the touch panel 1002 and the orientation of the face of the character CR in the touch panel coordinate system ΣS is set in a predetermined orientation (e.g., the front direction in the touch panel coordinate system ΣS). In this case, the orientation of the face of the character CR is set in the predetermined orientation when the neutral region RN is touched with the finger FG. Hereinafter, a process executed when finger FG moves away from the touch panel 1002 is also called a non-touch process.

Figure 24:
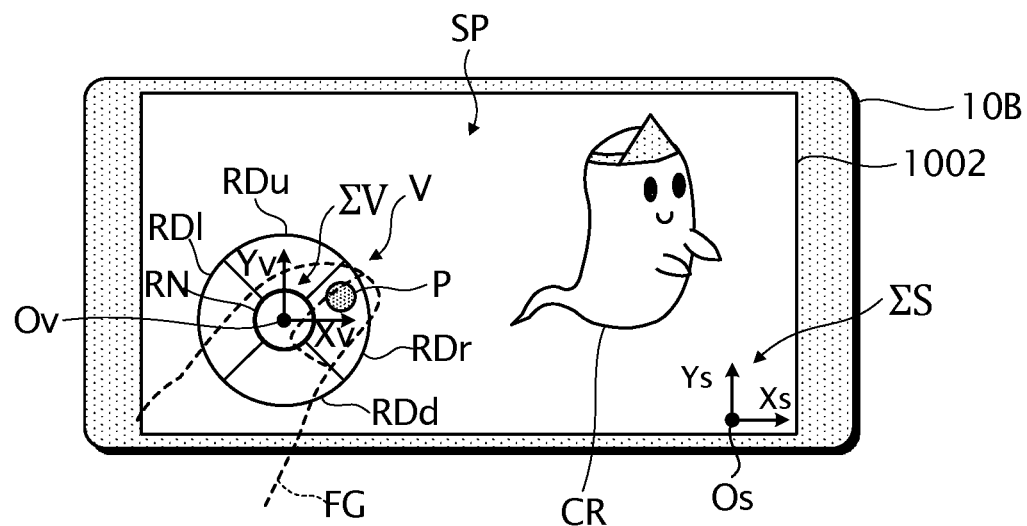
FIG. 24 illustrates an example of an appearance of the terminal apparatus 10B when a touching of an input region RDr is carried out.
Figure 25:
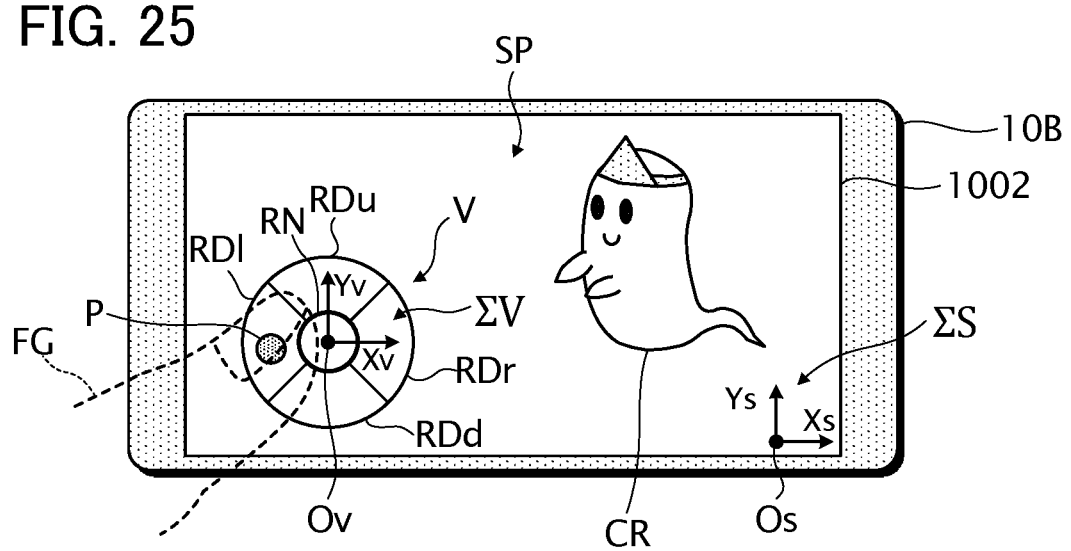
FIG. 25 illustrates an example of an appearance of the terminal apparatus 10B when a touching of an input region RDl is carried out.

After the neutral region RN is touched by finger FG, for example, the user inclines finger FG while maintaining the state in which finger FG is in contact with the touch panel 1002, thereby allowing touching any region among the input regions RDr, RDl, RDu and RDd in the operation region V. As shown in FIGS. 24 and 25, when the touch position P of finger FG is in the input region RD, the terminal apparatus 10B receives an instruction for orienting the face of the character CR in a direction that is in the touch panel coordinate system ΣS and is the direction corresponding to the input region RD where the touch position P is present. Operations of the terminal apparatus 10B when the touch position P is in the input region RD are similar to those of the terminal apparatus 10 according to the first embodiment. Accordingly, in this embodiment, detailed description of the operations of the terminal apparatus 10B when the touch position P is in the input region RD is omitted.

FIG. 24 illustrates an example of the appearance of the terminal apparatus 10B when a touching of the input region RDr is carried out. In the example shown in FIG. 24, the touch position P is in the input region RDr. Accordingly, the character CR of the face being oriented in the +Xs direction is displayed on the touch panel 1002.

FIG. 25 illustrates an example of the appearance of the terminal apparatus 10B when a touching of the input region RDl is carried out. In the example shown in FIG. 24, the touch position P is in the input region RDl. Accordingly, the character CR of the face being oriented in the +Xs direction is displayed on the touch panel 1002.

B-2. Configuration of Terminal Apparatus

Hereinafter, referring to FIG. 26, an example of the configuration of the terminal apparatus 10B will be described.

Figure 26:
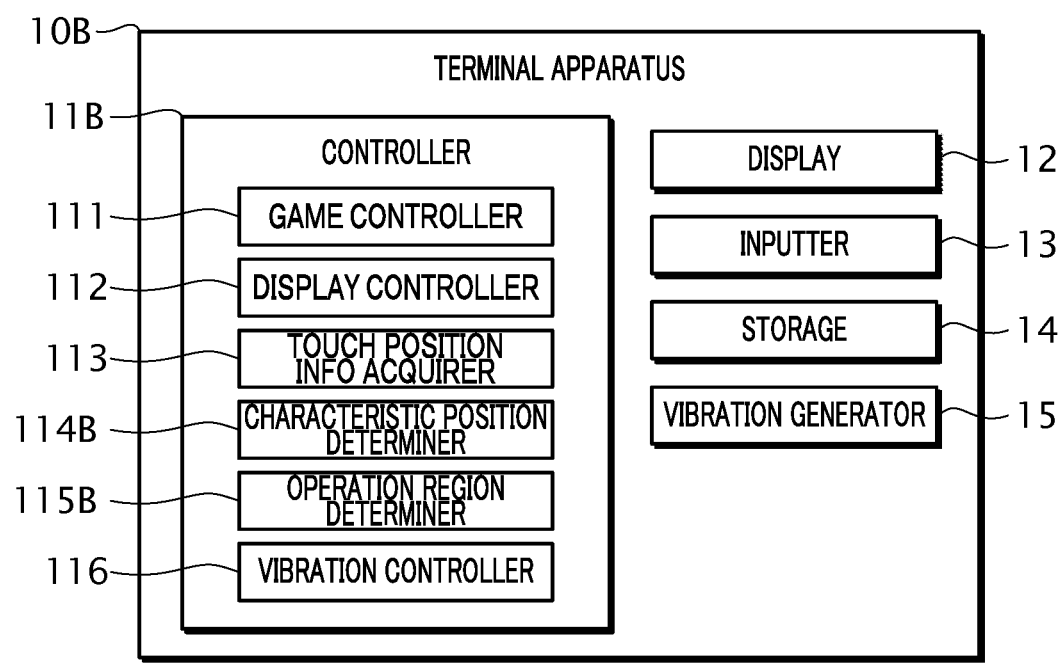
FIG. 26 is a block diagram showing an example of a configuration of the terminal apparatus 10B.

FIG. 26 is a functional block diagram showing the example of the configuration of the terminal apparatus 10B. The terminal apparatus 10B is similar to the terminal apparatus 10 shown in FIG. 5 except that the terminal apparatus 10B includes a controller 11B instead of the controller 11 shown in FIG. 5.

For example, the terminal apparatus 10B includes a controller 11B that controls each element of the terminal apparatus 10B, a display 12 for displaying an image, an inputter 13 that receives an input of an instruction by the user of the terminal apparatus 10B, a storage 14 that stores various pieces of information, and a vibration generator 15 that vibrates the terminal apparatus 10B.

The storage 14 stores various pieces of information that include the program related to the predetermined game, the touch position history information, the characteristic position information, and the operation region information. In this embodiment, the operation region information includes not only information indicative of the position of the input region RD in the touch panel coordinate system ΣS, but also information indicative of the position of the neutral region RN in the touch panel coordinate system ΣS. The vibration generator 15 vibrates the entire terminal apparatus 10B including the touch panel 1002.

The controller 11B includes a game controller 111, a display controller 112, a touch position information acquirer 113 (an example of an "acquirer"), a characteristic position determiner 114B (an example of a "characteristic position determiner"), an operation region determiner 115B (an example of an "arrangement determiner"), and a vibration controller 116. That is, the controller 11B includes the characteristic position determiner 114B instead of the characteristic position determiner 114 shown in FIG. 5, and includes the operation region determiner 115B instead of the operation region determiner 115 shown in FIG. 5. The other functions of the controller 11B are similar to the functions of the controller 11 shown in FIG. 5. Accordingly, referring to FIG. 26, description is given mainly on the characteristic position determiner 114B and the operation region determiner 115B.

When the touch position P, which is indicated by the touch position information acquired by the touch position information acquirer 113, is in any of the input regions RDr and RDl in a touch period, the touch period being a period during which finger FG of the user is kept in contact with the touch panel 1002, the characteristic position determiner 114B determines the characteristic position CP on the basis of the touch position P. The operation region determiner 115B determines the position of the neutral region RN on the touch panel 1002 on the basis of the characteristic position CPr and the characteristic position CPl determined by the characteristic position determiner 114B. The operation region determiner 115B determines the position of the operation region V on the touch panel 1002 on the basis of the characteristic position CPr and the characteristic position CPl.

The configuration of the terminal apparatus 10B is not limited to the example shown in FIG. 26. The hardware configuration of the terminal apparatus 10B is similar to the hardware configuration of the terminal apparatus 10 shown in FIG. 6.

B-3. Relationship Between Touch Position and Operation Region

Hereinafter, referring to FIGS. 27 to 30, an example of the relationship between the touch position P of finger FG and the operation region V on the touch panel 1002 will be described.

FIGS. 27 to 30 are diagrams for illustrating an example of change (touch position changing example) of the relationship between the touch position P of the finger FG on the touch panel 1002 and the operation region V set on the touch panel 1002 in a period from the time t0 to the time t10. Also in the touch position changing example shown in FIGS. 27 to 30, for the sake of illustration, the time t1 and the like are used irrespective of the time tin the touch position changing example shown in FIGS. 7 to 10.

The touch position changing example shown in FIGS. 27 to 30 assumes a case in which the predetermined game is activated at the time t0, and touch-in is made with finger FG at the touch position P[t1] in the neutral region RN at the time t1, as the first touch after activation of the predetermined game. The touch position changing example shown in FIGS. 27 to 30 and the like assumes a case in which finger FG moves from the touch position P[tn] to the touch position P[t(n+1)] while being in contact with the touch panel 1002, from the time t0 to a time t(n+1) (n is a natural number of one or more). First, referring to FIG. 27, an overview of operations of the terminal apparatus 10B from activation of the predetermined game to an entrance of the touch position P into the input region RDr will be described.

Figure 27:
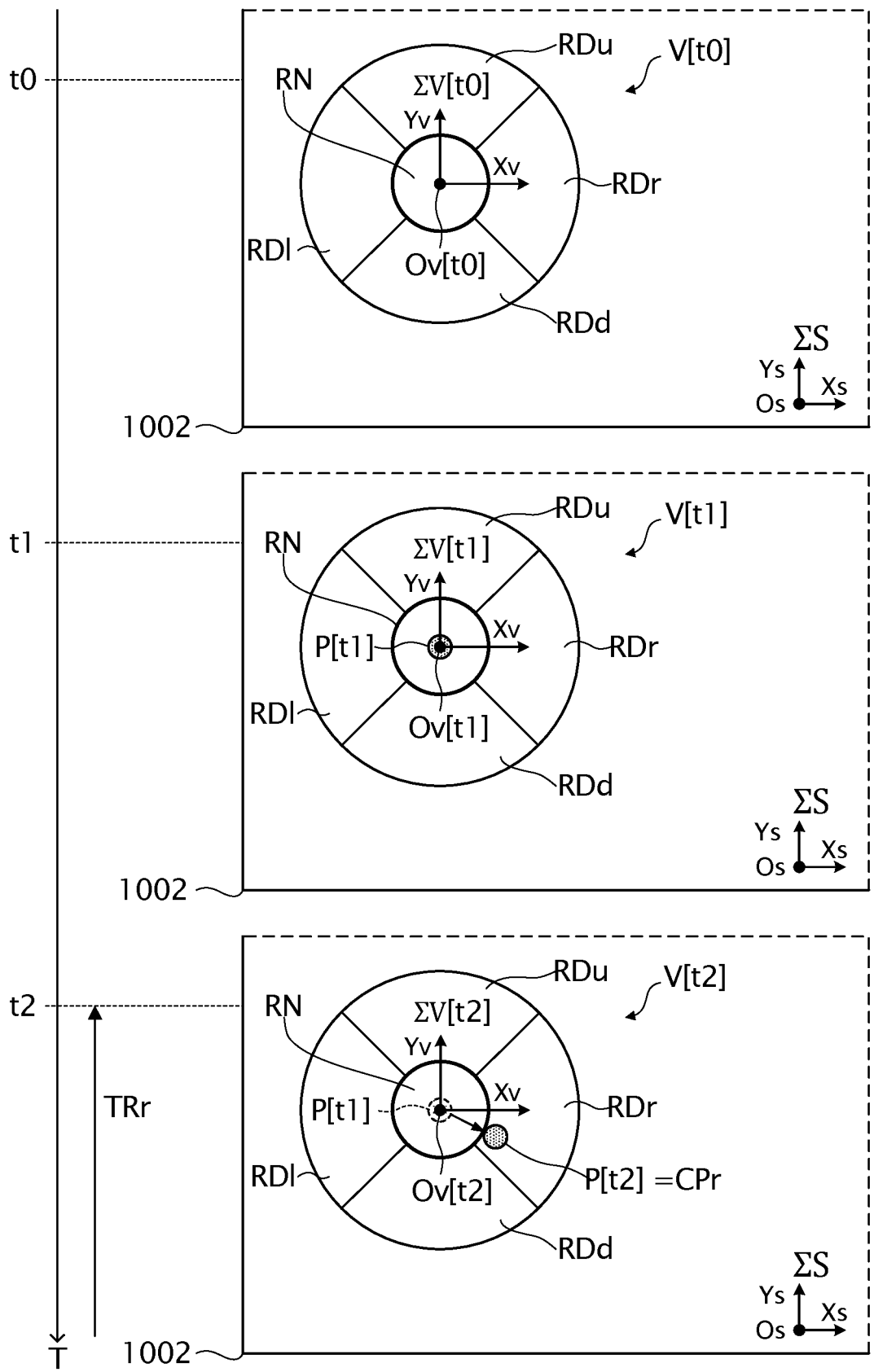
FIG. 27 illustrates an example of operations of the terminal apparatus 10B from activation of a predetermined game to an entrance of a touch position P into the input region RDr.

FIG. 27 is a diagram for illustrating an example of operations of the terminal apparatus 10B from activation of the predetermined game to an entrance of a touch position P into the input region RDr.

Since the predetermined game is activated at the time to, the operation region determiner 115B sets an operation region coordinate system ΣV[t0] with a predetermined position being adopted as a reference position Ov[t0]. Then, the operation region determiner 115B sets an operation region V[t0] including the neutral region RN and the input regions RDr, RDl, RDu and RDd at a position corresponding to the reference position Ov[t0]. The operation region determiner 115B stores, in the storage 14, the positions of the neutral region RN and the input region RD included in the operation region V, as operation region information.

At the time t1, as the first touch after activation of the predetermined game, the touch position P[t1] in the neutral region RN is subjected to touch-in by finger FG. That is, the touch period during which finger FG of the user is kept in contact with the touch panel 1002 is started at the time t1. The touch position P[t1] is in the neutral region RN. Accordingly, the operation region determiner 115B maintains the position of the operation region V[t1] at the same position as that of the operation region V[t0]. For example, the operation region determiner 115B sets the reference position Ov[t1] and the operation region coordinate system ΣV[t1] such that the operation region V[t1] and the operation region V[t0] are at the same position.

From the time t1 to the time t2, the touch position P moves from the touch position P[t1] in the neutral region RN to the touch position P[t2] in the input region RDr. In the example shown in FIG. 27, at the time t2, the touch position P enters the input region RDr. That is, the input region touch period TRr, during which the state of the touch position P being in the input region RDr is continued, is started from the time t2.

In this embodiment, for example, the characteristic position determiner 114B determines whether to identify the position based on the latest touch position P in the input region RDr as the characteristic position CPr, or to maintain the current characteristic position CPr without update, on the basis of the touch position P. Then, the characteristic position determiner 114B determines the characteristic position CPr according to the determination result. For example, the "first condition" described in the touch position changing example shown in FIGS. 7 to 10 is used as a condition for updating the characteristic position CPr.

In the example shown in FIG. 27, the input region touch period TRr is started at the time t2. Consequently, at the time t2, the touch position P[t2] in the input region touch period TRr is at a position farthest in the +Xv direction from the reference position Ov. Accordingly, the characteristic position determiner 114B determines the touch position P[t2] as the characteristic position CPr at the time t2.

At the time t2, the characteristic position CPr is identified, but the characteristic position CPl is not identified. Accordingly, the operation region determiner 115B sets the reference position Ov[t2] and the operation region coordinate system V[t2] such that the operation region V[t2] and the operation region V[t1] are at the same position. Next, referring to FIG. 28, an overview of operations of the terminal apparatus 10B from identification of the characteristic position CPr to an entrance of the touch position P into the input region RDl will be described.

Figure 28:
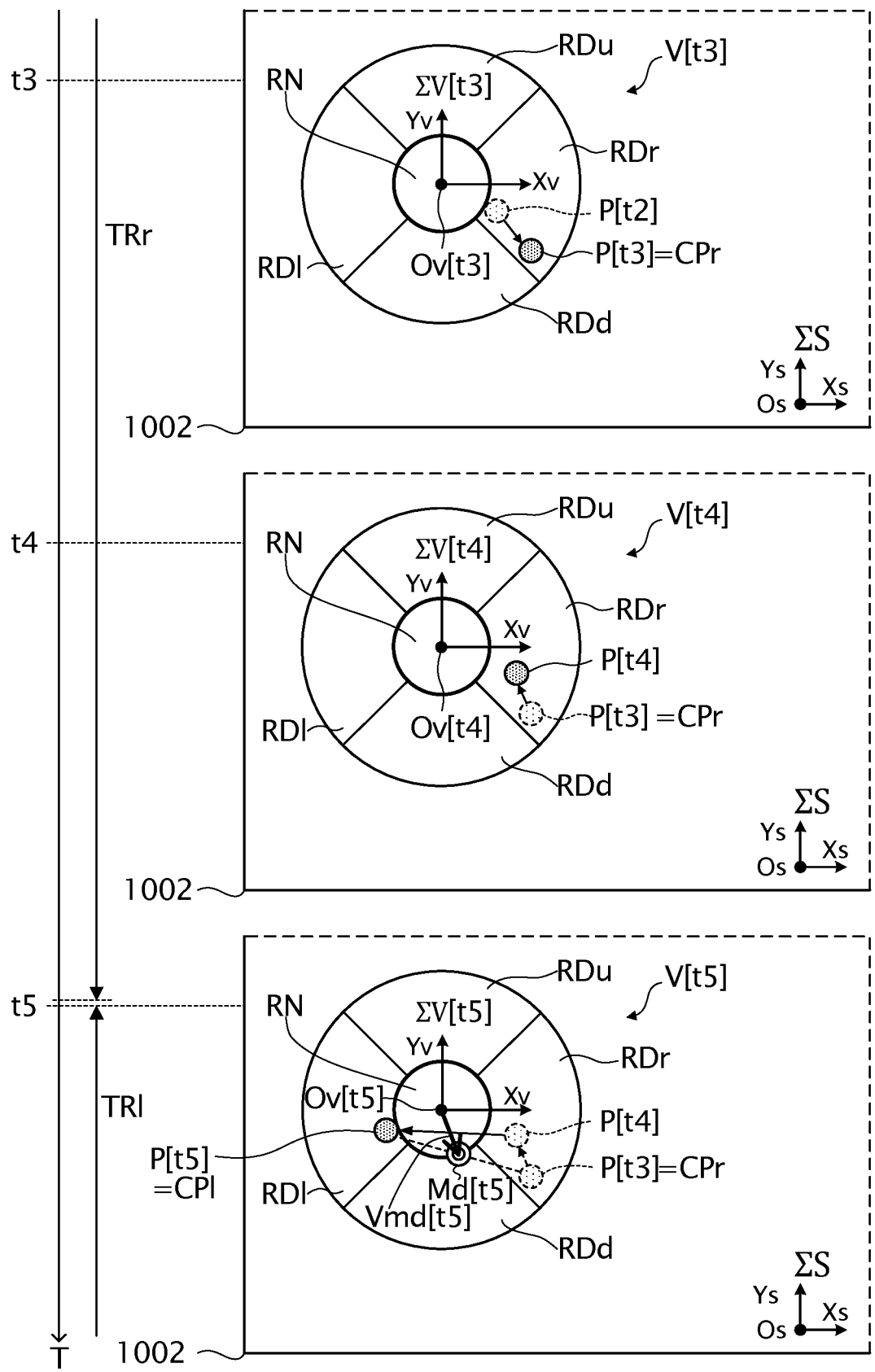
FIG. 28 illustrates an example of operations of the terminal apparatus 10B from identification of a characteristic position CPr to an entrance of the touch position P into the input region RDl.

FIG. 28 is a diagram for illustrating an example of operations of the terminal apparatus 10B from identification of the characteristic position CPr to the entrance of the touch position P into the input region RDl. FIG. 28 shows the continuation of the operations shown in FIG. 27.

From the time t2 to the time t3, the touch position P moves from the touch position P[t2] in the input region RDr to the touch position P[t3] in the input region RDr. Since the touch position P[t3] at the time t3 is present farther on the +Xv side than the touch position P[t2] in the input region RDr, the first condition is satisfied. Accordingly, the characteristic position determiner 114B determines the touch position P[t3] as the characteristic position CPr at the time t3. In other words, the characteristic position determiner 114B updates the characteristic position CPr from the touch position P[t2] to the touch position P[t3] at the time t3. Also at the time t3, the characteristic position CPl is not identified. Accordingly, the operation region determiner 115B sets the reference position Ov[t3] and the operation region coordinate system V[t3] such that the operation region V[t3] and the operation region V[t2] are at the same position.

From the time t3 to the time t4, the touch position P moves from the touch position P[t3] in the input region RDr to the touch position P[t4] in the input region RDr. Since the touch position P[t4] at the time t4 is present farther on the −Xv side than the characteristic position CPr (touch position P[t3]). In other words, the touch position P[t3] is positioned farther on the +Xv side than the touch position P[t2] and the touch position P[t4]. Accordingly, the characteristic position determiner 114B maintains the state in which the touch position P[t3] is identified as the characteristic position CPr at the time t4. Also at the time t4, the characteristic position CPl is not identified. Accordingly, the operation region determiner 115B sets the reference position Ov[t4] and the operation region coordinate system ΣV[t4] such that the operation region V[t4] and the operation region V[t3] are the same position.

From the time t4 to the time t5, the touch position P moves from the touch position P[t4] in the input region RDr toward the touch position P[t5] in the input region RDl. In the example shown in FIG. 28, at the time t5, the touch position P enters the input region RDl. That is, the input region touch period TRl during which the state of the touch position P being in the input region RDl is continued is started from a time t5. The input region touch period TRr finishes at a time (a time at which the touch position P enters the neutral region RN) between the time t4 and the time t5.

In an example of this embodiment, the characteristic position determiner 114B determines whether to identify the position based on the latest touch position P in the input region RDl as the characteristic position CPl, or to maintain the current characteristic position CPl without update, on the basis of the touch position P. Then, the characteristic position determiner 114B determines the characteristic position CPl according to the determination result. For example, the "second condition" described in the touch position changing example shown in FIGS. 7 to 10 is used as a condition for updating the characteristic position CPl.

In the example shown in FIG. 28, the input region touch period TRl is started at the time t5. Consequently, at the time t5, the touch position P[t5] in the input region touch period TRl is at a position farthest in the −Xv direction from the reference position Ov. That is, the touch position P[t5] at the time t5 satisfies the second condition. Accordingly, the characteristic position determiner 114B determines the touch position P[t5] as the characteristic position CPl at the time t5.

In some cases, after the touch position P moves from one input region RD to another input region RD, the touch position P reenters the one input region RD. For example, in some cases, after completion of one input region touch period TRr, during which the touch position P is in the input region RDr, another input region touch period TRr, during which the touch position P is in the input region RDr, is started again. In this case, during a period from completion of the one input region touch period TRr to start of the other input region touch period TRr, the characteristic position determiner 114B maintains a determination result of the characteristic position CPr at the time of completion of the one input region touch period TRr. In this case, when the other input region touch period TRr is started, the characteristic position determiner 114B discards the determination result of the characteristic position CP at the time of completion of the one input region touch period TRr. In addition, the characteristic position determiner 114B determines a new characteristic position CP in the other input region touch period TRr. A process of updating the characteristic position CPl when the touch position P reenters the input region RDl is similar to the process of updating the characteristic position CPr when the touch position P reenters the input region RDr.

In this embodiment, if the touch position P moves from one input region RD to the neutral region RN and subsequently reenters the one input region RD without entrance into another input region RD, the determination result of the characteristic position CP at completion of the one input region touch period TR is not discarded. In this case, when reentrance of the touch position P into one input region RD starts another input region touch period TR, the characteristic position determiner 114B determines the characteristic position CP on the basis of the following: the touch position P; and the determination result of the characteristic position CP at completion of the one input region touch period TR.

In the example shown in FIG. 28, the characteristic position determiner 114B determines the touch position P[t3] at the time t3 as the characteristic position CPr at the completion of the input region touch period TRr. Accordingly, also at the time t5 after completion of the input region touch period TRr, the storage 14 maintains the state in which the characteristic position information indicative of the touch position P[t3] as the characteristic position CPr.

Also in this embodiment, the operation region determiner 115B corrects the position of the operation region V on the basis of the characteristic position CPr and the characteristic position CPl, as described above. The method of correcting the position of the operation region V is similar to that of the first embodiment.

In this embodiment, the center of the neutral region RN (the center of the circle BDn indicative of the boundary between the neutral region RN and the input region RD) is the reference position Ov. Accordingly, the operation region determiner 115B corrects the position of the reference position Ov, thereby allowing the position of the neutral region RN to be corrected. In this embodiment, the size of the neutral region RN (e.g., the radius of the circle BDn) is maintained to be a predetermined size, and is not changed before and after correction of the position of the neutral region RN. When the operation region determiner 115B corrects the position of the operation region V, this determiner updates the operation region information stored in the storage 14, with the positions of the neutral region RN and the input region RD included in the operation region V.

For example, at the time t5, the operation region determiner 115B defines, as the corrected position Md[t5], the midpoint between the characteristic position CPr (touch position P[t3]) and the characteristic position CPl (touch position P[t5]). The operation region determiner 115B further defines an operation region motion vector Vmd[t5] having an initial point that is the reference position Ov[t5] and a terminal point that is the corrected position Md[t5]. The operation region determiner 115B then corrects the position of the operation region V such that the reference position Ov coincides with the corrected position Md[t5], at the time t6 shown in FIG. 29.

In this embodiment, the method of correcting the reference position Ov is not limited to the method of moving the reference position Ov by the movement amount corresponding to the operation region motion vector Vmd.

In this embodiment, the operation region determiner 115B may define, as the corrected position Md, a position defined by the characteristic position CPr and the characteristic position CPl. For example, provided that (i) a characteristic position CP determined first between the characteristic position CPr and the characteristic position CPl is called a former-identified characteristic position, and (ii) a characteristic position identified later between the characteristic position CPr and the characteristic position CPl is called a latter-identified characteristic position, the operation region determiner 115B may define, as the corrected position Md, a position closer to the latter-identified characteristic position than the former-identified characteristic position. In this example, since the corrected position Md is provided adjacent to the latest touch position P of finger FG, the circular neutral region RN centered at the corrected position Md is also provided adjacent to the latest touch position P. Accordingly, in a case in which the corrected position Md is provided at a position closer to the latter-identified characteristic position than the former-identified characteristic position, there can be a smaller amount of movement of finger FG in a case of changing the touch position P from the input region RD corresponding to the latter-identified characteristic position to the neutral region RN, in comparison with the case in which the corrected position Md is set at a position closer to the former-identified characteristic position than the latter-identified characteristic position. That is, in this example, in comparison with the case in which the corrected position Md is set at a position closer to the former-identified characteristic position than the latter-identified characteristic position, there can be favorably maintained the operability of moving the finger FG such that the touch position P reciprocates between the input region RDl and the neutral region RN.

For example, the operation region determiner 115B may define the following position as the corrected position Md. The position has an interval with the latter-identified characteristic position that is equal to or wider than a predetermined reference interval among (i) positions that are on a line segment connecting the characteristic position CPr and the characteristic position CPl or (ii) positions that are in the reference region and are closer to the latter-identified characteristic position than the former-identified characteristic position. In this case, the interval between the latest touch position P and the neutral region RN that are in the input region RD corresponding to the latter-identified characteristic position can be secured to be at least the size of an interval defined by the predetermined reference interval and the neutral region RN (e.g., the radius of the circle BDn). Accordingly, in this example, in comparison with a case in which the interval between the corrected position Md and the latter-identified characteristic position is less than the predetermined reference interval, there is a reduced probability of occurrence of an unintended operation input when the user accidentally touches finger FG on the neutral region RN instead of the input region RD intended by the user. The predetermined reference interval may is be defined by the absolute value of a distance, or may be defined by the ratio of (iii) the distance between the corrected position Md and the latter-identified characteristic position to (iv) the distance between the characteristic position CPr and the characteristic position CPl. Next, referring to FIG. 29, an overview of operations of the terminal apparatus 10B will be described in which position correction of the operation region V is repeated according to an update of the characteristic position CPl.

Figure 29:
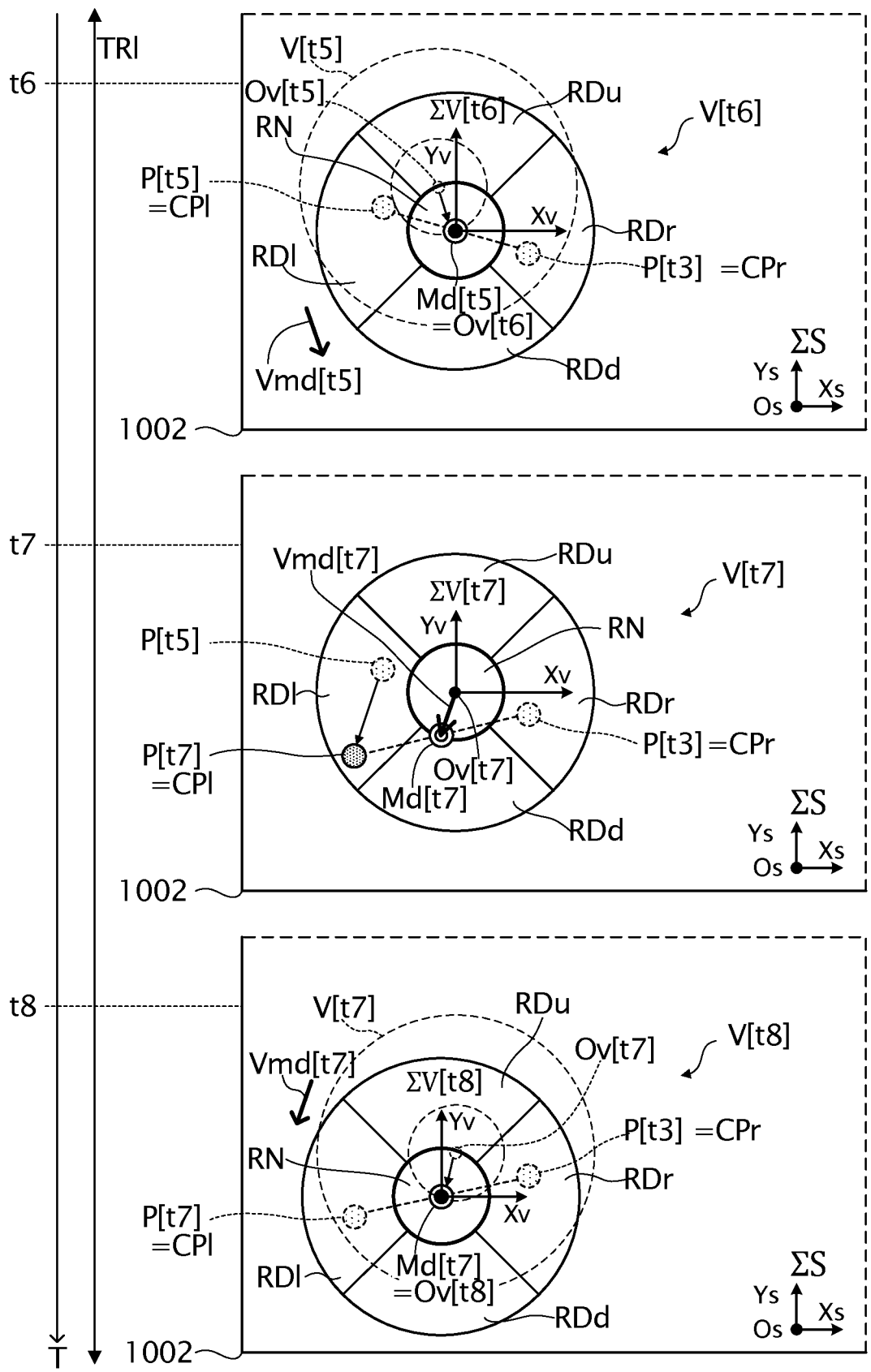
FIG. 29 illustrates an example of operations of the terminal apparatus 10B when position correction of the operation region V is repeated according to an update of the characteristic position CPl.

FIG. 29 is a diagram for illustrating an example of operations of the terminal apparatus 10B in which the position correction of the operation region V is repeated according to an update of the characteristic position CPl. FIG. 29 shows the continuation of the operations shown in FIG. 28.

At the time t6, the operation region determiner 115 sets the position of the terminal point of the operation region motion vector Vmd[t5] as the reference position Ov[t6], where the position of the terminal point refers to a position that is in the case in which the position of the initial point of the operation region motion vector Vmd[t5] is defined as the reference position Ov[t5]. Then, the operation region determiner 115 sets the operation region coordinate system ΣV[t6] such that the reference position Ov[t6] is set as the origin. The operation region determiner 115B sets the operation region V[t6] at a position corresponding to the operation region coordinate system ΣV[t6] at the time t6. The operation region determiner 115B then updates the operation region information stored in the storage 14, with the positions of the neutral region RN and the input region RD included in the operation region V[t6]. In the example shown in FIGS. 28 and 29, the time t6 is a time after the time t5, but the time t6 may be a time identical to the time t5.

From the time t6 to the time t7, the touch position P moves from the touch position P[t5] in the input region RDl to the touch position P[t7] in the input region RDl. The touch position P[t7] at the time t7 is present farther on the −Xv side than the touch position P[t5] in the input region RDl. Accordingly, the characteristic position determiner 114B determines the touch position P[t7] as the characteristic position CPl at the time t7. In other words, the characteristic position determiner 114B updates the characteristic position CPl from the touch position P[t5] to the touch position P[t7] at the time t7.

At the time t7, the operation region determiner 115B defines, as the corrected position Md[t7], the midpoint between the characteristic position CPr (touch position P[t3]) and the characteristic position CPl (touch position P[t7]). The operation region determiner 115B further defines an operation region motion vector Vmd[t7] having an initial point that is the reference position Ov[t7] and a terminal point that is the corrected position Md[t7].

At the time t8, the operation region determiner 115B moves the reference position Ov[t7], the operation region coordinate system ΣV[t7] and the operation region V[t7] by a movement amount corresponding to the operation region motion vector Vmd[t7], thereby setting the reference position Ov[t8], the operation region coordinate system V[t8] and the operation region V[t8]. In other words, the operation region determiner 115B sets the reference position Ov[t8], the operation region coordinate system V[t8] and the operation region V[t8] such that the reference position Ov[t8] coincides with the corrected position Md[t7]. In the example shown in FIG. 29, the time t8 is a time after the time t7, but the time t8 may be a time identical to the time t7. Next, referring to FIG. 30, an overview of the operations of the terminal apparatus 10B when the touch position P reenters the input region RDr will be described.

Figure 30:
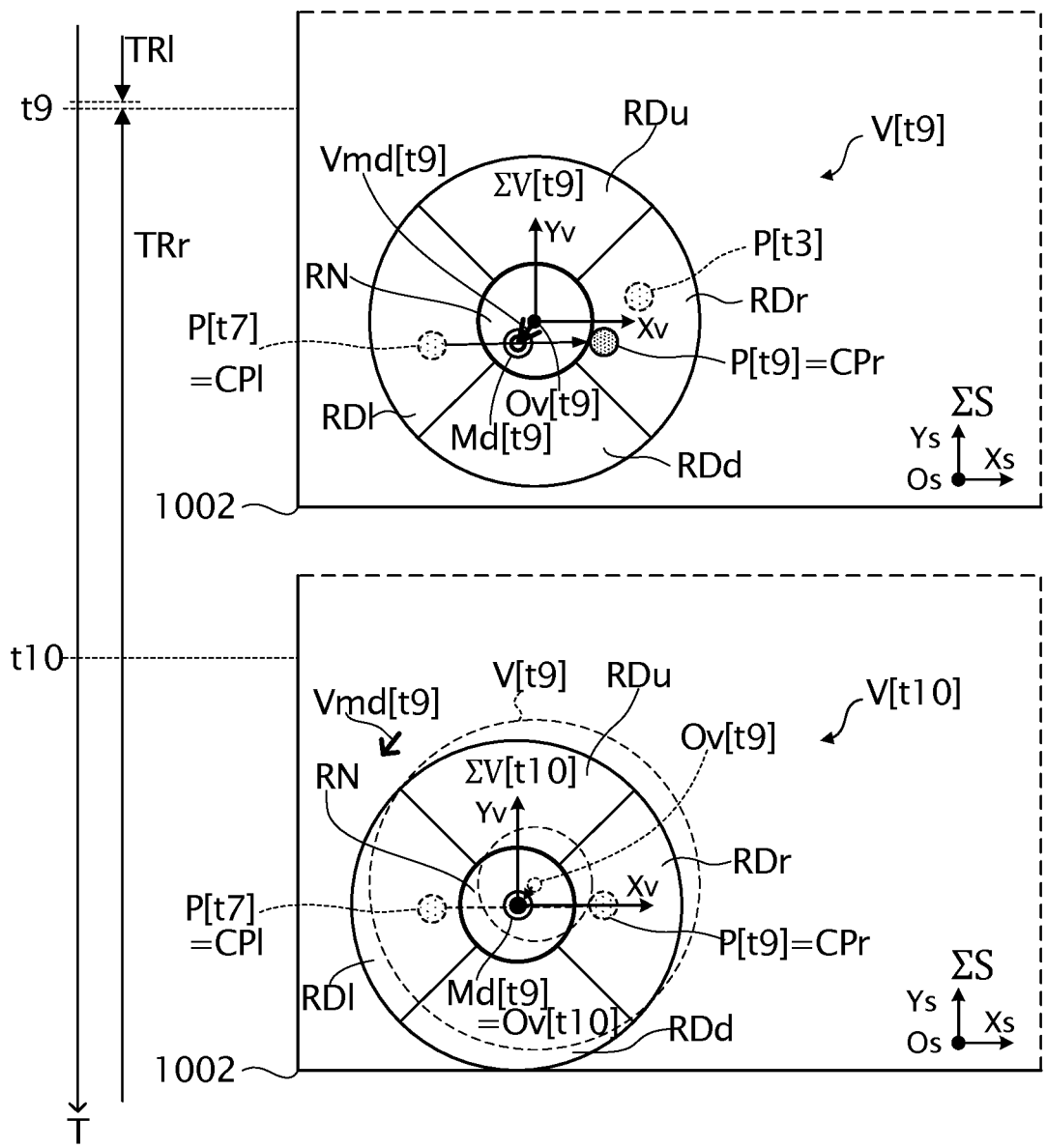
FIG. 30 illustrates an example of operations of the terminal apparatus 10B when the touch position P reenters the input region RDr.

FIG. 30 is a diagram for illustrating an example of the operations of the terminal apparatus 10B when the touch position P reenters the input region RDr. Note that FIG. 30 shows the continuation of the operations shown in FIG. 29.

From the time t8 to the time t9, the touch position P moves from the touch position P[t7] in the input region RDl toward the touch position P[t9] in the input region RDr. In the example shown in FIG. 30, at the time t9, the touch position P reenters the input region RDr. That is, the input region touch period TRl finishes at a time (a time when the touch position P enters the neutral region RN) between the time t8 to the time t9, and an input region touch period TRr is restarted at the time t9. Hereinafter, for the sake of illustration, the input region touch period TRr started at the time t2 is called a former input region touch period TRr, in some cases. The input region touch period TRr started at the time t9 is called a latter input region touch period TRr, in some cases.

As described above, in this embodiment, when the latter input region touch period TRr is started, the characteristic position determiner 114B discards the determination result of the characteristic position CPr at the time of completion of the former input region touch period TRr. In addition, the characteristic position determiner 114B determines a new characteristic position CPr in the latter input region touch period TRr. Accordingly, at the time t9, the touch position P[t9] is present farther on the −Xv side than the touch position P[t3]. The characteristic position determiner 114B determines the touch position P[t9] as the characteristic position CPr. In other words, the characteristic position determiner 114B updates the characteristic position CPr from the touch position P[t3] to the touch position P[t9] at the time t9.

At the time t9, the operation region determiner 115B defines, as the corrected position Md[t9], the midpoint between the characteristic position CPr (touch position P[t9]) and the characteristic position CPl (touch position P[t7]). The operation region determiner 115B further defines an operation region motion vector Vmd[t9] having an initial point that is the reference position Ov[t9] and a terminal point that is the corrected position Md[t9].

At the time t10, the operation region determiner 115B moves the reference position Ov[t9], the operation region coordinate system V[t9] and the operation region V[t9] by a movement amount corresponding to the operation region motion vector Vmd[t9], thereby setting the reference position Ov[t10], the operation region coordinate system ΣV[t10] and the operation region V[t10]. In other words, the operation region determiner 115B sets the reference position Ov[t10], the operation region coordinate system ΣV[t10] and the operation region V[t10] such that the reference position Ov[t10] coincides with the corrected position Md[t9]. In the example shown in FIG. 30, the time t10 is a time after the time t9, but the time t10 may be a time identical to the time t9.

B-4. Operations of Terminal Apparatus

Hereinafter, referring to FIG. 31, an example of the operations of the terminal apparatus 10B will be described.

Figure 31:
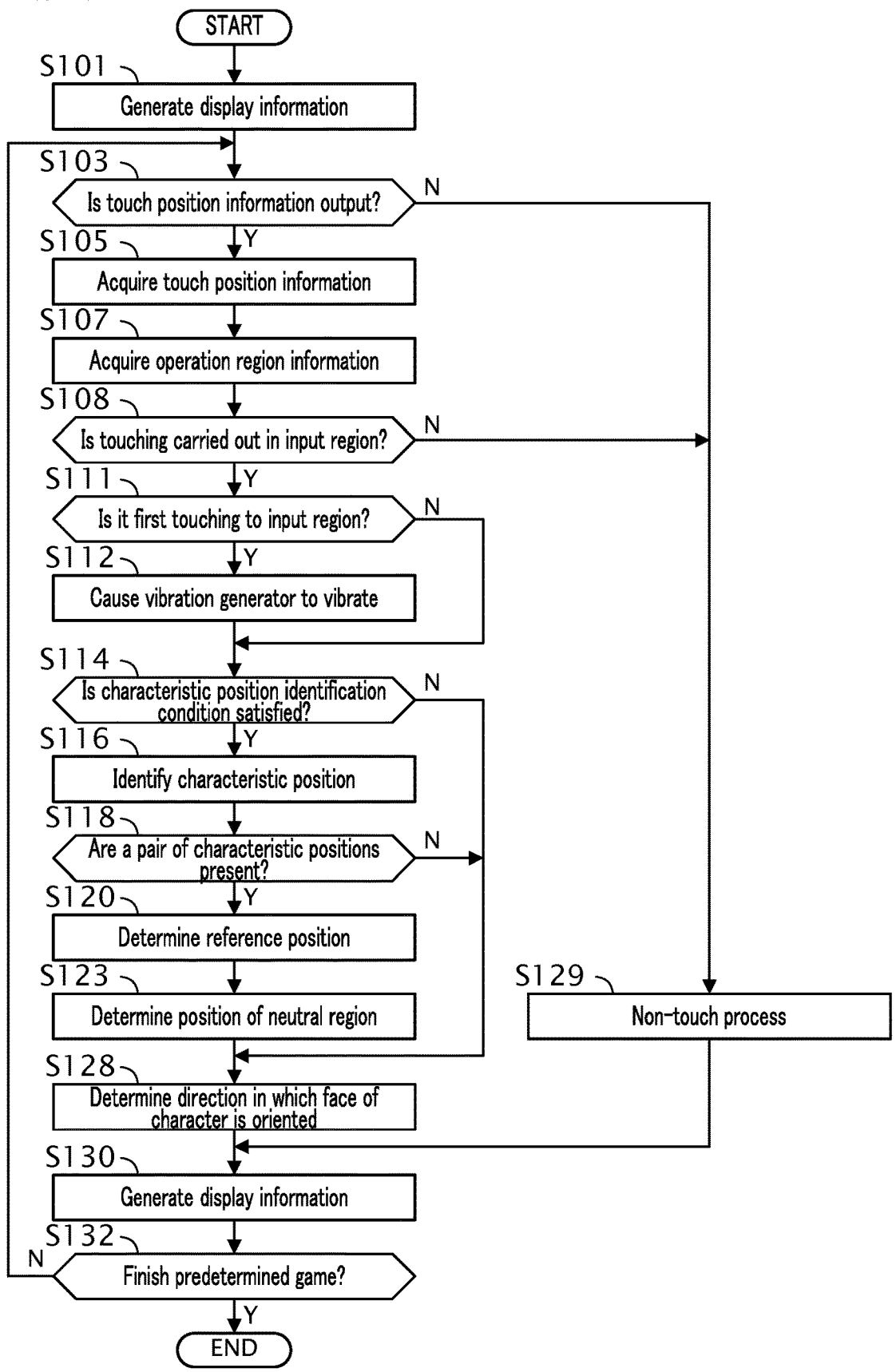
FIG. 31 is a flowchart showing an example of operations of the terminal apparatus 10B.

FIG. 31 is a flowchart showing an example of the operations of the terminal apparatus 10B in a case in which the terminal apparatus 10B executes a predetermined game. Detailed description of operations similar to the operations described in FIG. 11 is omitted. For example, a series of processes of steps S103 and S105 is processes similar to the series of processes of step 100 and S102 in FIG. 11. A series of processes of steps S107 to S120 is processes similar to the series of processes of steps S106 to S120 in FIG. 11. Furthermore, a series of processes of steps S128, S130 and S132 is processes similar to the series of processes of steps S128, S130 and S132 in FIG. 11. In this embodiment, for example, when the user of the terminal apparatus 10B inputs a predetermined start operation for starting the predetermined game through the touch panel 1002, the terminal apparatus 10B is assumed to start the predetermined game. After the predetermined game is started, the process of step S101 is executed.

In step S101, the display controller 112 generates display information for displaying the virtual space SP, the character CR and the operation region V on the display 12, and controls the display 12 to display an image based on the display information. The orientation of the face of the character CR and the position of the operation region V at the start of the predetermined game are determined in advance.

Next, in step S103, the touch position information acquirer 113 determines whether or not the touch panel 1002 outputs the touch position information. If the result of determination in step S103 is negative, the touch position information acquirer 113 advances the processing to step S129. In contrast, if the result of determination in step S103 is positive, the touch position information acquirer 113 advances the processing to step S105.

In step S105, the touch position information acquirer 113 acquires the touch position information output from the touch panel 1002.

Next, in step S107, the characteristic position determiner 114B acquires the operation region information stored in the storage 14, and identifies the positions of the neutral region RN, and the input regions RDr, RDl, RDu and RDd.

Next, in step S108, the characteristic position determiner 114B determines whether or not the touch position P indicated by the touch position information acquired by the touch position information acquirer 113 in step S105 is in any of the input regions RDr, RDl, RDu and RDd. If the result of the determination in step S108 is negative, that is, if the latest touch position P is present outside of the input region RD (e.g., in the neutral region RN), the characteristic position determiner 114B advances the processing to step S129.

In contrast, if the result of the determination in step S108 is positive, that is, if the latest touch position P is present in any of the input regions RDr, RDl, RDu and RDd, the characteristic position determiner 114B advances the processing to step S111.

In step S111, the vibration controller 116 determines whether or not the touch position P is changed from the state of being absent in the input region RD to the state of being present in the input region RD.

If the result of the determination in step S111 is negative, that is, if the latest touch on the touch panel 1002 is not the first touch in any region among the input regions RDr, RDl, RDu and RDd, the vibration controller 116 advances the processing to step S114. In contrast, if the result of the determination in step S111 is affirmative, that is, if the latest touch on the touch panel 1002 is the first touch in any region among the input regions RDr, RDl, RDu and RDd, the vibration controller 116 advances the processing to step S112.

In step S112, the vibration controller 116 controls the vibration generator 15 to cause the vibration generator 15 to vibrate the terminal apparatus 10B. The vibration controller 116 then advances the processing to step S114.

In step S114, the characteristic position determiner 114B determines whether or not the touch position P, which is indicated by the touch position information acquired by the touch position information acquirer 113 in step S105, satisfies the characteristic position identification condition. If the result of the determination in step S114 is negative, that is, if the characteristic position identification condition is not satisfied, the characteristic position determiner 114B advances the processing to step S128. Consequently, if the characteristic position identification condition is not satisfied, the position of the neutral region RN and the position of the operation region V are not changed and are maintained. In contrast, if the result of the determination in step S114 is positive, that is, if the characteristic position identification condition is satisfied, the characteristic position determiner 114B advances the processing to step S116.

In step S116, the characteristic position determiner 114B determines, as the characteristic position CP, the touch position P indicated by the touch position information acquired by the touch position information acquirer 113 in step S105.

Next, in step S118, the operation region determiner 115B determines whether or not both the characteristic position CPr and the characteristic position CPl are present. If the result of the determination in step S118 is negative, that is, if there are no characteristic positions CP forming a pair, the operation region determiner 115B advances the processing to step S128. Consequently, if there are no characteristic positions CP forming a pair, the position of the neutral region RN and the position of the operation region V are not changed and are maintained. In contrast, if the result of the determination in step S118 is positive, that is, if both the characteristic position CPr and the characteristic position CPl are present, the operation region determiner 115B advances the processing to step S120.

In step S120, the operation region determiner 115B determines the reference position Ov on the basis of the characteristic position CPr and the characteristic position CPl.

Next, in step S123, the operation region determiner 115B determines the positions of the neutral region RN, and the input regions RDr, RDl, RDu and RDd in the touch panel coordinate system $\Sigma S$, on the basis of the reference position Ov determined in step S120. It is to be noted that the operation region determiner 115B updates the operation region information stored in the storage 14, with the positions of the neutral region RN and the input region RD determined in step S123. The operation region determiner 115B executes the process in step S123, and subsequently advances the processing to step S128.

In step S128, the game controller 111 determines the direction in which the face of the character CR is oriented in the touch panel coordinate system $\Sigma S$. The game controller 111 executes the process in step S128, and subsequently advances the processing to step S130. Before the process in step S130 will be described, the process in step S129 will be described, which is to be executed if no touch in the input region RD is detected.

In step S129, the game controller 111 executes a non-touch process and advances the processing to step S130. As described with reference to FIG. 23, the non-touch process is a process executed when the finger FG moves away from the touch panel 1002. For example, the non-touch process refers to a process that does not change and maintains the direction in which the face of the character CR is oriented in the touch panel coordinate system $\Sigma S$. Alternatively, the non-touch process may be a process of setting the orientation of the face of the character CR in the touch panel coordinate system $\Sigma S$ to a predetermined orientation. The non-touch process is not limited to the above examples. In this embodiment, the game controller 111 executes when finger FG moves away from the touch panel 1002, but it is not required to execute any specific process related to a touch of finger FG. For example, if it is determined that the touch panel 1002 does not output the touch position information in step S103, the game controller 111 may advance the processing to step S130 without executing any specific process. Alternatively, if it is determined that the latest touch position P is present outside of the input region RD (e.g., in the neutral region RN) in step S108, the game controller 111 may advance the processing to step S130 without executing any specific process.

Consequently, if finger FG is not in contact with the touch panel 1002 (S103: N) or if the touch position P is not in the input region RD (S108: N), the positions of the neutral region RN and the operation region V are not changed and are maintained.

In step S130, the display controller 112 generates display information for displaying the virtual space SP, the character CR and the operation region V on the display 12, and controls the display 12 to display an image based on the display information.

Next, in step S132, the game controller 111 determines whether or not the user has input a predetermined finish operation for finishing the predetermined game through the touch panel 1002. If the result of determination in step S132 is negative, the game controller 111 returns the processing to step S103 and continues the game. In contrast, if the result of the determination in step S132 is positive, the game controller 111 finishes the predetermined game.

According to the operations shown in FIG. 31, if finger FG is not in contact with the touch panel 1002 (S103: N), if the touch position P is absent in the input region RD (S108: N), if the characteristic position identification condition is not satisfied (S114: N), or if there are no characteristic positions CP forming a pair (S118: N), the operation region determiner 115B does not change and maintains the position of the neutral region RN. In other words, if the characteristic positions CP forming the pair are updated, the operation region determiner 115B changes the position of the neutral region RN on the basis of the characteristic position CPr and the characteristic position CPl.

The operations of the terminal apparatus 10B are not limited to the example shown in FIG. 31. For example, the characteristic position determiner 114B may determine the characteristic position CP on the basis of the following: (i) the touch position P, which is indicated by the touch position information acquired by the touch position information acquirer 113; and (ii) touch positions P satisfying the characteristic position identification condition in the previous step S114. Specifically, at the time t3 shown in FIG. 28, the characteristic position determiner 114B may determine the average position of the touch positions P[t2] and P[t3], as the characteristic position CPr. Samples in a case of calculating the average position of touch positions P satisfying the characteristic position identification condition until a certain time are a predetermined number of (e.g., five) last touch positions P from the certain time, for example. The following touch position P may be excluded from the samples used for calculating the characteristic position CP. The touch position P has the maximum value of the Xv coordinate and the minimum value thereof among the touch positions P satisfying characteristic position identification condition until the certain time.

Alternatively, the following (a) or (b) may be excluded from the samples used for calculating the characteristic position CP.

(a) Touch positions P away by a predetermined distance or more from is the characteristic position CP at other times, and (b) Touch positions P satisfying the characteristic position identification condition at other times.

In this case, for example, even when finger FG moves by a large amount by some chance and returns to the original position, the position of the neutral region RN can be appropriately changed.

B-5. Conclusion of Embodiment

As described above, in this embodiment, the operation region determiner 115B determines the position of the operation region V including the neutral region RN and the input regions RDr, RDl, RDu and RDd on the basis of the characteristic position CPr and the characteristic position CPl. Consequently, in this embodiment, even if the touch position P in the operation region V gradually deviates, the operation region determiner 115B can correct the operation region V (that is, the neutral region RN and the input region RD) in response to the gap of the touch position P. Accordingly, in this embodiment, for example, in comparison with a case in which the position of the operation region V (that is, the neutral region RN and the input region RD) is fixed on the touch panel 1002, the probability of an unintended input due to the gap of the touch position P is reduced.

In general, there is a high probability that the following (i) and (ii) are defined according to (A) the shape and size of finger FG in contact with the touch panel 1002, and (B) the way of touching of each user, such as the pressure of the finger FG of the user coming into contact with the touch panel 1002, and the way of moving the finger FG.

(i) The relative positional relationship between two characteristic positions CP that are the characteristic position CPr and the characteristic position CPl, and (ii) The interval between the two characteristic positions CP that are the characteristic position CPr and the characteristic position CPl.

In contrast, in this embodiment, the operation region determiner 115B determines the position of the operation region V including the neutral region RN, the input region RDr and the input region RDl, on the basis of the two characteristic positions CP that are the characteristic position CPr and the characteristic position CPl. Furthermore, in this embodiment, the neutral region RN is arranged between the input region RDr and the input region RDl. Accordingly, in this embodiment, for example, in comparison with a case in which the position of the neutral region RN is defined on the basis of one characteristic position CP, the operation region V including the neutral region RN, the input region RDr and the input region RDl can be set at a position in consideration of the way of touching of each user. As a result, in this embodiment, for example, in comparison with a case in which the position of the neutral region RN is defined on the basis of the one characteristic position CP, the operability of an operation of touching the neutral region RN and the input region RD with the finger FG can be favorably maintained for any user.

In a specific type of game, the frequency of inputs of one direction related to the game is greater than the frequency of inputs of the other directions related to the game. For example, in the predetermined game, the frequency of inputs of the Xs direction instruction is greater than the frequency of inputs of the Ys direction instruction. In this case, determining the position of the neutral region RN on the basis of the touch position P related to an input of an instruction having a low frequency increases a probability that the neutral region RN is set at a position that does not correspond to the temporal gap of the position of finger FG of the user.

In contrast, in this embodiment, the operation region determiner 115B determines the position of the neutral region RN, on the basis of the touch position P, where the touch position P is in the input region RDr and the input region RDl, and corresponds to the input of the Xs direction instruction. Accordingly, in this embodiment, there is increased probability that the operation region V is set at a position appropriately corresponding to the gap of the touch position P, in a case in which the frequency of inputs of the Xs direction instruction is greater than the frequency of inputs of the Ys direction instruction, in comparison with a case in which the position of the neutral region RN is determined on the basis of the touch position P, which is in the input region RDu and the input region RDd, and corresponds to the input of the Ys direction instruction.

In an example of this embodiment, the operation region determiner 115B defines, as the input region RDr, a region obtained by excluding the neutral region RN from a circular sector region extending from the reference position Ov that is the center of the neutral region RN in the +Xv direction. Furthermore, the operation region determiner 115B defines, as the input region RDl, a region obtained by excluding the neutral region RN from a circular sector region extending from the reference position Ov in the −Xv direction. Accordingly, in this embodiment, for example, when the user touches the touch panel 1002 with finger FG, the user touches the neutral region RN with finger FG and inclines it in the +Xv direction to thereby allow the input region RDr to be touched. Furthermore, the user touches the neutral region RN with finger FG and inclines it in the −Xv direction to thereby allow the input region RDl to be touched. That is, in this embodiment, for example, when the user touches the touch panel 1002 with finger FG, the user can touch two input regions RD that are the input region RDr and the input region RDl without moving finger FG away from the touch panel. Accordingly, in this embodiment, the user can easily switch between an operation for inputting an instruction in the first operation direction and an operation for inputting an instruction in the second operation direction, in comparison with an example case in which the finger is required to be away from the touch panel between the touch in the input region RDr and the touch in the input region RDl.

B-6. Modifications of Second Embodiment

Each mode described above may be variously modified. Specific modified modes will be exemplified below. Two or more modes freely selected from among the following examples may be appropriately combined in a range so long as they do not conflict. In the modifications exemplified below, elements having operations and functions equivalent to those of the embodiment are also assigned symbols referred to in the above description, and detailed descriptions of the elements are omitted as appropriate. Detailed description of modifications similar to the modifications exemplified in the first embodiment is also omitted as appropriate.

Modification B1

In the embodiment described above, the size of the neutral region RN (e.g., the radius of the circle BDn defining the neutral region RN) is maintained to be a predetermined size, and it is not changed before and after correction of the position of the neutral region RN. However, the present invention is not limited to such an aspect. For example, the operation region determiner 115B may determine the size of the neutral region RN on the basis of at least one of the characteristic position CPr and the characteristic position CPl. As a method of determining the size of the neutral region RN, three examples are described with reference to FIGS. 32 to 34. The method of determining the size of the neutral region RN is not limited to the three examples shown in FIGS. 32 to 34.

Figure 32:
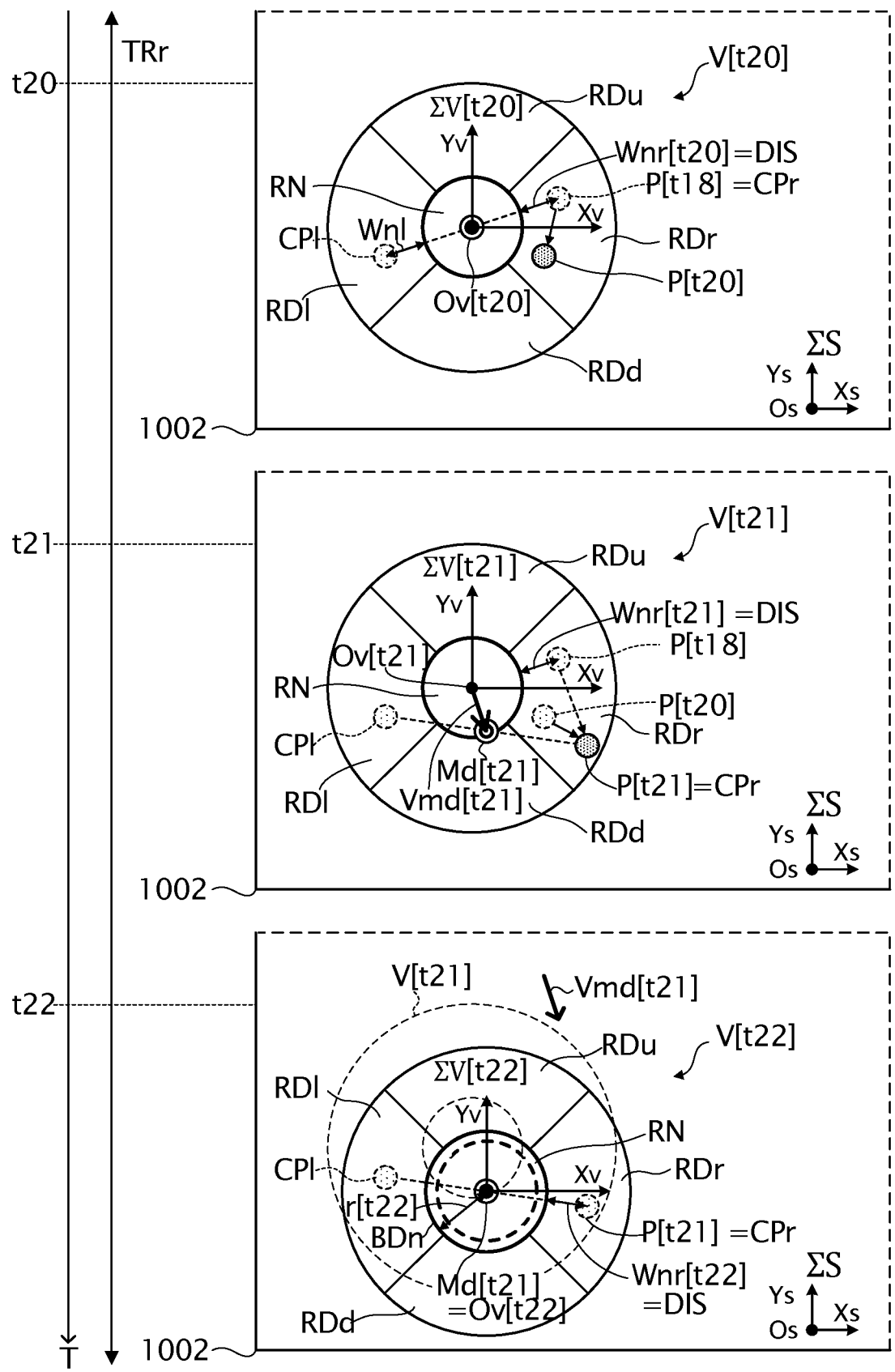
FIG. 32 illustrates an example of operations of a terminal apparatus 10B according to Modification B1.

FIG. 32 illustrates an example of operations of a terminal apparatus 10B according to Modification B1. FIG. 32 shows an example of the touch position changing example according to Modification B1. In the touch position changing example shown in FIG. 32, the terminal apparatus 10B determines the size of the neutral region RN so as to maintain the distance Wnr between the characteristic position CPr and the neutral region RN constant. In the example shown in FIG. 32, the distance Wnr between the characteristic position CPr and the neutral region RN refers to a distance from the boundary line between the neutral region RN and the input region RDr (the circle BDn defining the neutral region RN) to the characteristic position CPr on the line connecting the characteristic position CPr and the center of the neutral region RN. Hereinafter, the distance Wnr at the time t is also called a distance Wnr[t], and the radius r of the circle BDn at the time t is also called a radius r[t]. The distance Wnr between the characteristic position CPr and the neutral region RN, and the distance Wnl between the characteristic position CPl and the neutral region RN are also called a distance Wn in cases of not being specifically distinguished from each other. Times t20, t21 and t22 shown in FIG. 32 are included in the input region touch period TRr. Hereinafter, the operations of the terminal apparatus 10B will be described in which it is assumed that in the input region touch period TRr including the time t20 and the like, at the time t18 (not shown) before the time t20, the touch position P[t18] is determined to be the characteristic position CP.

Based on the characteristic position CPr (touch position P[t18]) and the characteristic position CPl, from the time t19 when the operation region V and the like are set (not shown) to the time t20, the touch position P moves from the touch position P[t18] in the input region RDr to the touch position P[t20] in the input region RDr. The touch position P[t20] at the time t20 is present farther on the −Xv side than the characteristic position CPr (touch position P[t18]). Accordingly, the characteristic position determiner 114B maintains a state in which the touch position P[t18] is identified as the characteristic position CPr, at the time t20. At the time t20, the characteristic position CPr is not updated. Accordingly, the operation region determiner 115B does not change and maintains the position of the operation region V[t20] including the neutral region RN. The distance Wnr[t20] between the characteristic position CPr (touch position P[t18]) and the neutral region RN at the time t20 is a predetermined distance DIS.

From the time t20 to the time t21, the touch position P moves from the touch position P[t20] in the input region RDr to the touch position P[t21] in the input region RDr. Since the touch position P[t21] at the time t21 is present farther on the +Xv side than the characteristic position CPr (touch position P[t18]). Accordingly, the characteristic position determiner 114B determines the touch position P[t21] as the characteristic position CPr at the time t21. In other words, the characteristic position determiner 114B updates the characteristic position CPr from the touch position P[t18] to the touch position P[t21] at the time t21.

At the time t21, the operation region determiner 115B defines, as the corrected position Md[t21], the midpoint between the characteristic position CPr (touch position P[t21]) and the characteristic position CPl. The operation region determiner 115B further defines an operation region motion vector Vmd[t21] having an initial point that is the reference position Ov[t21] and a terminal point that is the corrected position Md[t21].

At the time t22, the operation region determiner 115B moves the reference position Ov[t21], the operation region coordinate system ΣV[t21] and the operation region V[t21] by a movement amount corresponding to the operation region motion vector Vmd[t21], thereby setting the reference position Ov[t22], the operation region coordinate system ΣV[t22] and the operation region V[t22]. In other words, the operation region determiner 115B sets the reference position Ov[t22], the operation region coordinate system ΣV[t22] and the operation region V[t22] such that the reference position Ov[t22] coincides with the corrected position Md[t21].

At the time t22, the operation region determiner 115B determines the size of the neutral region RN such that the distance Wnr[t22] between the characteristic position CPr (touch position P[t21]) and the neutral region RN can be the distance DIS. For example, the operation region determiner 115B sets the value obtained by subtracting the distance DIS from the distance between the characteristic position CPr (touch position P[t21]) and the reference position Ov[t22] (the center of the neutral region RN), as the radius r[t22] of the circle BDn defining the neutral region RN. As a result, the distance Wnr between the characteristic position CPr and the neutral region RN is maintained to be the distance DIS even when the position of the neutral region RN is corrected by an update of the characteristic position CPr. A broken-line circle in the neutral region RN shown in FIG. 32 represents the neutral region RN in a case in which the size of the neutral region RN is constant. In the example shown in FIG. 32, the time t22 is a time after the time t21, but the time t22 may be a time identical to the time t21.

In the example shown in FIG. 32, the distance Wn (e.g., the distance Wnr) between the characteristic position CP and the neutral region RN is maintained to be the distance DIS even when the characteristic position CP is updated. Accordingly, when the user moves finger FG from the neutral region RN to the input region RD, the touch position P is returned to the neutral region RN by returning finger FG by a constant amount corresponding to the distance DIS. Consequently, in the example shown in FIG. 32, in comparison with the case in which the size of the neutral region RN is constant, the operation of returning the touch position P to the neutral region RN can be facilitated.

The operation region determiner 115B is not required to execute adjustment of the size of the neutral region RN shown in FIG. 32 in a period after activation of the predetermined game and before detection of the touch position P with the distance from the neutral region RN being at least the distance DIS. Alternatively, the characteristic position determiner 114B may set a position away from the neutral region RN by the distance DIS at activation of the predetermined game, as the initial value of the characteristic position CP. The operation region determiner 115B may set the following distance (e.g., distances Wxr and Wxl shown in FIG. 35) as the distance Wn between the characteristic position CP and the neutral region RN. The distance is represented by the difference between (i) the Xv coordinate of the characteristic position CP in the operation region coordinate system ΣV and (ii) the intersection of the circle BDn defining the neutral region RN with the Xv axis.

Figure 33:
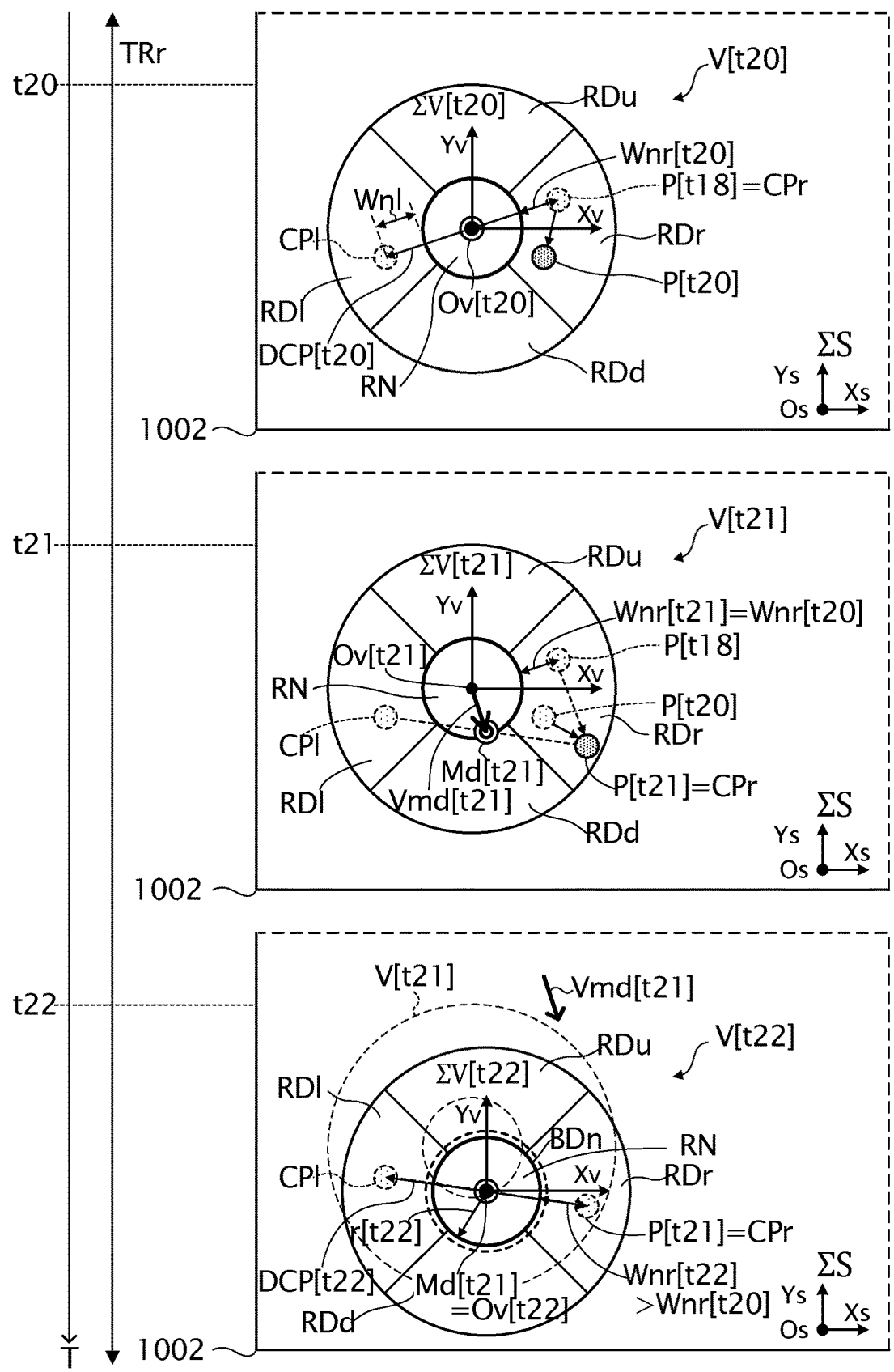
FIG. 33 illustrates another example of operations of the terminal apparatus 10B according to Modification B1.

FIG. 33 illustrates another example of operations of the terminal apparatus 10B according to Modification B1. FIG. 33 shows an example of the touch position changing example according to Modification B1. In the touch position changing example shown in FIG. 33, the terminal apparatus 10B changes the distance Wnr between the characteristic position CPr and the neutral region RN according to the distance DCP between the characteristic position CPr and the characteristic position CPl. The operations of the terminal apparatus 10B at the times t20 and t21 shown in FIG. 33 are the same as the operations shown in FIG. 32. Accordingly, the description thereof is omitted. Hereinafter, the distance DCP at the time t is also called the distance DCP[t].

Also in the example shown in FIG. 33, the time t22 is a time after the time t21, but the time t22 may be a time identical to the time t21.

At the time t22, the operation region determiner 115B sets the reference position Ov[t22], the operation region coordinate system ΣV[t22] and the operation region V[t22] such that the reference position Ov[t22] coincides with the corrected position Md[t21], as shown in FIG. 32.

At the time t22, the operation region determiner 115B determines the size of the neutral region RN such that the distance Wnr[t22] between the characteristic position CPr (touch position P[t21]) and the neutral region RN is the distance according to the distance DCP[t22] between the characteristic position CPr (touch position P[t21]) and the characteristic position CPl. The distance Wnr between the characteristic position CPr and the neutral region RN increases with increase in the distance DCP between the characteristic position CPr and the characteristic position CPl.

For example, the operation region determiner 115B calculates the distance Wnr[t22] between the characteristic position CPr (touch position P[t21]) and the neutral region RN, on the basis of the distance DCP[t22] between the characteristic position CPr (touch position P[t21]) and the characteristic position CPl. The operation region determiner 115B then sets the value obtained by subtracting the distance Wnr[t22] from the distance between the characteristic position CPr (touch position P[t21]) and the reference position Ov[t22] (the center of the neutral region RN), as the radius r[t22] of the circle BDn defining the neutral region RN. As a result, when the position of the neutral region RN is corrected by an update of the characteristic position CPr, the distance Wnr between the characteristic position CPr and the neutral region RN is set to a distance according to the updated distance DCP between the characteristic position CPr and the characteristic position CPl. A broken-line circle encircling the neutral region RN shown in FIG. 33 represents the neutral region RN in a case in which the distance Wnr between the characteristic position CPr and the neutral region RN is maintained to be the distance DIS. The distance DCP[t22] between the characteristic position CPr (touch position P[t21]) and the characteristic position CPl is greater than the distance DCP[t20] between the touch position P[t18] (the characteristic position CPr having not been updated yet) and the characteristic position CPl. Accordingly, the distance Wnr[t22] between the characteristic position CPr (touch position P[t21]) and the neutral region RN is greater than the distance Wnr[t20] between the touch position P[t18] (characteristic position CPr having not been updated yet) and the neutral region RN at the time t20.

When the distance DCP between the characteristic position CPr and the characteristic position CPl increases, finger FG is assumed to move by a large amount. When finger FG is moved by a large amount, finger FG is slightly returned to the neutral region RN side in some cases. In this case, if the distance Wn between the characteristic position CP and the neutral region RN is small, the touch position P that is to be present in the input region RD moves to the neutral region RN, possibly causing an unintended operation input.

Accordingly, in the example shown in FIG. 33, with increase in the distance DCP between the characteristic position CPr and the characteristic position CPl, the distance Wn between the characteristic position CP and the neutral region RN is increased. This can prevent the touch position P in the input region RD from moving into the neutral region RN. As a result, the probability of causing an unintended operation input is reduced.

In the example shown in FIG. 33, with increase in the distance DCP between the characteristic position CPr and the characteristic position CPl, the distance Wn between the characteristic position CP and the neutral region RN is increased, which can prevent the neutral region RN from excessively increasing. For example, excessive increase in the neutral region RN increases the movement amount (operation amount) of finger FG in a case of movement of finger FG from one of the input regions RDr and RDl to the other, and sometimes reduces the operability. In the example shown in FIG. 33, the neutral region RN is prevented from excessively increasing, which can prevent the operability from decreasing.

The operation region determiner 115B is not required to execute adjustment of the size of the neutral region RN shown in FIG. 33 in a period after activation of the predetermined game and before detection of the touch position P with the distance from the neutral region RN being at least the predetermined minimum distance. Alternatively, the characteristic position determiner 114B sets a position away from the neutral region RN by the minimum distance at activation of the predetermined game, as the initial value of the characteristic position CP.

When the initial value of the characteristic position CP is set, the distance Wn between the characteristic position CP and the neutral region RN may be calculated on the basis of any one of the following Formulae (1), (2) and (3), or calculated on the basis of a formula different from the Formulae (1), (2) and (3).

$$Wn = Wint(1+(DCP-Dint)/(Dmax-Dint)*\alpha) \quad (1)$$

$$Wn = Wint*DCP/Dint \quad (2)$$

$$Wn = DCP*\beta \quad (3)$$

In Formulae (1) and (2), "Wint" represents the distance (the initial value of the distance Wn) between the characteristic position CP and the neutral region RN at activation of the predetermined game. "Dint" represents the distance (the initial value of the distance DCP) between the characteristic position CPr and the characteristic position CPl at activation of the predetermined game. In Formula (1), "Dmax" represents the maximum value among the possible values of the distance DCP. The "a" represents a constant provided as a positive real number. The "13" in Formula (3) represents a constant provided as a real number greater than 0 and less than 0.5. Formula (3) may be used when the initial value of the characteristic position CP is not set.

The operation region determiner 115B may set the following distance (e.g., distances Wxr and Wxl shown in FIG. 35) as the distance Wn between the characteristic position CP and the neutral region RN. The distance is represented by the difference between (i) the Xv coordinate of the characteristic position CP in the operation region coordinate system ΣV and (ii) the intersection of the circle BDn defining the neutral region RN with the Xv axis.

Figure 34:
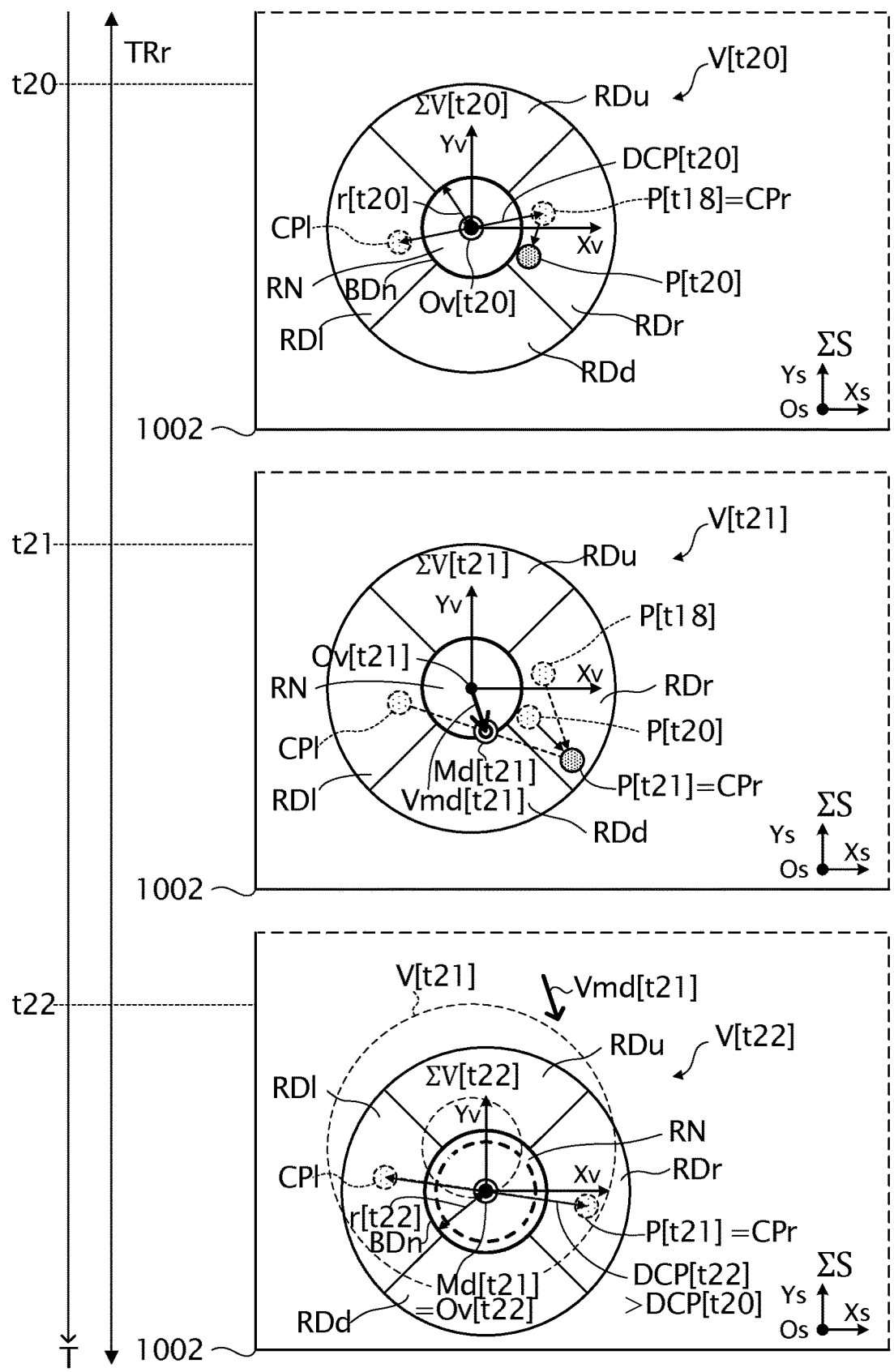
FIG. 34 illustrates another example of operations of the terminal apparatus 10B according to Modification B1.

FIG. 34 illustrates another example of operations of the terminal apparatus 10B according to Modification B1. FIG. 34 shows an example of the touch position changing example according to Modification B1. In the touch position changing example shown in FIG. 34, the terminal apparatus 10B changes the radius r of the circle BDn defining the neutral region RN (that is, the size of the neutral region RN), according to the distance DCP between the characteristic position CPr and the characteristic position CPl. The operations of the terminal apparatus 10B at the times t20 and t21 shown in FIG. 34 are the same as the operations shown in FIG. 32 except the characteristic positions CPr and CPl and touch positions P[t18], P[t20] and P[t21]. Accordingly, the detailed description thereof is omitted. In the example shown in FIG. 34, the time t22 is a time after the time t21, but the time t22 may be a time identical to the time t21.

At the time t20, the touch position P[t20] at the time t20 is present farther on the −Xv side than the characteristic position CPr (touch position P[t18]). Accordingly, the positions of the characteristic position CPr and the operation region V[t20] are not changed and are maintained.

At the time t21, the touch position P[t21] is present farther on the +Xv side than the characteristic position CPr (touch position P[t18]). Accordingly, the characteristic position determiner 114B updates the characteristic position CPr from the touch position P[t18] to the touch position P[t21]. The operation region determiner 115B defines, as the corrected position Md[t21], the midpoint between the characteristic position CPr (touch position P[t21]) and the characteristic position CPl. The operation region determiner 115B then defines an operation region motion vector Vmd[t21] having an initial point that is the reference position Ov[t21] and a terminal point that is the corrected position Md[t21].

At the time t22, the operation region determiner 115B sets the reference position Ov[t22], the operation region coordinate system ΣV[t22] and the operation region V[t22] such that the reference position Ov[t22] coincides with the corrected position Md[t21], as shown in FIG. 32.

At the time t22, the operation region determiner 115B determines the radius r[t22] of the circle BDn defining the neutral region RN (that is, the size of the neutral region RN) on the basis of the distance DCP[t22] between the characteristic position CPr (touch position P[t21]) and the characteristic position CPl. The radius r of the circle BDn defining the neutral region RN increases as the distance DCP between the characteristic position CPr and the characteristic position CPl increases.

For example, the operation region determiner 115B determines the radius r of the circle BDn such that the ratio of the radius r of the circle BDn to the distance DCP between the characteristic position CPr and the characteristic position CPl does not change before and after correction of the position of the neutral region RN. In this case, the ratio of the radius r[t22] of the circle BDn to the distance DCP[t22] between the characteristic position CPr (touch position P[t21]) and the characteristic position CPl is the same as the ratio of the radius r[t20] of the circle BDn to the distance DCP[t20] between the touch position P[t18] (characteristic position CPr having not been updated yet) and the characteristic position CPl. A broken-line circle in the neutral region RN shown in FIG. 34 represents the neutral region RN in a case in which the size of the neutral region RN is constant. The distance DCP[t22] between the characteristic position CPr (touch position P[t21]) and the characteristic position CPl is greater than the distance DCP[t20] between the touch position P[t18] (the characteristic position CPr having not been updated yet) and the characteristic position CPl. Accordingly, the radius r[t22] of the circle BDn is greater than the radius r[t20] of the circle BDn.

In the example shown in FIG. 34, the radius r of the circle BDn defining the neutral region RN (that is, the size of the neutral region RN) changes according to the distance DCP between the characteristic position CPr and the characteristic position CPl, which can prevent the neutral region RN from being excessively enlarged and can prevent the operability from decreasing. For example, in the method shown in FIG. 32 that maintains the distance Wn between the characteristic position CP and the neutral region RN to be the distance DIS, increase in the distance DCP between the characteristic position CPr and the characteristic position CPl, in turn, increases the ratio of the radius r of the circle BDn to the distance DCP. Accordingly, the method shown in FIG. 32 facilitates returning the touch position P to the neutral region RN. However, increase in the distance DCP between the characteristic position CPr and the characteristic position CPl sometimes causes the neutral region RN to have a size that reduces operability.

In contrast, in the example shown in FIG. 34, the ratio of the radius r of the circle BDn to the distance DCP between the characteristic position CPr and the characteristic position CPl is maintained to be a predetermined value. Accordingly, the neutral region RN can be prevented from having a size that reduces operability. As a result, in the example shown in FIG. 34, the neutral region RN can be prevented from excessively increasing, which can prevent the operability from decreasing.

In this modification, an upper limit value may be predetermined for the size of the neutral region RN so as to prevent the neutral region RN from having a size that reduces operability. For example, there is a case in which the size of the neutral region RN calculated based on at least one of the characteristic position CPr and the characteristic position CPl exceeds the predetermined upper limit value. In this case, the operation region determiner 115B may determine the size of the neutral region RN as the upper limit value.

In this modification, a lower limit value may be determined in advance in order to prevent the neutral region RN from having a size that reduces operability. For example, there is a case in which the size of the neutral region RN calculated on the basis of at least one of the characteristic position CPr and the characteristic position CPl is less than a predetermined lower limit value. In this case, the operation region determiner 115B may determine the size of the neutral region RN as the lower limit value.

As described above, in this modification, the operation region determiner 115B determines the size of the neutral region RN on the basis of at least one of the characteristic position CPr and the characteristic position CPl. Accordingly, in this modification, for example, in comparison with the case in which the size of the neutral region RN is fixed, operability is improved.

Modification B2

In the embodiment described above, the position of the neutral region RN is determined using the corrected position Md. However, the present invention is not limited to such an aspect. For example, the operation region determiner 115B may determine the position of the neutral region RN on the basis of at least one of the characteristic position CPr and the characteristic position CPl. An example of a method of determining the position of the neutral region RN on the basis of at least one of the characteristic position CPr and the characteristic position CPl is described with reference to FIG. 35. However, the method of determining the position of the neutral region RN is not limited to the example shown in FIG. 35.

Figure 35:
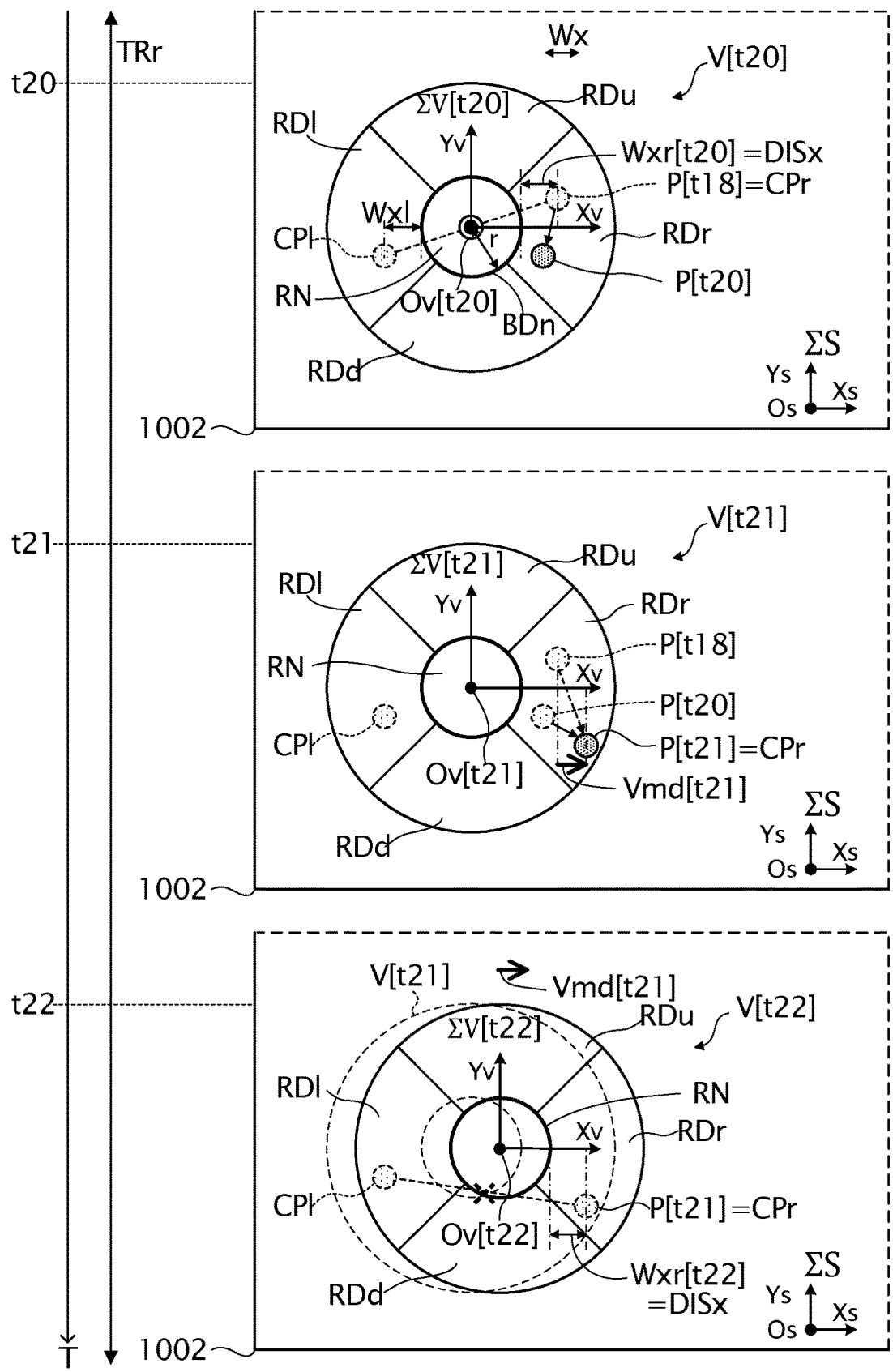
FIG. 35 illustrates an example of operations of a terminal apparatus 10B according to Modification B2.

FIG. 35 illustrates an example of operations of a terminal apparatus 10B according to Modification B2. FIG. 35 shows an example of the touch position changing example according to Modification B2. In the touch position changing example shown in FIG. 35, the terminal apparatus 10B determines the position of the neutral region RN so as to maintain the distance Wxr to be constant. The distance Wxr is represented by the difference between (i) the Xv coordinate of the characteristic position CPr in the operation region coordinate system $\Sigma V$ and (ii) the intersection between the circle BDn defining the neutral region RN and the Xv axis. Hereinafter, the distance Wxr at the time t is also called a distance Wxr[t]. In the operation region coordinate system $\Sigma V$, the distance Wxl and the distance Wxr are also called a distance Wx, in cases of not being specifically distinguished from each other. Here, the distance Wxl is represented by a difference between (i) the Xv coordinate of the characteristic position CPl and (ii) the intersection between the circle BDn defining the neutral region RN and the Xv axis. The operations of the terminal apparatus 10B at the time t20 shown in FIG. 35 are the same as the operations shown in FIG. 32. Accordingly, description thereof is omitted. The operations of the terminal apparatus 10B at the time t21 shown in FIG. 35 are the same as the operations shown in FIG. 32, except for the method of calculating the operation region motion vector Vmd. Accordingly, the method of calculating the operation region motion vector Vmd will be mainly described. Also in the example shown in FIG. 35, the time t22 is a time after the time t21, but the time t22 may be a time identical to the time t21.

At the time t21, the touch position P[t21] is present farther on the +Xv side than the characteristic position CPr (touch position P[t18]). Accordingly, the characteristic position determiner 114B updates the characteristic position CPr from the touch position P[t18] to the touch position P[t21]. The operation region determiner 115B defines, as an operation region motion vector Vmd[t21], a vector obtained by taking only the Xv component from a vector having (i) an initial point that is the characteristic position CPr (touch position P[t18]) and (ii) a terminal point that is the updated characteristic position CPr (touch position P[t21]).

At the time t22, the operation region determiner 115B moves the reference position Ov[t21], the operation region coordinate system $\Sigma V[t21]$ and the operation region V[t21] by a movement amount corresponding to the operation region motion vector Vmd[t21], thereby setting the reference position Ov[t22], the operation region coordinate system $\Sigma V[t22]$ and the operation region V[t22]. As a result, the distance Wxr[t22] after movement of the position of the neutral region RN is maintained to be the distance DISx that is the same as the distance Wxr[t20] before movement of the position of the neutral region RN. That is, the operation region determiner 115B sets the neutral region RN and the operation region V so as to maintain the distance Wx determined by the updated characteristic position CP and neutral region RN to be the distance DISx.

In the example shown in FIG. 35, the neutral region RN moves by a movement amount corresponding to the operation region motion vector Vmd, which is obtained by taking only the Xv component from a vector having (i) an initial point that is the characteristic position CPr having not yet been updated and (ii) a terminal point that is the updated characteristic position CPr. Accordingly, the center of the neutral region RN does not coincide with the midpoint between the characteristic position CPr and the characteristic position CPl (broken-line "x" symbol in FIG. 35). Accordingly, the center of the neutral region RN does not coincide with the midpoint between the characteristic position CPr and the characteristic position CPl (broken-line "x" symbol in FIG. 35). That is, the center of the neutral region RN is not required to coincide with the midpoint between the characteristic position CPr and the characteristic position CPl (broken-line "x" symbol in FIG. 35). Hereinafter, the vector having (iii) an initial point that is the characteristic position CP having not been updated yet and (iv) a terminal point that is the updated characteristic position CP is also called a motion vector of the characteristic position CP.

Even if the corrected position Md is not used to determine the position of the neutral region RN, the center of the neutral region RN may coincide with the midpoint between the characteristic position CPr and the characteristic position CPl (broken-line "x" symbol in FIG. 35). For example, the operation region determiner 115B may determine a vector having components that are halves of the Xv component and the Yv component of the motion vector of the characteristic position CPr, as the operation region motion vector Vmd [t21].

The operation region determiner 115B may determine the motion vector of the characteristic position CPr as the operation region motion vector Vmd[t21]. In this case, the positional relationship between the characteristic position CPr and the neutral region RN is maintained before and after correction of the position of the neutral region RN. The operation region determiner 115B may adjust the size of the neutral region RN. For example, the operation region determiner 115B may adjust the size of the neutral region RN such that the midpoint between the characteristic position CPr and the characteristic position CPl is out of the neutral region RN.

Similar to the example shown in FIG. 33, the operation region determiner 115B may change the distance Wx, which is determined by the characteristic position CP and the neutral region RN, according to the distance DCP between the characteristic position CPr and the characteristic position CPl. In this case, the size of the operation region motion vector Vmd may be smaller than the size of the Xv component of the motion vector of the characteristic position CP, for example. In a case in which the distance Wx is changed according to the distance DCP, the operation region determiner 115B may maintain the radius r of the circle BDn defining the neutral region RN (the size of the neutral region RN) to be a predetermined size. Alternatively, the operation region determiner 115B may change this radius according to the distance DCP between the characteristic position CPr and the characteristic position CPl. In an example case in which the distance Wx and the radius r of the circle BDn are changed according to the distance DCP between the characteristic position CPr and the characteristic position CPl, the operation region determiner 115B sets the amount of increase in the radius r of the circle BDn, within a range that does not exceed a value. This value is obtained by subtracting the size of the operation region motion vector Vmd from the size of the Xv component of the motion vector of the characteristic position CP.

As described above, in this modification, the operation region determiner 115B determines the position of the neutral region RN on the basis of at least one of the characteristic position CPr and the characteristic position CPl, without calculating the corrected position Md. Consequently, similar to the embodiments and the modification B1 described above, also in this modification, in comparison with a case in which the position of the neutral region RN is fixed on the touch panel 1002, the probability of an unintended input due to the gap of the touch position P is reduced. In this modification, the corrected position Md is not calculated. Accordingly, in comparison with the case of calculating the corrected position Md, the processes can be simplified.

Modification B3

In the embodiment described above, the characteristic position determiner 114B determines the characteristic position CPr based on the touch position P present in the input region RDr, and the characteristic position CPl based on the touch position P present in the input region RDl, and the operation region determiner 115B defines (i) the position of the operation region V in a direction, which includes the +Xv direction and the −Xv direction, and (ii) the position of the operation region V in a direction, which includes the +Yv direction and the −Yv direction, on the basis of the characteristic position CPr and the characteristic position CPl. However, the present invention is not limited to such an aspect.

Although described in detail with reference to FIGS. 36 and 37, for example, the characteristic position determiner 114B may determine a characteristic position CPu on the basis of the touch position P present in the input region RDu in addition to the characteristic position CPr and the characteristic position CPl. In addition, the characteristic position determiner 114B may determine a characteristic position CPd based on the touch position P present in the input region RDd.

For example, the characteristic position determiner 114B may determine whether to identify the position based on the latest touch position P in the input region RDu as the characteristic position CPu, or to maintain the current characteristic position CPu without update. Then the characteristic position determiner 114B may determine the characteristic position CPu according to the determination result. Alternatively, the characteristic position determiner 114B may determine whether to identify the position based on the latest touch position P in the input region RDd as the characteristic position CPd, or to maintain the current characteristic position CPd without update, on the basis of the touch position P. Then characteristic position determiner 114B may determine the characteristic position CPd according to the determination result. Modification B3 is similar to Modification A1 except that the neutral region RN is included in the operation region V. Referring to FIGS. 36 and 37, the touch position changing example according to this modification will be described.

Figure 36:
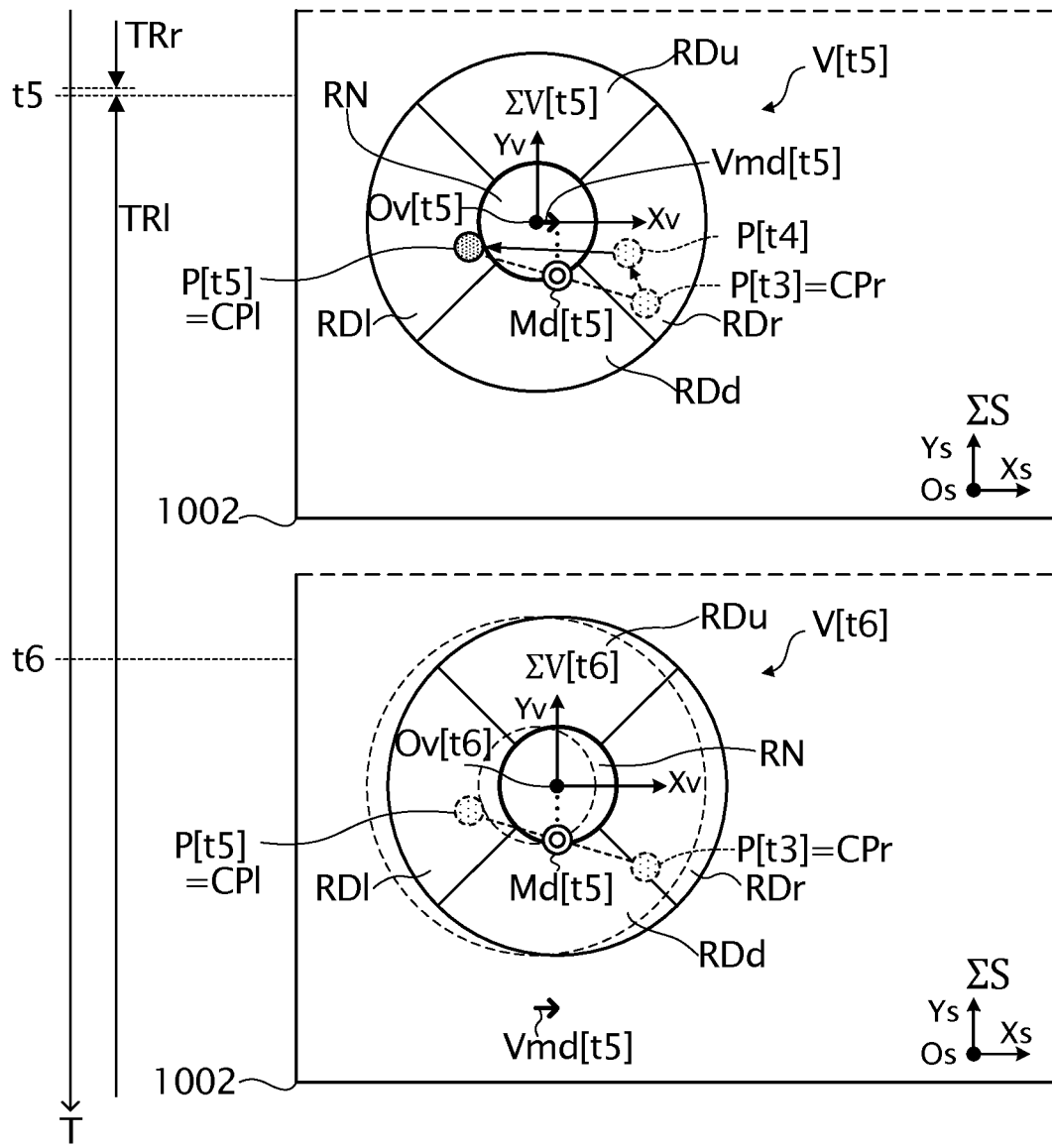
FIG. 36 illustrates an example of operations of a terminal apparatus 10B according to Modification B3.

FIG. 36 illustrates an example of operations of a terminal apparatus 10B according to Modification B3. FIG. 36 shows an example of the touch position changing example according to Modification B3. The touch position changing example shown in FIG. 36 shows an example of the operations of the terminal apparatus 10B in a case of determining the position of the operation region V in a direction, which includes the +Xv direction and the −Xv direction. It is assumed that the period from the time t0 to the time t4 in the touch position changing example according to this modification is similar to that in the touch position changing example according to the embodiment shown in FIGS. 27 and 28. The operations of the terminal apparatus 10B at the time t5 shown in FIG. 36 are similar to the operations shown in FIG. 28 except the method of calculating the operation region motion vector Vmd. Accordingly, about the operations of the terminal apparatus 10B at the time t5, the method of calculating the operation region motion vector Vmd will be mainly described.

From the time t4 to the time t5, the touch position P moves from the touch position P[t4] in the input region RDr toward the touch position P[t5] in the input region RDl. At the time t5, the touch position P enters the input region RDl, and the input region touch period TRl is started. In the input region touch period TRl started at the time t5, the touch position P[t5] is a position farthest in the −Xv direction from the reference position Ov. Accordingly, at the time t5, the characteristic position determiner 114B determines the touch position P[t5] as the characteristic position CPl.

At the time t5, the operation region determiner 115B defines, as the corrected position Md[t5], the midpoint between the characteristic position CPr and the characteristic position CPl. The operation region determiner 115B further defines, as an operation region motion vector Vmd [t5], a vector obtained by taking only the Xv component from a vector having (i) an initial point that is the reference position Ov[t5] and (ii) a terminal point that is the corrected position Md[t5].

At the time t6, the operation region determiner 115B moves the reference position Ov[t5], the operation region coordinate system $\Sigma V[t5]$ and the operation region V[t5] by a movement amount corresponding to the operation region motion vector Vmd[t5], thereby setting the reference position Ov[t6], the operation region coordinate system $\Sigma V[t6]$ and the operation region V[t6]. That is, the operation region determiner 115B moves the neutral region RN by the movement amount corresponding to the operation region motion vector Vmd[t5]. In the touch position changing example according to this modification, the time t6 is a time after the time t5, but the time t6 may be a time identical to the time t5. Next, referring to FIG. 37, continuation of the operations shown in FIG. 36 will be described.

Figure 37:
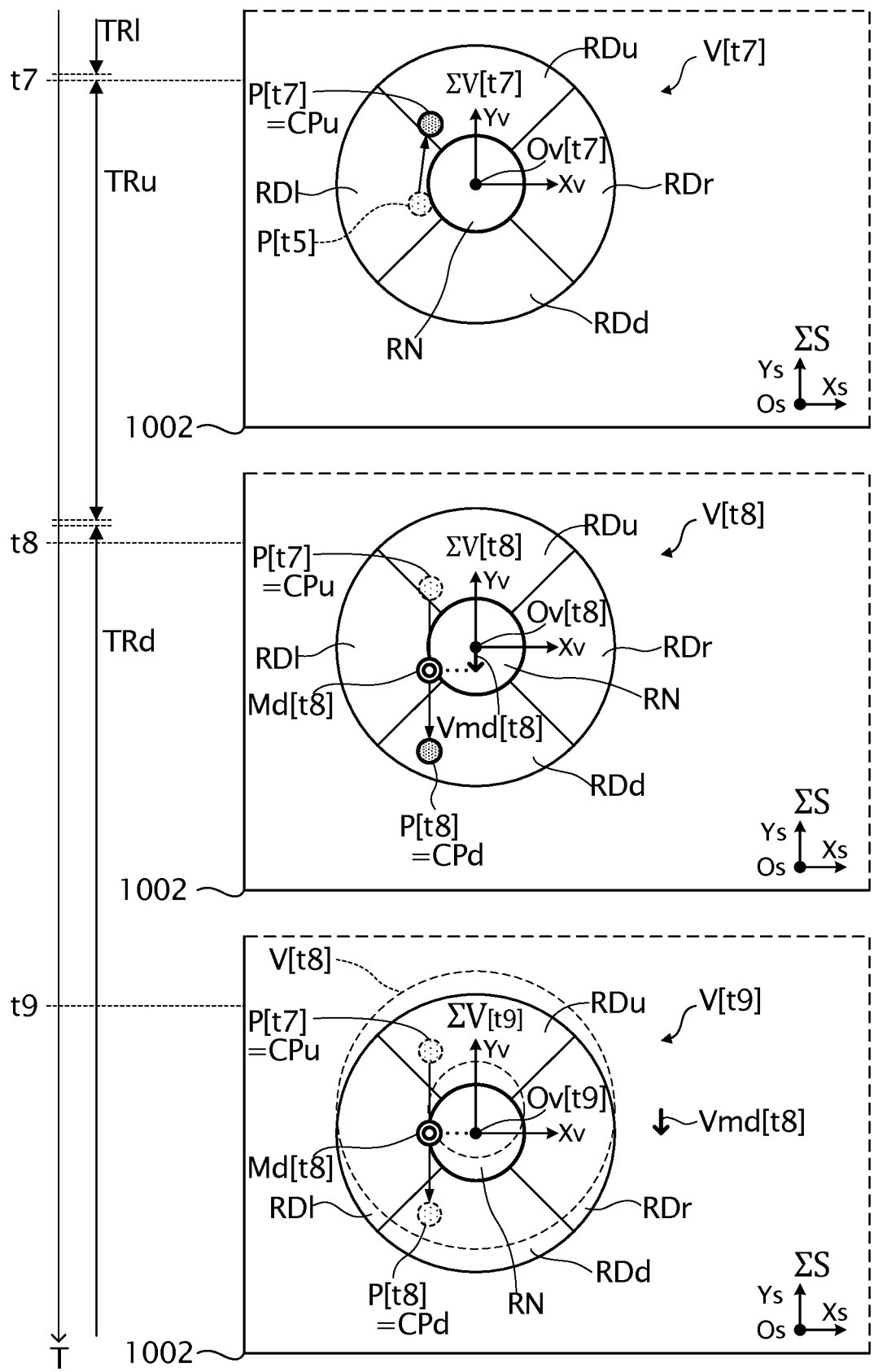
FIG. 37 illustrates an example of operations of the terminal apparatus 10B according to Modification B3.

FIG. 37 illustrates an example of operations of the terminal apparatus 10B according to Modification B3. FIG. 37 shows an example of the touch position changing example according to Modification B3. The touch position changing example shown in FIG. 37 shows an example of the operations of the terminal apparatus 10B in a case of determining the position of the operation region V in a direction, which includes the +Yv direction and the −Yv direction.

From the time t6 to the time t7, the touch position P moves from the touch position P[t5] in the input region RDl toward the touch position P[t7] in the input region RDu. At the time t7, the touch position P enters the input region RDu, and the input region touch period TRu is started. In the input region touch period TRu started at the time t7, the touch position P[t7] is at a position farthest in the +Yv direction from the reference position Ov. Accordingly, at the time t7, the characteristic position determiner 114B determines the touch position P[t7] as the characteristic position CPu.

Subsequently, from the time t7 to the time t8, the touch position P moves from the touch position P[t7] in the input region RDu to the touch position P[t8] in the input region RDd. The input region touch period TRu ends at a time (a time when the touch position P enters the input region RDl) between the time t7 and the time t8. The input region touch period TRd starts at a time (a time when the touch position P enters the input region RDd) between the time t7 and the time t8.

At the time t8, the touch position P[t8] in the input region touch period TRd is at a position farthest in the −Yv direction from the reference position Ov. Accordingly, at the time t8, the characteristic position determiner 114B determines the touch position P[t8] as the characteristic position CPd.

At the time t8, the operation region determiner 115B defines, as the corrected position Md[t8], the midpoint between the characteristic position CPr and the characteristic position CPd. The operation region determiner 115B further defines, as an operation region motion vector Vmd [t8], a vector obtained by taking only the Yv component from a vector having an initial point that is the reference position Ov[t8] and a terminal point that is the corrected position Md[t8].

At the time t9, the operation region determiner 115B moves the reference position Ov[t8], the operation region coordinate system V[t8] and the operation region V[t8] by a movement amount corresponding to the operation region motion vector Vmd[t8], thereby setting the reference position Ov[t9], the operation region coordinate system V[t9] and the operation region V[t9]. That is, the operation region determiner 115B moves the neutral region RN by a movement amount corresponding to the operation region motion vector Vmd[t8]. In the touch position changing example according to this modification, the time t9 is a time after the time t8, but the time t9 may be a time identical to the time t8.

In this modification, by a method similar to that of Modification B1 described above, the operation region determiner 115B may change the size of the neutral region RN, according to either of the following (i) and (ii):

(i) The distance between the characteristic position CPr and the characteristic position CPl in the direction along the Xv axis, and (ii) The distance between the characteristic position CPu and the characteristic position CPd in the direction along the Yv axis.

When the expansion and contraction ratio of the size of the neutral region RN is different between the direction along the Xv axis and the direction along the Yv axis, the shape of the neutral region RN is an ellipse. Adjustment of the position of the neutral region RN along the Yv axis is not executed. That is, the position of the neutral region RN in the direction along the Yv axis may be fixed. The direction along the Xv axis is the +Xv direction or the −Xv direction, and the direction along the Yv axis is the +Yv direction or the −Yv direction.

As described above, in this modification, the operation region determiner 115B determines the position of the neutral region RN in the direction along the Xv axis, on the basis of the touch position P present in the input region RDr and the input region RDl. In addition, the operation region determiner 115B determines the position of the neutral region RN in the direction along the Yv axis, on the basis of the touch position P present in the input region RDu and the input region RDd. Accordingly, in this embodiment, for example, in comparison with a case in which the position of the neutral region RN is fixed on the touch panel 1002, the probability of an unintended input due to the gap of the touch position P is reduced.

Modification B4

In the embodiment described above, the inclination of the operation region coordinate system $\Sigma V$ from the touch panel coordinate system $\Sigma S$ is not changed. However, the present invention is not limited to such an aspect. For example, the operation region determiner 115B may change the inclination of the operation region coordinate system $\Sigma V$ from the touch panel coordinate system $\Sigma S$, on the basis of characteristic positions CP. Modification B4 is similar to Modification A2 except that the neutral region RN is included in the operation region V.

Figure 38:
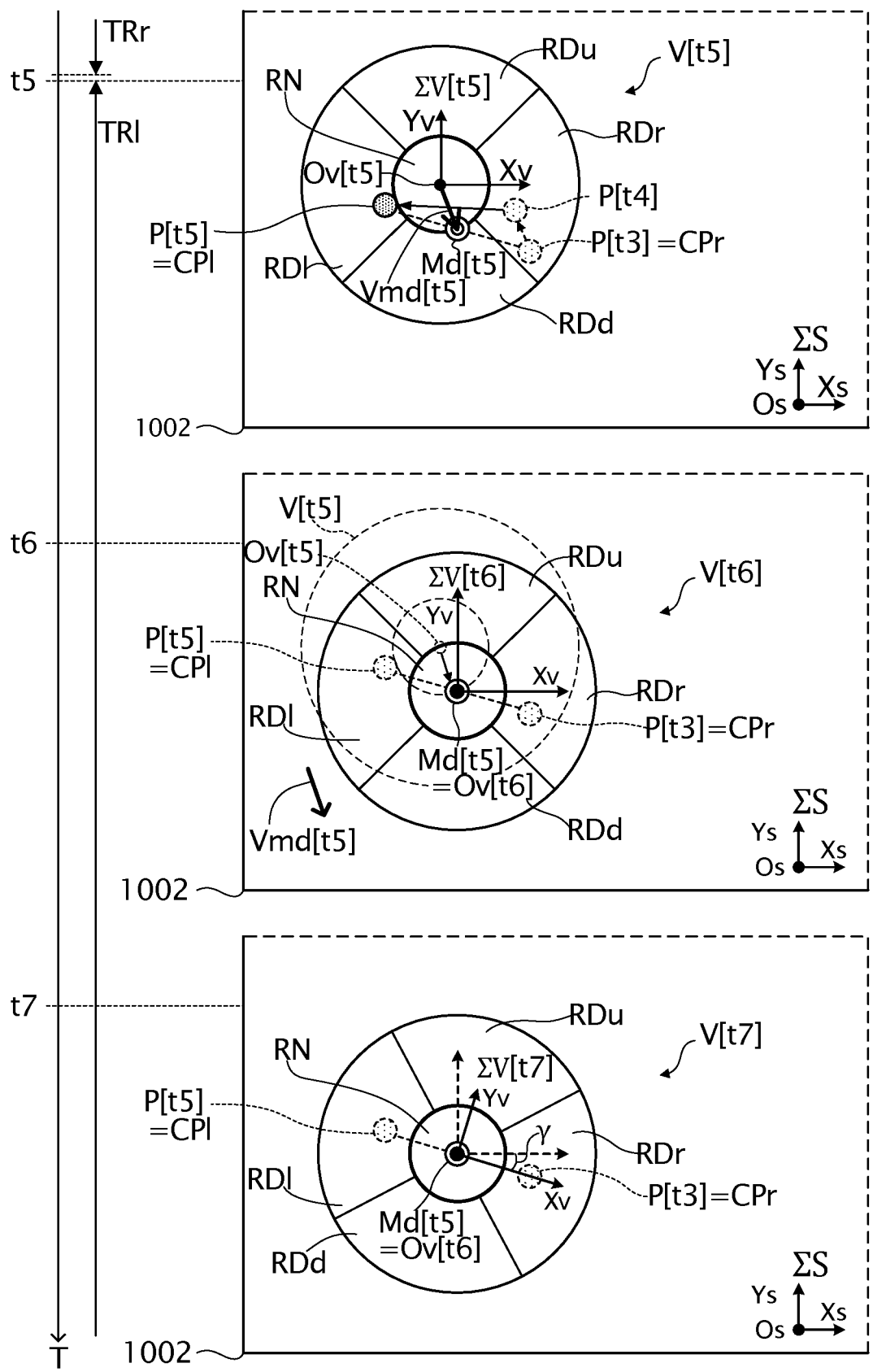
FIG. 38 illustrates an example of operations of a terminal apparatus 10B according to Modification B4.

FIG. 38 illustrates an example of operations of a terminal apparatus 10B according to Modification B4. FIG. 38 shows an example of the touch position changing example according to Modification B4. The touch position changing example shown in FIG. 38 shows an example of the operations of the terminal apparatus 10B in a case in which the inclination of the operation region coordinate system $\Sigma V$ from the touch panel coordinate system $\Sigma S$ is changed. It is assumed that the period from the time t0 to the time t4 in the touch position changing example according to this modification is similar to that in the touch position changing example according to the embodiment shown in FIGS. 27 and 28. The operations of the terminal apparatus 10B at the time t5 shown in FIG. 38 are the same as the operations shown in FIG. 28. Accordingly, description thereof is omitted.

At the time t6, the operation region determiner 115B moves the reference position Ov[t5], the operation region coordinate system ΣV[t5] and the operation region V[t5] by a movement amount corresponding to the operation region motion vector Vmd[t5], thereby setting the reference position Ov[t6], the operation region coordinate system V[t6] and the operation region V[t6].

Subsequently, at the time t7, the operation region determiner 115B defines, as the +Xv direction, the direction from the corrected position Md[t5] to the characteristic position CPr. In addition, the operation region determiner 115B defines, as the +Yv direction, a direction that is from the corrected position Md[t5] to the input region RDu and is orthogonal to the direction from the corrected position Md[t5] to the characteristic position CPr, thereby setting the operation region coordinate system ΣV[t7]. As a result, in the example shown in FIG. 38, the Xv axis and the Yv axis that the operation region coordinate system V[t7] has are inclined by a degree y from the Xv axis and the Yv axis that the operation region coordinate system V[t6] has. The operation region determiner 115B sets the neutral region RN and the input regions RDr, RDl, RDu and RDd at positions based on the operation region coordinate system V[t7] at the time t7.

Specifically, at the time t7, the operation region determiner 115B sets (i) the neutral region RN centered at the reference position Ov, (ii) the input region RDr farther in the +Xv direction than the neutral region RN, (iii) the input region RDl farther in the −Xv direction than the neutral region RN, (iv) the input region RDu further in the +Yv direction than the neutral region RN, and (v) the input region RDd farther in the −Yv direction than the neutral region RN. In the touch position changing example according to this modification, the time t6 and the time t7 are times after the time t5, but the time t6 and the time t7 may be a time identical to the time t5.

As described above, in this modification, the operation region determiner 115B determines the inclinations of the Xv axis and the Yv axis that the operation region coordinate system ΣV has, on the basis of the characteristic position CPr and the characteristic position CPl. Accordingly, in this modification, for example, in comparison with a case in which the inclination of the operation region coordinate system ΣV is fixed on the touch panel 1002, the probability of an unintended input due to the gap of the touch position P is reduced.

Modification B5

In the embodiment and the modifications B1 to B4 described above, if the characteristic position identification condition is satisfied in the input region touch period TR, the characteristic position determiner 114B identifies the touch position P as the characteristic position CP. However, the present invention is not limited to such an aspect. For example, the characteristic position determiner 114B may determine the characteristic position CP on the basis of some or all the touch positions P, among one or more touch positions P, where the touch positions P are indicated by the one or more pieces of touch position information acquired by the touch position information acquirer 113 in the input region touch period TR. Modification B5 is similar to Modification A5 except that the neutral region RN is included in the operation region V.

Figure 39:
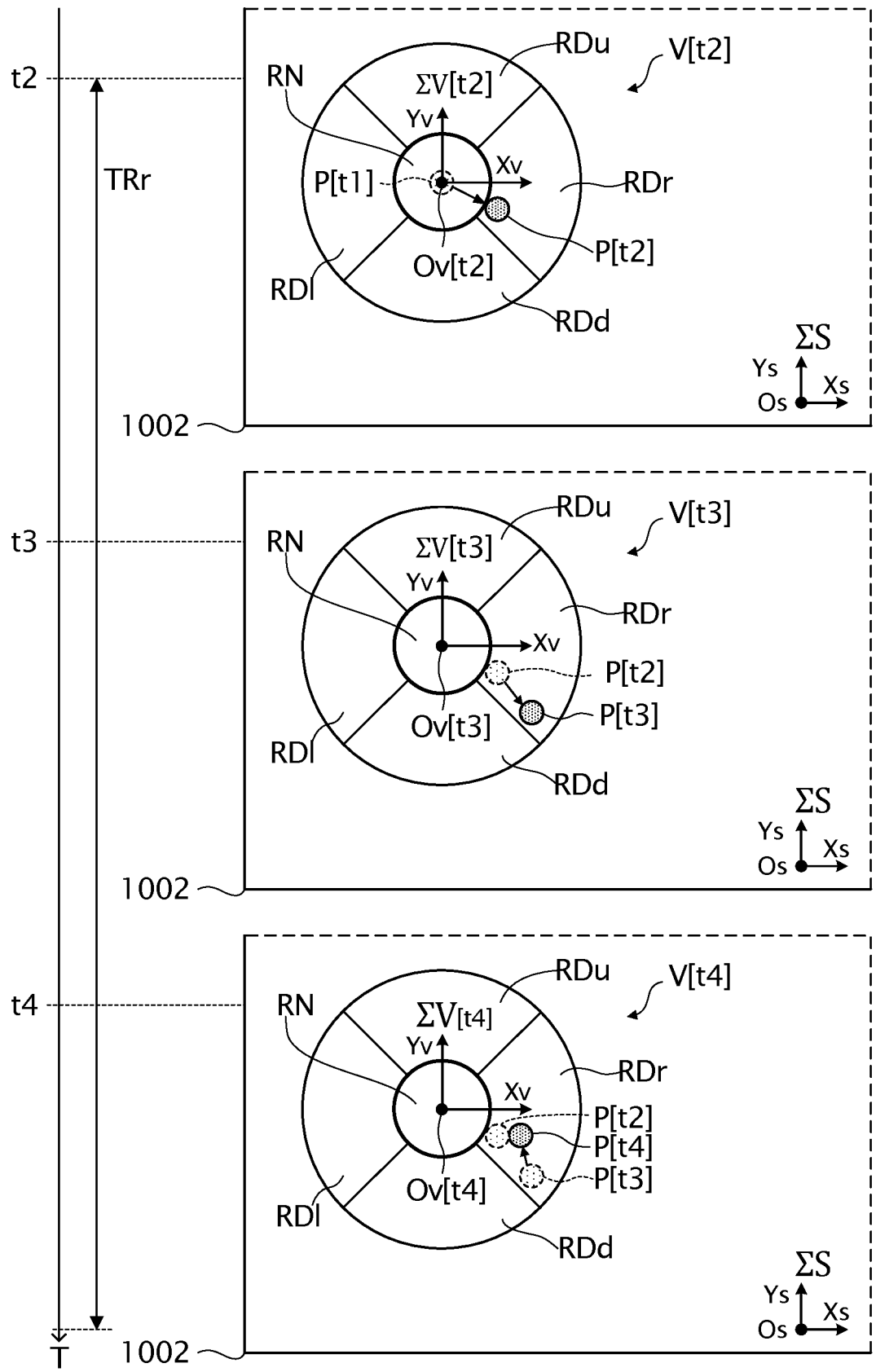
FIG. 39 illustrates an example of operations of a terminal apparatus 10B according to Modification B5.

FIG. 39 illustrates an example of operations of the terminal apparatus 10B according to Modification B5. For example, if three pieces of touch position information, which are acquired by the touch position information acquirer 113 in the input region touch period TRr, indicate the touch positions P[t2], P[t3] and P[t4], the characteristic position determiner 114B may determine, as the characteristic position CPr, the average position of the three touch positions P[t2], P[t3] and P[t4].

For example, the characteristic position determiner 114B may identify, as the characteristic position CP, the touch position P indicated by the touch position information acquired last time, among one or more touch positions P, where the touch positions P are indicated by the one or more pieces of touch position information acquired by the touch position information acquirer 113 in the input region touch period TR.

For example, if two or more touch positions P are present at substantially identical positions for at least the predetermined time period, among touch positions P, the characteristic position determiner 114B may determine the two or more touch positions P as the characteristic position CP. The touch positions P are indicated by the pieces of touch position information acquired by the touch position information acquirer 113 in the input region touch period TR.

Typically, if the touch position P is maintained to be a substantially identical position in the input region RD, there is a high probability that the user making the touch has an intention to touch the input region RD, and there is a high probability that the touch is not an unintended input. Accordingly, for at least the predetermined time period in the input region RD, based on two or more touch positions P present at substantially identical positions, an aspect of determining the characteristic position CP can prevent the neutral region RN and the input region RD from being set at positions contrary to the intention of the user.

Modification B6

The embodiment and the modifications B1 to B5 exemplify the case in which the operation region V is a circle. However, the present invention is not limited to such an aspect. For example, as shown in FIG. 40, a left half of a screen of the touch panel 1002 may be set as the operation region V.

Figure 40:
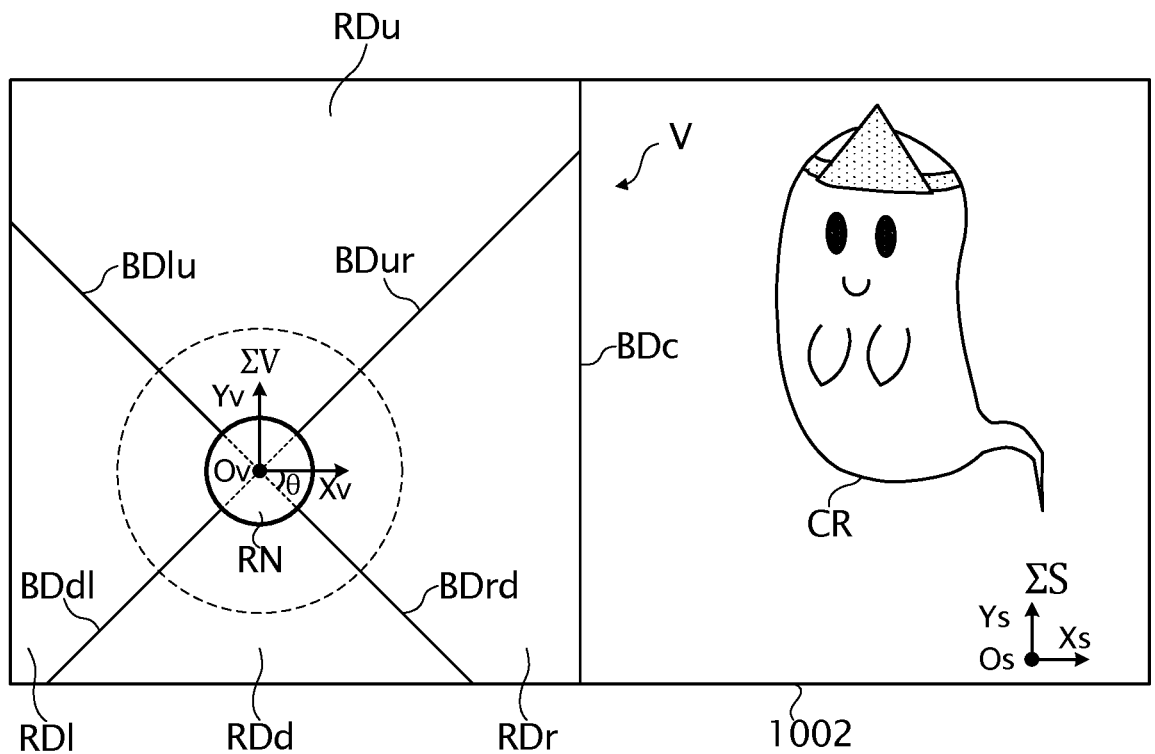
FIG. 40 illustrates an operation region V according to Modification B6.

FIG. 40 illustrates an example of the operation region V according to Modification B6. A line segment BDc in FIG. 40 represents the boundary between the left half of the screen and the right half of the screen of the touch panel 1002. A line segment BDrd shown in FIG. 40 refers to a line segment obtained by extending the line segment BDrd shown in FIG. 22 to the lower side of the touch panel 1002. A line segment BDur shown in FIG. 40 refers to a line segment obtained by extending the line segment BDur shown in FIG. 22 to the line segment BDc. A line segment BDdl shown in FIG. 40 refers to a line segment obtained by extending the line segment BDdl shown in FIG. 22 to the lower side of the touch panel 1002. A line segment BDlu shown in FIG. 40 refers to a line segment obtained by extending the line segment BDlu shown in FIG. 22 to the left side of the touch panel 1002.

In the example shown in FIG. 40, the operation region determiner 115B sets, as the input region RDr, a region obtained by eliminating the neutral region RN from a region enclosed by the following: the line segment BDrd; the line segment BDur; the lower side of the touch panel 1002; and the line segment BDc. The operation region determiner 115B sets, as the input region RDl, a region obtained by eliminating the neutral region RN from a region enclosed by the following: the line segment BDdl; the line segment BDlu; the lower side of the touch panel 1002; and the left side of the touch panel 1002. The operation region determiner 115B sets, as the input region RDu, a region obtained by eliminating the neutral region RN from a region enclosed by the following: the line segment BDur; the line segment BDlu; the left side of the touch panel 1002; and the upper side of the touch panel 1002. The operation region determiner 115B sets, as the input region RDd, a region obtained by eliminating the neutral region RN from a region enclosed by the following: the line segment BDrd; the line segment BDdl; and the lower side of the touch panel 1002.

Modification B7

Figure 41:
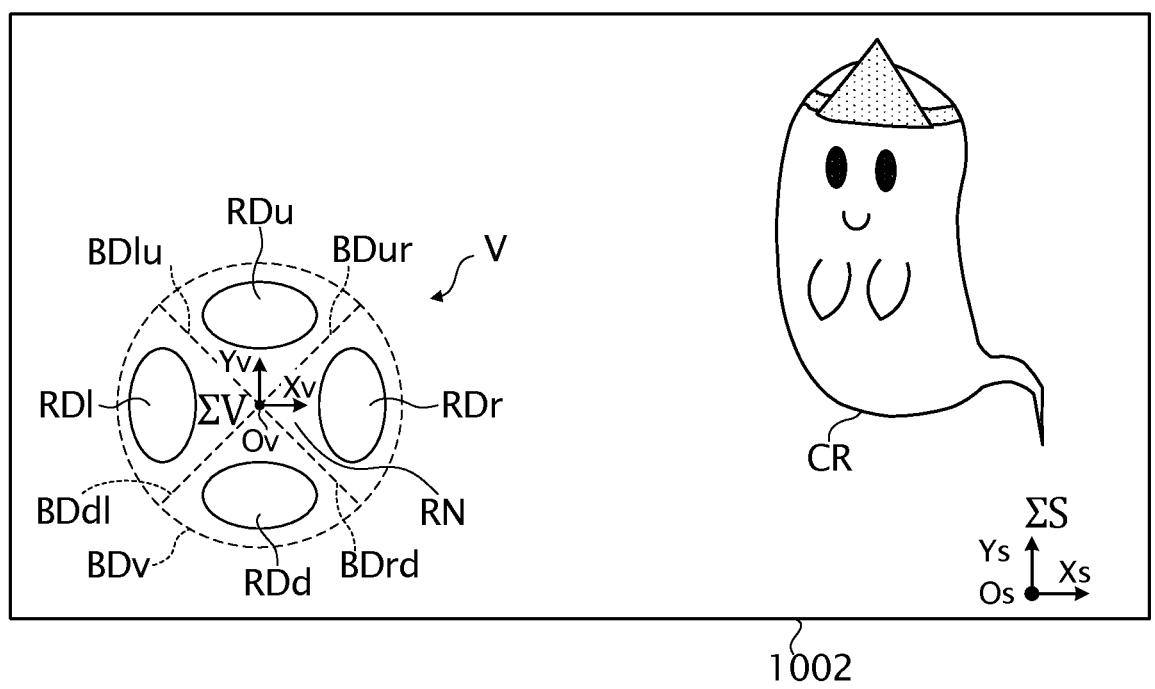
FIG. 41 illustrates an example of a neutral region RN and an input region RD according to Modification B7.

The embodiment and the modifications B1 to B5 exemplify the case in which the input region RD is the region obtained by eliminating the circular neutral region RN from the circular sector region. However, the present invention is not limited to such an aspect. The input region RD may be, for example, an elliptical region, or a polygonal region, as shown in FIG. 41. Modification B7 is similar to Modification A6 except that the neutral region RN is included in the operation region V.

FIG. 41 illustrates an example of the neutral region RN and the input region RD according to Modification B7. In the example shown in FIG. 41, the operation region determiner 115B sets an elliptical input region RDr, in a circular sector region enclosed by the following: the line segment BDrd: the line segment BDur; and the circle BDv. The operation region determiner 115B sets an elliptical input region RDl, in a circular sector region enclosed by the following: the line segment BDdl; the line segment BDlu; and the circle BDv. The operation region determiner 115B sets an elliptical input region RDu, in a circular sector region enclosed by the following: the line segment BDur; the line segment BDlu; and the circle BDv. The operation region determiner 115B sets an elliptical input region RDd, in a circular sector region enclosed by the following: the line segment BDrd; the line segment BDdl; and the circle BDv. The operation region determiner 115B sets, as the neutral region RN, the entire region or a part of the region that is a region on the touch panel 1002 other than the input region RD. Even in a case in which the part of the region on the touch panel 1002 other than the input region RD is set in the neutral region RN, the neutral region RN is set so as to include a region between the input region RDr and the input region RDl.

Modification B8

Figure 42:
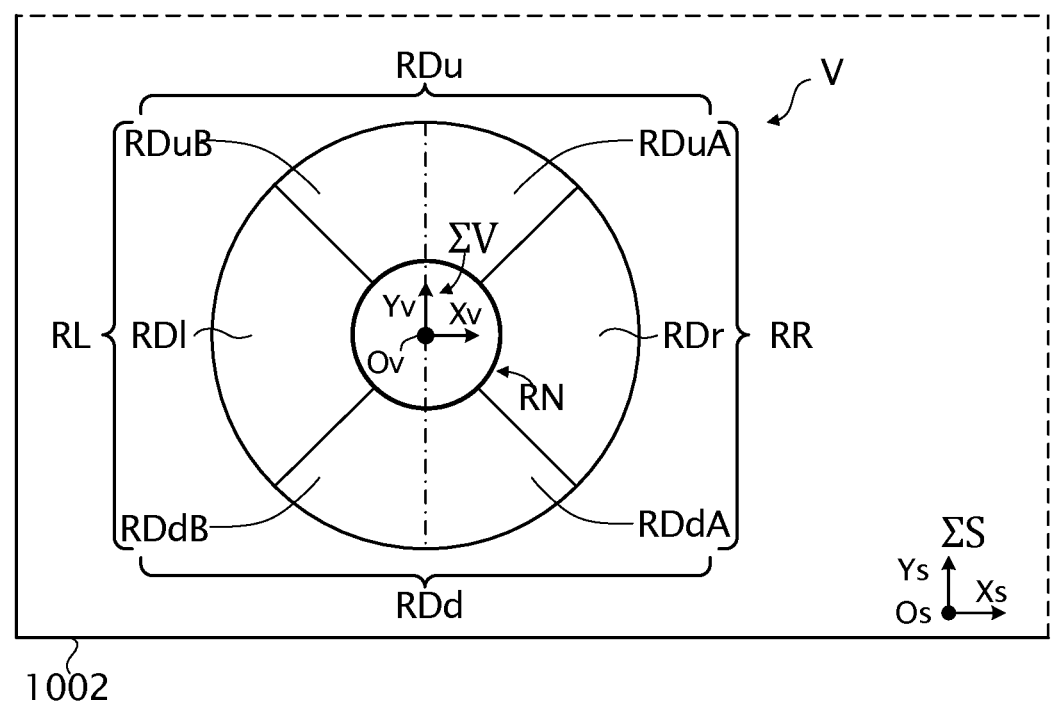
FIG. 42 illustrates a direction-region according to Modification B8.

The embodiment and Modifications B1 to B7 exemplify the case in which the characteristic position CPr is determined on the basis of the touch position P present in the input region RDr, and the characteristic position CPl is determined on the basis of the touch position P present in the input region RDl. However, the present invention is not limited to such an aspect. For example, as shown in FIG. 42, the characteristic position determiner 114B may determine the characteristic position CPr on the basis of the touch position P present in a first direction-region RR including the input region RDr. In addition, the characteristic position determiner 114B may determine the characteristic position CPl on the basis of the touch position P present in a second direction-region RL including the input region RDl.

FIG. 42 illustrates an example of the direction-region according to Modification B8. The input region RDuA in FIG. 42 represents a region that is of the input region RDu and is in the +Xv direction from the Yv axis. The input region RDuB indicates a region that is of the input region RDu and is in the −Xv direction from the Yv axis. The input region RDdA indicates a region that is of the input region RDd and is in the +Xv direction from the Yv axis. The input region RDdB indicates a region that is of the input region RDd and is in the −Xv direction from the Yv axis. The first direction-region RR includes the input region RDr, the input region RDuA, and the input region RDdA. The second direction-region RL includes the input region RDl, the input region RDuB, and the input region RDdB.

Modification B9

Figure 43:
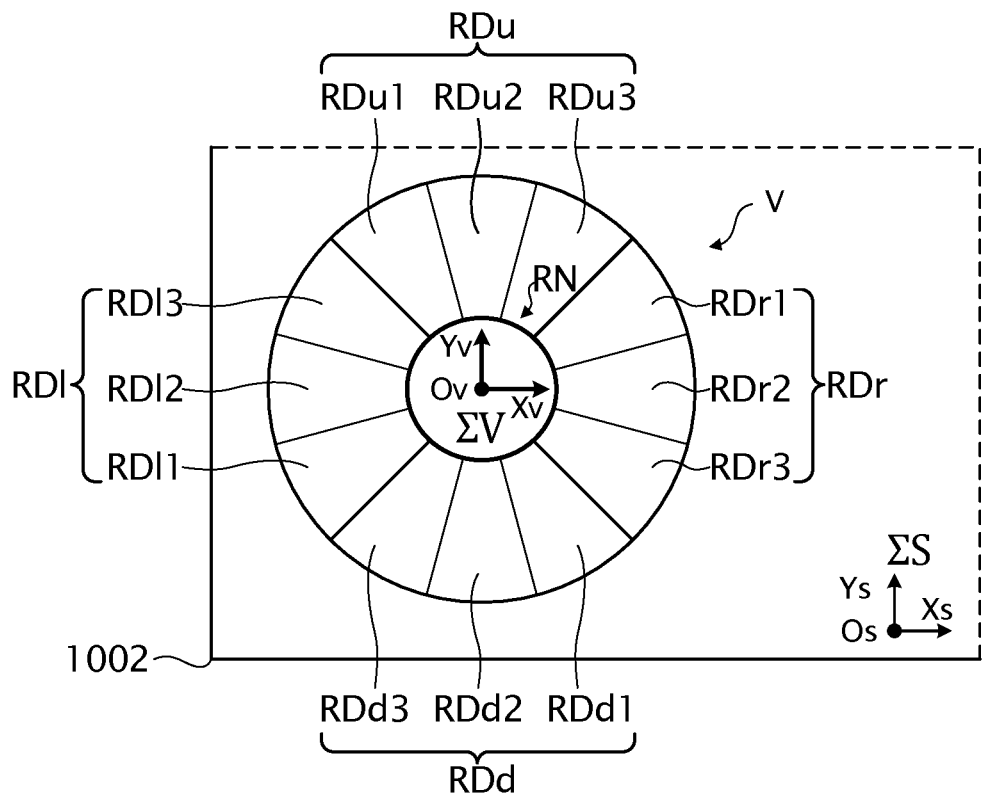
FIG. 43 illustrates an example of an operation region V according to Modification B9.

In the embodiment and the modifications B1 to B8, the input region RD is a region for inputting an instruction in a single direction related to the predetermined game. However, the present invention is not limited to such an aspect. For example, as shown in FIG. 43, each input region RD may include K subregions for inputting K directions (K is a natural number of two or more). Modification B9 is similar to Modification A8 except that the neutral region RN is included in the operation region V.

FIG. 43 illustrates an example of the operation region V according to Modification B9. In the example shown in FIG. 43, each input region RD includes three subregions for inputting instructions for three directions. For example, the input region RDr includes subregions RDr1, RDr2 and RDr3. The input region RDl includes subregions RDl1, RDl2 and RDl3. The input region RDu includes subregions RDu1, RDu2 and RDu3. The input region RDd includes subregions RDd1, RDd2 and RDd3.

Modification B10

The embodiment and the modifications B1 to B9 described above exemplify cases in which the operation region V includes four input regions RDr, RDl, RDu and RDd. However, the present invention is not limited to such an aspect. For example, the operation region V is only required to include M input regions RDs (M is a natural number of two or more). Modification B10 is similar to Modification A9 except that the neutral region RN is included in the operation region V.

Figure 44:
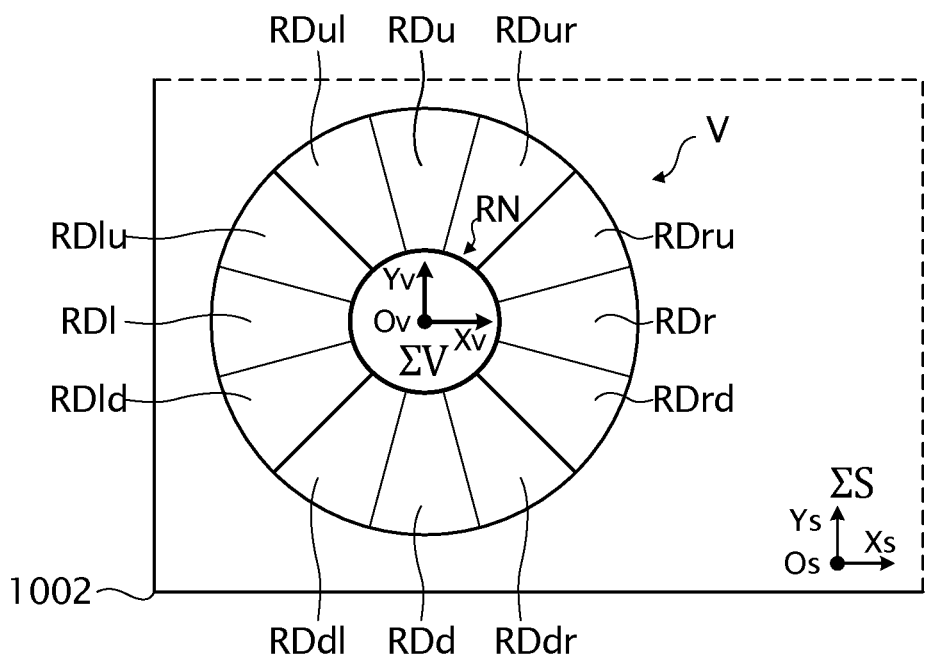
FIG. 44 illustrates an example of an operation region V according to Modification B10.

FIG. 44 illustrates an example of an operation region V according to Modification B10. In the example shown in FIG. 44, the operation region V includes 12 input regions RD. The operation region V includes input regions RDru, RDr, RDrd, RDdr, RDd, RDdl, RDld, RDl, RDlu, RDul, RDu and RDur, for example. The input region RDr and the input region RDl may be provided at symmetric positions with respect to the reference position Ov. In Modification B10, the neutral region RN is arranged between the input region RDr and the input region RDl.

Modification B11

In the embodiment and the modifications B1 to B4 and the modifications B6 to B10 described above, if the characteristic position identification condition is satisfied in the input region touch period TR, the characteristic position determiner 114B identifies the touch position P as the characteristic position CP. Here, the characteristic position identification condition indicates that the touch position P refers to a position farthest from the reference position Ov in the direction indicative of the input region RD from the reference position Ov. However, the present invention is not limited to such an aspect. For example, if the following condition is satisfied, the characteristic position determiner 114B may identify, as the characteristic position CP, the touch position P corresponding to a certain time in the input region touch period TR. The condition indicates that the touch position P, which is indicated by the touch position information acquired by the touch position information acquirer 113 at the certain time, is away, in the direction indicative of the input region RD from the reference position Ov, from a referring position. The referring position is defined based on one or more touch positions P, where the touch positions P are indicated by one or more pieces of touch position information acquired by the touch position information acquirer 113 in a period from the time of the start of the input region touch period TR to the certain time. Modification B11 is similar to Modification A4 except that the neutral region RN is included in the operation region V.

Modification B12

In the embodiment and the modifications B1 to B11 described above, is the first direction indicative of the input region RDr from the reference position Ov, and the second direction indicative of the input region RDl from the reference position Ov are opposite directions. However, the present invention is not limited to such an aspect. For example, the angle between the first direction and the second direction may be greater than 0 degrees and less than 180 degrees. Modification B12 is similar to Modification A10 except that the neutral region RN is included in the operation region V.

Modification B13

In the embodiment and the modifications B1 to B12, the input region RD is a region for inputting an instruction in the direction in which the face of the character CR is oriented. However, the present invention is not limited to such an aspect. The input region RD may be a region for inputting an instruction related to the predetermined game. Modification B13 is similar to Modification A11 except that the neutral region RN is included in the operation region V.

Modification B14

In the embodiment and the modifications B1 to B13, the description has been given with the program related to the predetermined game being exemplified as the program. However, the present invention is not limited to such an aspect. The program may be related to any application. Modification B14 is similar to Modification A12 except that the neutral region RN is included in the operation region V.

Modification B15

In the embodiment and the modifications B1 to B14 described above, if the touch position P moves from one input region RD to the neutral region RN and subsequently reenters the one input region RD without entrance into another input region RD, the determination result of the characteristic position CP at completion of the one input region touch period TR is not discarded. However, the present invention is not limited to such an aspect. For example, if the touch position P moves from one input region RD to the neutral region RN and subsequently reenters the one input region RD without entrance into another input region RD, the determination result of the characteristic position CP at completion of the one input region touch period TR may be discarded. Specifically, in the input region touch period TR started by reentrance of the touch position P into a certain input region RD, the characteristic position determiner 114B may discard the determination result of the characteristic position CP at the time of completion of the one input region touch period TR, and determine a new characteristic position CP.

Modification B16

In the embodiment and the modifications B1 to B15, the description has been given exemplifying the case in which the initial value of the characteristic position CP is not specifically determined. However, the present invention is not limited to such an aspect. For example, the initial value of the characteristic position CP of each input region RD may be determined. Specifically, when the predetermined game is activated, the characteristic position determiner 114B may set, as the initial value of the characteristic position CPr, a position away from the neutral region RN in the +Xv direction by a predetermined distance (e.g., a distance DIS). In addition, the characteristic position determiner 114B may set, as the initial value of the characteristic position CPl, a position away from the neutral region RN in the −Xv direction by a predetermined distance (e.g., a distance DIS).

Modification B17

In the embodiment and Modifications B1 to B16, the operation region determiner 115B sets the operation region V at a predetermined position on the touch panel 1002 when the predetermined game is activated. However, the present invention is not limited to such an aspect. For example, every time touch-in occurs, the operation region determiner 115B may set the touch position P of finger FG on the touch panel 1002 as the reference position Ov, and set the operation region V at a position based on the reference position Ov. In this case, the terminal apparatus 10B maintains the state in which the operation region V is set on the touch panel 1002 in the touch period that is a period during which finger FG of the user is kept in contact with the touch panel 1002. When the finger FG of the user is changed from the state of being in contact with the touch panel 1002 to the state of not being in contact therewith, the terminal apparatus 10B causes the operation region V set on the touch panel 1002 to disappear.

Modification B18

In the embodiment and Modifications B1 to B17 described above, the operation region determiner 115B freely moves the reference position Ov according to the characteristic position CP on the touch panel 1002. However, the present invention is not limited to such an aspect. For example, the movement range of the reference position Ov may be limited within a predetermined range (e.g., a range defined by a quadrangle BDq shown in FIG. 45).

Figure 45:
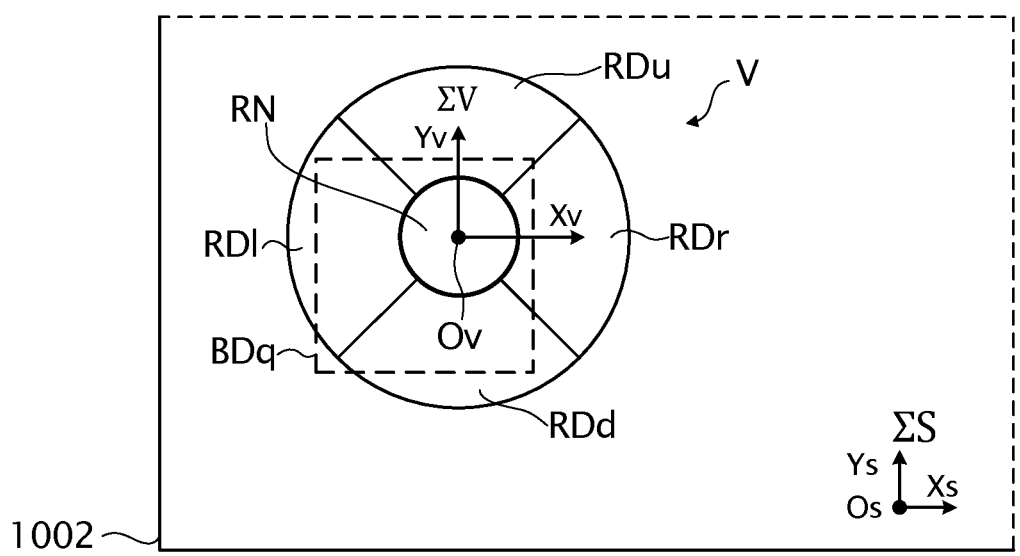
FIG. 45 illustrates an example of operations of a terminal apparatus 10B according to Modification B18.

FIG. 45 a diagram for illustrating an example of operations of the terminal apparatus 10B according to Modification B18. In the example shown in FIG. 45, the movement range of the reference position Ov is limited within the range defined by the quadrangle BDq (preset range). More specifically, when the reference position Ov calculated based on the characteristic position CPr and the characteristic position CPl is present outside of the quadrangle BDq, the operation region determiner 115B defines the reference position Ov in the quadrangle BDq such that the reference position Ov does not cross the outer periphery of the quadrangle BDq. When the reference position Ov calculated based on the characteristic position CPr and the characteristic position CPl is present outside of the quadrangle BDq, there is a high probability of an unintended input being made by touching a position far away from a position intended by the user, with finger FG of the user (e.g., temporary gap of the position of finger FG due to vibrations of a train). In Modification B18, a limitation is placed on the movement range of the reference position Ov. Accordingly, the input region RD and the neutral region RN can be prevented from moving a large amount upward or to the right on the touch panel 1002. As a result, in Modification B18, the operability can be improved in comparison with a case in which the movement range of the reference position Ov is not limited.

Modification B19

In the embodiment and Modifications B1 to B18, the predetermined game is executed by the terminal apparatus 10B. However, the present invention is not limited to such an aspect. The predetermined game may be executed by a configuration element other than the terminal apparatus 10B. Modification B19 is similar to Modification A13 except that the neutral region RN is included in the operation region V. For example, the server apparatus 30A shown in FIG. 21 may include a controller 11B instead of the controller 11.

C. Appendixes

According to the above description, the present invention is understood as follows. For facilitating understanding of each mode, hereinafter, reference signs of the drawings are assigned in parentheses for the sake of convenience. However, this is not intended to limit the present invention to the mode shown in the drawings.

Appendix 1

A non-transitory computer readable recording medium (e.g., a memory 1001), according to an aspect of the present invention, having recorded thereon a program, the program causes a processor (e.g., a processor 1000) of an information processing apparatus (e.g., a terminal apparatus 10) to function as: an acquirer (e.g., a touch position information acquirer 113) configured to acquire touch position information indicative of a touch position (e.g., a touch position P) on a touch panel (e.g., a touch panel 1002); an identifier (e.g., a characteristic position determiner 114) configured to: identify, as a first position (e.g., a characteristic position CPr), a position based on a touch position indicated by the touch position information acquired by the acquirer, if (a) the touch position is in a first input region (e.g., an input region RDr) for receiving an input of an instruction in a first operation direction (e.g., +Xs direction), the instruction being related to a game to be input therein, in a touch period during which continuous touching of the touch panel is carried out, and (b) the touch position satisfies a first condition related to the touch position, and identify, as a second position (e.g., a characteristic position CPl), the position based on the touch position indicated by the touch position information acquired by the acquirer, if (c) the touch position is in a second input region (e.g., an input region RDl) for receiving an input of an instruction in a second operation direction (e.g., −Xs direction), the instruction being related to the game to be input therein, in the touch period, and (d) the touch position satisfies a second condition related to the touch position; and a determiner (e.g., operation region determiner 115) configured to determine positions of the first input region and the second input region, based on the first position and the second position identified by the identifier.

In this aspect, the determiner determines the positions of the first input region and the second input region (hereinafter, the first input region and the second input region are collectively referred to as "input region" in some cases), on the basis of the following: the first position that is a position based on the touch position in the first input region; and the second position that is a position based on the touch position in the second input region (hereinafter, the first position and the second position are collectively referred to as "characteristic position" in some cases). Consequently, in this aspect, even if the touch position in the input region gradually is out of position, the determiner can correct the position of the input region in response to the gap of the touch position. Accordingly, in this aspect, for example, in comparison with a case in which the position of the input region is fixed, the probability of an unintended input due to the gap of the touch position on the touch panel is reduced.

An aspect can be considered in which the positions of the first input region and the second input region are determined on the basis of one characteristic position (hereinafter, this aspect is referred to as a "comparative example"). Specifically, in the comparative example, for instance, a first representative position, which is a position representing the first input region, such as the center position or the centroid of the first input region, is determined at a position corresponding to one characteristic position, and a second representative position, which is a position representing the second input region, such as the center position or the centroid of the second input region, is determined at a position corresponding to the first representative position (hereinafter, the first input region and the second input region are collectively referred to as "representative position" in some cases). For example, in the comparative example, one characteristic position is determined as the first representative position, and a position having a predetermined positional relationship with the first representative position is determined as the second representative position. That is, in the comparative example, there can be adjusted the relative positional relationships between the characteristic positions and the representative positions of the respective input regions, or the intervals between the characteristic positions and the representative positions of the respective input regions. In other words, the comparative example is only what determines the positions of the first input region and the second input region under either of the following constraints (i) and (ii):

(i) A constraint in which the relative positional relationships between the characteristic positions and the representative positions of the respective input regions are maintained to be predetermined positional relationships, and (ii) A constraint in which the intervals between the characteristic positions and the representative positions of the respective input regions are maintained to be predetermined intervals.

In contrast, for example, when the user touches the touch panel with a finger, the size and shape of the finger of the user are different for each user. For example, when the user touches the touch panel with a finger, the pressure when the user touches the touch panel with the finger, the inclination of the finger from the touch panel, the way the finger is moved and the like are different for each user. As described above, when the user touches the touch panel with a finger, the way it is touched is different for each user. Accordingly, when the user touches the touch panel with a finger, there are differences for each user in that (i-a) the relative positional relationships between the characteristic positions and the representative positions of the respective input regions, and (i-b) the intervals between the characteristic positions and the representative positions of the respective input regions. Consequently, for the sake of favorably maintaining, for any user, the operability in the operation for inputting an instruction in the first operation direction and the operation for inputting an instruction in the second operation direction, it is preferable to adjust the above (i-a) the relative positional relationships between the characteristic positions and the representative positions of the respective input regions, and the above (i-b) the intervals between the characteristic positions and the representative positions of the respective input regions, according to the way of touching of each user.

However, in the comparative example, as described above, it is difficult to adjust any of the above (i-a) the relative positional relationships between the characteristic positions and the representative positions of the respective input regions, and the above (i-b) the intervals between the characteristic positions and the representative positions of the respective input regions. Accordingly, in the comparative example, for any user, it is difficult to favorably maintain the operability in the operation for inputting an instruction in the first operation direction and the operation for inputting an instruction in the second operation direction.

In contrast, according to this aspect, the determiner determines the positions of the first input region and the second input region, using two characteristic positions of the first position and the second position. In general, there is a high probability that the relative positional relationship between the first position and the second position, and the interval between the first position and the second position are determined according to the way of touching of each user. Accordingly, in this aspect, it is possible for any user to favorably maintain operability in the operation for inputting an instruction in the first operation direction and the operation for inputting an instruction in the second operation direction, in comparison with the comparative example.

In the aspect described above, "the first operation direction related to the game" is an example of "the operation direction related to the game". "The operation direction related to the game" may be a direction in a virtual space related to the game, or may be a direction on a screen related to the game, for example. "The direction in the virtual space related to the game" is the direction of change in one or both of the position and orientation of a game element in the virtual space related to the game, for example. Here, "game element" may be a virtual object that is present in the virtual space related to the game, or may be a virtual camera that takes images of the virtual space related to the game, for example. The "virtual object that is present in the virtual space related to the game" may be a concept that includes a character related to the game, and an object related to the game. The "direction on the screen related to the game" may be a direction of change in one or both of the position and orientation of an image, the image being indicative of a virtual object displayed on the screen related to the game. Alternatively the "direction on the screen related to the game" may be a direction of movement of an image on a menu screen related to the game, the image being indicative of a game element that is a pointer or the like displayed on the menu screen and is unrelated to the progress of the game.

In the above aspect, "the second operation direction related to the game" is another example of "the operation direction related to the game". Here, "the second operation direction" is a direction different from the first operation direction. "The second operation direction" may be the direction opposite to the first operation direction, for example.

In the above aspect, "the first input region" may be a region provided on the touch panel in a viewable way to receive an input of an instruction that is in the first operation direction and is related to the game, or may be a virtual region provided on the touch panel in an invisible way to receive an input of an instruction that is in the first operation direction and is related to the game, for example. "The second input region" may be a region that is different from the first input region and is provided on the touch panel in a viewable way to receive an input of an instruction in the second operation direction, where the instruction is related to the game to be input therein. Alternatively, "the second input region" may be a virtual region that is different from the first input region and is provided on the touch panel in an invisible way to receive an input of an instruction in the second operation direction, where the instruction is related to the game to be input therein, for example.

In the aspect described above, "first condition" may be, for example, a condition for a dwelling range of the touch position indicated by the touch position information, or may be a condition for a history of the touch position indicated by the touch position information, or may be a condition for the movement velocity of the touch position indicated by the touch position information. Here, "condition for a history of the touch position indicated by the touch position information" may be a condition in which the touch position indicated by the touch position information is a position farthest away from the reference position in a predetermined direction, in a period during which the touch position indicated by the touch position information is in the first input region, for example. Specifically, "condition for a history of the touch position indicated by the touch position information" may be a condition in which the touch position indicated by the touch position information is a position farthest in the first direction from the second input region, in a period during which the touch position indicated by the touch position information is in the first input region, if the first input region is present at a position farther in the first direction than the second input region, for example. The "condition for a dwelling range of the touch position indicated by the touch position information" may be a condition in which the touch position indicated by the touch position information is in a predetermined range for at least the predetermined time period in the first input region, in the period during which the touch position indicated by the touch position information is in the first input region, for example. Specifically, the "condition for a dwelling range of the touch position indicated by the touch position information" may be a condition in which the touch position indicated by the touch position information is at a substantially identical position for at least a predetermined time period in the first input region, for example. Here, the fact that a certain position and another position are at "substantially identical position" may mean that the certain position and the other position may be the same position, or may be the certain position and the other position have a positional relationship with a predetermined distance or less, for example. The "second condition" may be a condition for a dwelling range of the touch position indicated by the touch position information, may be a condition for a history of the touch position indicated by the touch position information, or may be a condition for the movement velocity of the touch position indicated by the touch position information, for example. Specifically, the "second condition" may be a condition in which the touch position indicated by the touch position information is a position farthest in the second direction from the first input region, in a period during which the touch position indicated by the touch position information is in the second input region, if the second input region is present at a position farther in the second direction than the first input region, for example. The "second condition" may be a condition in which the touch position indicated by the touch position information is at a substantially identical position in the second input region for at least a predetermined time period, for example.

In the aspect described above, the "position based on the touch position" may be a position identified using the touch position, or may be a position defined with reference to the touch position, for example. Specifically, the "position based on the touch position" may be a position identical to the touch position, an average position of the touch positions in a predetermined period, or may be a position having a predetermined distance from the touch position, for example.

Appendix 2

The recording medium according to another aspect of the present invention is a recording medium as recited in Appendix 1, in which: if (e) the touch position indicated by the touch position information acquired by the acquirer is in a first region (e.g., an extended region RDXr) including the first input region and (f) the touch position satisfies the first condition in the touch period, the identifier is configured to identify the position based on the touch position as the first position, and if (g) the touch position indicated by the touch position information acquired by the acquirer is in a second region (e.g., an extended region RDXl) including the second input region and (h) the touch position satisfies the second condition in the touch period, the identifier is configured to identify the position based on the touch position as the second position.

In this aspect, the determiner determines the positions of the first input region and the second input region, using two characteristic positions that are the first position and the second position. Consequently, in this aspect, even if the touch position in the input region gradually is out of position, the determiner can correct the position of the input region in response to the gap of the touch position. According to this aspect, the determiner determines the positions of the first input region and the second input region using the two characteristic positions. Consequently, it is possible for any user to favorably maintain the operabilities of the operation for inputting an instruction in the first operation direction, and the operation for inputting an instruction in the second operation direction maintained in comparison with the comparative example. Furthermore, according to this aspect, the position based on the touch position in the first region including the first input region is identified as the first position, and the position based on the touch position in the second region including the second input region is identified as the second position. That is, according to this aspect, even if the touch position moves out of the input region, the position of the input region can be corrected using the characteristic position based on the touch position. Consequently, according to this aspect, for example, only when the touch position is in the input region, setting of the input region flexibly supporting various way of touching can be achieved in comparison with the case of correcting the position of the input region.

In the aspect described above, the "first region" may be a region identical to the first input region, or may be a region that includes the first input region and is wider than the first input region, for example. The "second region" may be a region that does not include the first region and is identical to the second input region, or may be a region that does not include the first region, includes the second input region and is wider than the second input region, for example.

Appendix 3

The recording medium according to another aspect of the present invention is a recording medium as recited in Appendix 1, in which: if the touch position indicated by the touch position information acquired by the acquirer is changed from a state of being at a position out of the first input region to a state of being in the first input region in the touch period, the identifier is configured to identify the position based on the changed touch position as the first position, and if the touch position indicated by the touch position information acquired by the acquirer is changed from a state of being at a position out of the second input region to a state of being in the second input region in the touch period, the identifier is configured to identify the position based on the changed touch position as the second position.

In this aspect, for example, the identifier identifies, as a characteristic position, a position based on the touch position present in one input region at a first time point. In a case in which the touch position is present outside of the one input region at a second time point after the first time point, and the touch position is present in the one input region again at a third time point after the second time point, the identifier identifies a position based on the touch position at the third time point as the characteristic position. Accordingly, in this aspect, the identifier can set a new characteristic position at the third time point without any restriction by the characteristic position identified at the first time. That is, in this aspect, even if the touch position is changed, the determiner can flexibly determine an input position in response to the change in the touch position without any restriction by the characteristic position identified at the past time point.

Appendix 4

The recording medium according to another aspect of the present invention is a recording medium as recited in Appendix 1 or 3, in which: if the touch position indicated by the touch position information acquired by the acquirer is farthest in a first direction from a reference position in a first touch period, the first touch period being included in the touch period, and in the first touch period the touch position being in the first input region, the identifier is configured to identify the position based on the touch position as the first position, and if the touch position indicated by the touch position information acquired by the acquirer is farthest in a second direction from the reference position in a second touch period, the second touch period being included in the touch period, and in the second touch period the touch position being in the second input region, the identifier is configured to identify the position based on the touch position as the second position.

In general, the relative positional relationship and the interval between the following positions (i) and (ii) change according to the way of touching for each user: (i) the touch position farthest away in the first direction from the reference position among the touch positions present in the first input region; and (ii) touch position farthest away in the second direction from the reference position among the touch positions present in the second input region. In this aspect, when the touch position is present in the first input region and is farthest away in the first direction from the reference position, the identifier identifies a position based on the touch position as the first position. When the touch position is present in the second input region and is farthest away in the second direction from the reference position, the identifier identifies a position based on the touch position as the second position. Accordingly, in this aspect, it is possible for any user to favorably maintain the operability in the operation for inputting an instruction in the first operation direction and the operation for inputting an instruction in the second operation direction in comparison with the comparative example.

In the aspect described above, the "reference position" may be a position between the first input region and the second input region, may be a position having substantially identical distance from the first input region and the second input region, or may be any position on the touch panel, for example.

In the aspect described above, the "first direction" may be a direction indicative of any position included in the first input region from the reference position, or may be a direction different from a direction indicative of any position included in the first input region from the reference position, for example. The "second direction" refers to a direction different from the first direction. The "second direction" may be a direction opposite to the first direction, or may be a direction intersecting with the first direction, for example. Specifically, the "second direction" may be a direction indicative of any position included in the second input region from the reference position, or may be a direction different from the direction indicative of any position included in the second input region from the reference position, for example.

Appendix 5

The recording medium according to another aspect of the present invention is a recording medium as recited in Appendix 1 or 3, in which: if the touch position indicated by the touch position information acquired by the acquirer is at a position farther in a first direction than a first referring position in a first touch period which is included in the touch period and during which the touch position is in the first input region, the identifier is configured to identify the position based on the touch position as the first position, the first referring position being defined based on a history of the touch position during the first touch period, and if the touch position indicated by the touch position information acquired by the acquirer is at a position farther in a second direction than a second referring position in a second touch period which is included in the touch period and during which the touch position is in the second input region, the identifier is configured to identify the position based on the touch position as the second position, the second referring position being defined based on a history of the touch position during the second touch period.

In general, the relative positional relationship and the interval between the following positions (i) and (ii) change according to the way of touching of each user: (i) a touch position when the touch position is present farther in the first direction from the first referring position in the first touch period; and (ii) a position when the touch position is present farther in the second direction from the second referring position in the second touch period. In this aspect, the identifier identifies, as the first position, a position based on the touch position when the touch position is present farther in the first direction than the first referring position in the first touch period. Furthermore, the identifier identifies, as the second position, a position based on the touch position when the touch position is present farther in the second direction than the second referring position in the second touch period. Accordingly, in this aspect, it is possible for any user to favorably maintain the operabilities of the operation for inputting an instruction in the first operation direction and the operation for inputting an instruction in the second operation direction in comparison with the comparative example.

In the aspect described above, the "first referring position" may be a position based on the touch position indicated by the touch position information at a time when the touch position indicated by the touch position information is a position farthest away in the first direction from the position between the first input region and the second input region in a period before the current time in the first touch period, for example. The "first referring position" may be an average position of touch positions indicated by the touch position information in the period before the current time in the first touch period, for example. The "second referring position" may be a position based on the touch position indicated by the touch position information at a time when the touch position indicated by the touch position information is a position farthest away in the second direction from the position between the first input region and the second input region in a period before the current time in the second touch period, for example. The "second referring position" may be an average position of touch positions indicated by the touch position information in the period before the current time in the second touch period, for example.

Appendix 6

The recording medium according to another aspect of the present invention is a recording medium as recited in Appendix 4, in which the determiner is configured to: determine a position between the first position and the second position, as the reference position; determine a position of the first input region such that the first input region is at a position farther in the first direction than the reference position; and determine a position of the second input region such that the second input region is at a position farther in the second direction than the reference position.

In general, the relative positional relationship and the interval between the following positions (i) and (ii) change according to the way of touching for each user: (i) the touch position farthest away in the first direction from the reference position among the touch positions present in the first input region; and (ii) the touch position farthest away in the second direction from the reference position among the touch positions present in the second input region. In this aspect, when the touch position is in the first input region set farther in the first direction than the reference position and is farthest away in the first direction from the reference position, the identifier identifies the position based on the touch position as the first position. When the touch position is in the second input region set farther in the second direction than the reference position and is farthest away in the second direction from the reference position, the identifier identifies the position based on the touch position as the second position. Accordingly, in this aspect, the operabilities of the operation for inputting an instruction in the first operation direction and the operation for inputting an instruction in the second operation direction for any user can be maintained favorably in comparison with the comparative example.

Appendix 7

The recording medium according to another aspect of the present invention is a recording medium as recited in Appendix 4 or 6, in which if a state in which touching of the touch panel is not carried out is changed to a state in which touching of the touch panel is carried out, the determiner is configured to determine, as the reference position, a position based on the touch position indicated by the touch position information acquired by the acquirer after the change.

In this aspect, when a state without touching the touch panel is changed to a state with touching, the determiner determines, as the reference position, the position based on the touch position after the change to the state with touching. That is, in this aspect, the determiner determines the positions of the first input region and the second input region on the basis of the first position and the second position identified by the touch position when touching of the touch panel occurs. Consequently, according to this aspect, for example, the probability that an input region different from a desired input region is accidentally touched when touching on the touch panel occurs is reduced, in comparison with a case in which the reference position and the positions of the first input region and the second input region are determined in advance. In other words, according to this aspect, for example, the probability of causing an unintended input is reduced in comparison with the case in which the reference position and the positions of the first input region and the second input region are determined in advance.

Appendix 8

The recording medium according to another aspect of the present invention is a recording medium as recited in Appendix 1 or 3, in which: if the touch position indicated by the touch position information acquired by the acquirer is at a substantially identical position in the first input region for at least a predetermined time period in the touch period, the identifier is configured to identify the position based on the touch position as the first position, and if the touch position indicated by the touch position information acquired by the acquirer is at a substantially identical position in the second input region for at least the predetermined time period in the touch period, the identifier is configured to identify the position based on the touch position as the second position.

In this aspect, when the touch position is at a substantially identical position in the input region for at least the predetermined time period, the identifier identifies the position based on the touch position as the characteristic position. Typically, when the touch position is maintained to be a substantially identical position in the input region, there is a high probability that the user performing the touching has an intention of touching this input region, and there is a high probability that the touching is not an unintended input. Consequently, according to this aspect, the first input region and the second input region is prevented from being set at positions against the intention of the user.

Appendix 9

The recording medium according to another aspect of the present invention is a recording medium as recited in any one of Appendixes 1 to 8, in which the determiner is configured to: determine a position of the first input region such that the first input region is in a position farther in a first direction than the reference position; and determine a position of the second input region such that the second input region is in a position farther in a second direction than the reference position, the second direction being opposite to the first direction.

In general, for example, when the touch position reciprocates between the first input region present at a position farther in the first direction than the reference position and the second input region present at a position farther in the second direction than the reference position in the touch period, there is a high probability that the touch position will deviate from the desired position in the first direction or the second direction. In particular, when the first input region is provided on an opposite side of the second input region viewed from the reference position, there is a high probability that the distance between any position in the first input region and any position in the second input region will be large, in comparison with a case in which the first input region is provided at a position that is not on the opposite side of the second input region viewed from the first input region. That is, when the first input region is provided on an opposite side of the second input region viewed from the reference position, there is a high probability that the amount of gap of the touch position from the desired position in the first input region or the second input region will be large, in comparison with a case in which the first input region is provided at a position that is not on the opposite side of the second input region viewed by the reference position. In contrast, the determiner according to this aspect corrects the positions of the first input region and the second input region on the basis of the following: the first position based on the touch position in the first input region; and the second position based on the touch position in the second input region. That is, when gap of the touch position from the desired position occurs, the determiner according to this aspect can correct the positions of the first input region and the second input region on the basis of the first position and the second position determined in response to the gap. In this aspect, as described above, the first input region is provided on the opposite side of the second input region viewed from the reference position. Accordingly, in comparison with a case in which the first input region is provided at a position that is not on the opposite side of the second input region viewed from the reference position, the probability is high that the first position and the second position will be positions in which the gap of the touch position from the desired position is sharply reflected. Consequently, in this aspect, even when the touch position deviates in the first direction or the second direction, the determiner can correct the positions of the first input region and the second input region in response to the gap of the touch position. Accordingly, in this aspect, for example, in comparison with a case in which the positions of the first input region and the second input region are fixed, the probability of an unintended input due to the gap of the touch position on the touch panel is reduced.

Appendix 10

The recording medium according to another aspect of the present invention is a recording medium as recited in Appendix 9, in which: the determiner is configured to: determine, as the first input region, at least a part of a region having an angle that is from a first reference line extending in the first direction from the reference position and is equal to or less than a first angle; and determine, as the second input region, at least a part of a region having an angle that is from a second reference line extending in the second direction from the reference position and is equal to or less than a second angle.

In this aspect, for example, the determiner determines the first input region as a circular sector region extending in the first direction from the reference position, and determines the second input region as a circular sector region extending in the second direction from the reference position. Consequently, according to this aspect, for example, when the user touches the touch panel with a finger, the user touches the reference position with the finger and inclines it in the first direction to thereby allow the first input region to be touched. Furthermore, the user touches the reference position with the finger and inclines it in the second direction to thereby allow the second input region to be touched. That is, according to this aspect, for example, when the user touches the touch panel with the finger, the user can touch two input regions that are the first input region and the second input region without moving the finger away from the touch panel. Consequently, according to this aspect, for example, in comparison with a case in which the finger is required to be away from the touch panel between touching in the first input region and touching in the second input region, the user can easily switch between an operation for inputting an instruction in the first operation direction and an operation for inputting an instruction in the second operation direction.

In the aspect described above, the "first angle" may be equal to or less than 90 degrees. The "first angle" may be 45 degrees, for example. The "second angle" may be equal to or less than 90 degrees. The "second angle" may be 45 degrees, for example.

Appendix 11

The recording medium according to another aspect of the present invention is a recording medium as recited in any one of Appendixes 1 to 10, in which: the determiner is configured to: determine a position of the first input region such that the first input region is at a position farther in a first direction than a reference position; determine a position of the second input region such that the second input region is at a position farther in the second direction than the reference position; and determine a position of a third input region for receiving an input of an instruction in a third operation direction, the instruction being related to the game to be input therein, based on the first position and the second position identified by the identifier, and the third input region is positioned farther in a third direction than the reference position, the second direction is opposite to the first direction, and the third direction is a direction that intersects with the first direction and intersects with the second direction.

According to this aspect, the determiner determines the positions of the first input region, the second input region and the third input region, on the basis of the first position and the second position. Consequently, according to this aspect, for example, the correct position of the third input region can be determined even if the frequency of touching the third input region is lower than the frequencies of touching the first input region and the second input region, in comparison with a case as follows: The touch position is identified as the third position, when the touch position is in the third input region. The positions of the first input region, the second input region and the third input region are determined on the basis of the positions of the first position, the second position and the third position.

In the aspect described above, the "third direction" may be the direction orthogonal to the first direction and the second direction, for example.

Appendix 12

The recording medium according to another aspect of the present invention is a recording medium as recited in any one of Appendixes 1 to 11, in which: if the identifier identifies the first position and the second position, the determiner is configured to: determine, as the first direction, a direction indicative of the first position from the reference position; determine, as the second direction, a direction indicative of the second position from the reference position; and determine positions of the first input region and the second input region, based on the first direction and the second direction.

In this aspect, the determiner determines the positions of the first input region and the second input region, on the basis of the first direction determined according to the first position and the second direction determined according to the second position. Consequently, in this aspect, even when the touch position in the input region gradually deviates, the determiner can correct the inclination of the input region in the coordinate system fixed to the touch panel, in response to the gap of the touch position. Accordingly, in this aspect, for example, in comparison with a case in which the inclination of the input region in the coordinate system fixed to the touch panel is fixed, the probability of an unintended input due to the gap of the touch position on the touch panel is reduced.

Appendix 13

The recording medium according to another aspect of the present invention is a recording medium as recited in any one of Appendixes 1 to 12, causing the processor to further function as a vibration controller configured to vibrate the touch panel in at least one of: the cases including: a case in which a state in which continuous touching of the touch panel is not carried out is changed to a state in which continuous touching of the touch panel is carried out; a case in which the touch position indicated by the touch position information acquired by the acquirer is changed from a state of being at a position out of the first input region to a state of being in the first input region; and a case in which the touch position indicated by the touch position information acquired by the acquirer is changed from a state of being at a position out of the second input region to a state of being in the second input region.

According to this aspect, for example, when the user touches the touch panel with a finger, the user can intuitively understand, as vibrations of the touch panel, haptically, at least one of the following: change in presence or absence of touching; and change in touch position.

Appendix 14

An information processing apparatus according to an aspect of the present invention includes: an acquirer configured to acquire touch position information indicative of a touch position on a touch panel; an identifier configured to: identify, as a first position, a position based on a touch position indicated by the touch position information acquired by the acquirer, if (a) the touch position is in a first input region for receiving an input of an instruction in a first operation direction, the instruction being related to a game to be input therein in a touch period during which continuous touching of the touch panel is carried out, and (b) the touch position satisfies a first condition related to the touch position, and identify, as a second position, the position based on the touch position indicated by the touch position information acquired by the acquirer, if (c) the touch position is in a second input region for receiving an input of an instruction in a second operation direction, the instruction being related to the game to be input therein in the touch period, and (d) the touch position satisfies a second condition related to the touch position; and a determiner configured to determine positions of the first input region and the second input region, based on the first position and the second position identified by the identifier.

In this aspect, the determiner determines the position of the input region on the basis of the characteristic position. Consequently, in this aspect, even if the touch position in the input region gradually is out of position, the determiner can correct the position of the input region in response to the gap of the touch position. Accordingly, in this aspect, for example, in comparison with a case in which the position of the input region is fixed, the probability of an unintended input due to the gap of the touch position on the touch panel is reduced. According to this aspect, the determiner determines the positions of the first input region and the second input region, using the two characteristic positions. Consequently, according to this aspect, it is possible for any user to favorably maintain the operabilities of the operation for inputting an instruction in the first operation direction and the operation for inputting an instruction in the second operation direction, in comparison with the comparative example.

Appendix 15

A non-transitory computer readable recording medium, according to another aspect of the present invention, having recorded thereon a program, the program causes a processor to function as: an acquirer configured to acquire touch position information indicative of a touch position on a touch panel; an identifier configured to: identify, as a first position, a position based on a touch position indicated by the touch position information acquired by the acquirer, if (i) the touch position is in a first input region for receiving an input of a first instruction, the instruction being related to a game to be input therein, in a touch period during which continuous touching of the touch panel is carried out, and (j) the touch position satisfies a first condition related to the touch position, and identify, as a second position, the position based on the touch position indicated by the touch position information acquired by the acquirer, if (k) the touch position is in a second input region for receiving an input of an second instruction, the instruction being related to the game to be input therein, in the touch period, and (l) the touch position satisfies a second condition related to the touch position; and a determiner configured to determine positions of the first input region and the second input region, based on the first position and the second position identified by the identifier.

In this aspect, the determiner determines the position of the input region on the basis of the characteristic position. Consequently, in this aspect, even if the touch position in the input region gradually is out of position, the determiner can correct the position of the input region in response to the gap of the touch position. Accordingly, in this aspect, for example, in comparison with a case in which the position of the input region is fixed, the probability of an unintended input due to the gap of the touch position on the touch panel is reduced. According to this aspect, the determiner determines the positions of the first input region and the second input region, using the two characteristic positions. Consequently, according to this aspect, it is possible for any user to favorably maintain the operabilities of the operation for inputting the first instruction and the operation for inputting the second instruction, in comparison with the comparative example.

In the aspect described above, the "first instruction" may be an instruction related to a game provided using the touch panel, or may be an instruction related to any service provided using the touch panel, for example. The "second instruction" may be an instruction that is different from the first instruction and is related to the game provided using the touch panel, or may be an instruction that is different from the first instruction and is related to any service provided using the touch panel, for example.

Appendix 16

A non-transitory computer readable recording medium, according to another aspect of the present invention, having recorded thereon a program, the program causes a processor to function as: an acquirer configured to acquire touch position information indicative of a touch position on a touch panel; an identifier configured to: identify, as a first position, a position based on a touch position indicated by the touch position information acquired by the acquirer, if the touch position is in a first input region for receiving an input of an instruction in a first operation direction, the instruction being related to a game to be input therein, in a touch period during which continuous touching of the touch panel is carried out, and identify, as a second position, the position based on the touch position indicated by the touch position information acquired by the acquirer, if the touch position is in a second input region for receiving an input of an instruction in a second operation direction, the instruction being related to the game to be input therein, in the touch period, and a determiner configured to determine positions of the first input region and the second input region, based on the first position and the second position identified by the identifier.

In this aspect, the determiner determines the position of the input region on the basis of the characteristic position. Consequently, in this aspect, even if the touch position in the input region gradually deviates, the determiner can correct the position of the input region in response to the gap of the touch position. Accordingly, in this aspect, for example, in comparison with a case in which the position of the input region is fixed, the probability of an unintended input due to the gap of the touch position on the touch panel is reduced. According to this aspect, the determiner determines the positions of the first input region and the second input region, using the two characteristic positions. Consequently, according to this aspect, the operabilities of the operation for inputting an instruction in the first operation direction and the operation for inputting an instruction in the second operation direction can be favorably maintained for any user, in comparison with the comparative example.

Appendix 17

A non-transitory computer readable recording medium (e.g., a memory 1001), according to an aspect of the present invention, having recorded thereon a program, the program causes a processor (e.g., a processor 1000) of an information processing apparatus (e.g., a terminal apparatus 10B) to function as: an acquirer (e.g., a touch position information acquirer 113) configured to acquire touch position information indicative of a touch position on a touch panel (e.g., a touch panel 1002); a characteristic position determiner (e.g., a characteristic position determiner 114B) configured to: determine a first characteristic position (e.g., a characteristic position CPr), based on a touch position indicated by the touch position information acquired by the acquirer, if the touch position is in a first region (e.g., an input region RDr) for receiving an input of an instruction in a first operation direction (e.g., +Xs direction), the instruction being related to a game to be input therein, in a touch period during which continuous touching of the touch panel is carried out and determine a second characteristic position (e.g., a characteristic position CPl), based on the touch position, if the touch position is in a second region (e.g., an input region RDl) for receiving an input of an instruction in a second operation direction (e.g., −Xs direction), the instruction being related to the game to be input therein; and an arrangement determiner (e.g., an operation region determiner 115B) configured to determine, based on the first characteristic position and the second characteristic position determined by the characteristic position determiner, a position of a third region (e.g., a neutral region RN), the third region being arranged between the first region and the second region, and being for not receiving an instruction for an operation direction related to the game.

In this aspect, the characteristic position determiner determines the position of the third region, the third region being arranged between the first region and the second region, and being for not receiving the instruction in the operation direction related to the game, on the basis of the following: the first characteristic position, which is a position based on the touch position in the first region; and the second characteristic position, which is a position based on the touch position in the second region (hereinafter, the first characteristic position and the second characteristic position are collectively referred to as "characteristic position" in some cases). Consequently, in this aspect, even if the touch position in the first region or the second region gradually is out of position, the characteristic position determiner can correct the position of the third region in response to the gap of the touch position. Accordingly, in this aspect, for example, in comparison with a case in which the position of the third region is fixed, the probability of an unintended input due to the gap of the touch position on the touch panel is reduced.

There can be considered an aspect of determining the position of the third region on the basis of one characteristic position (hereinafter, this aspect called "comparative example"). Specifically, in the comparative example, for instance, the first representative position, such as the center position or the centroid of the first region, which is a position representing the first region is determined at a position corresponding to one characteristic position. In addition, the second representative position, such as the center position or the centroid of the second region, which is a position representing the second region is determined at a position corresponding to the first representative position (hereinafter, the first representative position and the second representative position are collectively referred to as "representative position" in some cases). For instance, in the comparative example, the one characteristic position is determined as the first representative position. A position having a predetermined positional relationship with the first representative position is determined as the second representative position. A position between the first representative position and the second representative position is determined at the center position of the third region. That is, in the comparative example, there cannot be adjusted (i) the relative positional relationships between the characteristic positions and the representative positions of the first region and the second region, or (ii) the intervals between the characteristic positions and the representative positions of the first region and the second region. In other words, the comparative example is only what determines the positions of the first region, the second region and the third region, under either of the following constraints (iii) and (iv):

(iii) A constraint in which the relative positional relationships between the characteristic positions and the representative positions of the first region and the second region are maintained to be predetermined positional relationships, and (iv) A constraint in which the intervals between the characteristic positions and the representative positions of the first region and the second region are maintained to be predetermined intervals.

In contrast, for example, when the user touches the touch panel with a finger, the size and shape of the finger of the user are different for each user. For example, when the user touches the touch panel with a finger, the pressure when the user touches the touch panel with the finger, the inclination of the finger from the touch panel, the way of moving the finger and the like are different for each user. As described above, when the user touches the touch panel with the finger, the way of touching is different for each user. Accordingly, when the user touches the touch panel with the finger, there are differences for each user in that (ii-a) the relative positional relationships between the characteristic positions and the representative positions of the first region and the second region, and (ii-b) the intervals between the characteristic positions and the representative positions of the first region and the second region. Consequently, for the sake of favorably maintaining the operabilities of the operation for inputting an instruction in the first operation direction and the operation for inputting an instruction in the second operation direction, for any user, it is preferable to adjust the above (ii-a) the relative positional relationships between the characteristic positions and the representative positions of the first region and the second region, and the above (ii-a) the intervals between the characteristic positions and the representative positions of the first region and the second region in conformity with the way of touching for each user.

However, in the comparative example, as described above, it is difficult to adjust any of the above (ii-a) the relative positional relationship between the characteristic positions and the representative positions of the first region and the second region, and the above (ii-b) the intervals between the characteristic positions and the representative positions of the first region and the second region. Accordingly, in the comparative example, for any user, it is difficult to favorably maintain the operabilities of the operation for inputting an instruction in the first operation direction, the operation for inputting an instruction in the second operation direction, and a case of inputting no instruction in any operation direction.

In contrast, according to this aspect, the characteristic position determiner determines the position of the third region arranged between the first region and the second region, using the first characteristic position and the second characteristic position. Typically, there is a high probability that (i) the relative positional relationship between the first characteristic position and the second characteristic position, and (ii) the interval between the first characteristic position and the second characteristic position is determined in conformity with the way of touching of each user. Consequently, according to this aspect, it is possible for any user to favorably maintain the operabilities of following: the operation for inputting an instruction in the first operation direction; the operation for inputting an instruction in the second operation direction; and a case of inputting no instruction in any operation direction, in comparison with the comparative example.

In the aspect described above, "the first operation direction related to the game" is an example of "the operation direction related to the game". "The operation direction related to the game" may be a direction in a virtual space related to the game, or a direction on a screen related to the game, for example. The "direction in the virtual space related to the game" refers to a direction of change in one or both of the position and orientation of the game element in the virtual space related to the game, for example. Here, "game element" may be a virtual object that is present in the virtual space related to the game, or may be a virtual camera that takes images of the virtual space related to the game, for example. Among them, the "virtual object that is present in the virtual space related to the game" may be a concept that includes a character related to the game and an object related to the game. The "direction on the screen related to the game" may be a direction of change in one or both of the position and orientation of an image, the image being indicative of a virtual object displayed on the screen related to the game. Alternatively the "direction on the screen related to the game" may be a direction of movement of an image on a menu screen related to the game, the image being indicative of a game element that is a pointer or the like displayed on the menu screen and is unrelated to the progress of the game.

In the above aspect, "the second operation direction related to the game" is another example of "the operation direction related to the game". Here, "the second operation direction" is a direction different from the first operation direction. "The second operation direction" may be the direction opposite to the first operation direction, for example.

In the aspect described above, the "first region" may be a region provided on the touch panel in a viewable way to receive an input of an instruction that is in the first operation direction and is related to the game. Alternatively, the "first region" may be a virtual region provided on the touch panel in an invisible way to receive an input of an instruction that is in the first operation direction and is related to the game, for example. The "second region" may be a region that is different from the first region and is provided on the touch panel in a viewable way to receive an input of an instruction in the second operation direction, where the second operation direction is related to the game to be input therein. Alternatively, the "second region" may be a virtual region that is different from the first region and is provided on the touch panel in an invisible way to receive an input of an instruction in the second operation direction, where the instruction is related to the game to be input therein, for example. The "third region" may be a region for not receiving an instruction in an operation direction related to the game and is a region provided between the first region and the second region in a viewable way on the touch panel. Alternatively, the "third region" may be a region provided between the first region and the second region in an invisible way on the touch panel, for example. In a case of focusing on the process related to the game, "a state in which the third region is touched with the finger" is a state similar to "a state in which the finger is off from the touch panel". The state of "the third region arranged between the first region and the second region" refer to a state in which the first region, the second region and the third region are arranged so as to have a positional relationship allowing a line having endpoints in the first region and the second region and passing through the third region to be drawn.

In the aspect described above, "determining a first characteristic position, based on a touch position" may refer to the following case. For example, there is a case in which the first region is at a position farther in the first direction than the second region. In this case, a position based on the touch position farthest away in the first direction may be determined as the first characteristic position, from the second region in a period during which the touch position indicated by the touch position information is in the first region. Here, the "position based on the touch position" may be a position identical to the touch position, or may be a position having a predetermined distance or less from the touch position, for example. Furthermore, "determining a first characteristic position, based on a touch position" may refer to the following case. For example, there is a case in which the touch position indicated by the touch position information is not the touch position farthest away in the first direction from the second region in a period during which the touch position is in the first region. In this case, maintaining the current first characteristic position may be determined. Alternatively, "determining a first characteristic position, based on a touch position" may refer to the following case. For example, there is a case in which the touch position indicated by the touch position information is at the substantially identical position for at least the predetermined time period in the first region. In this case, a position based on the touch position at a substantially identical position for at least a predetermined time period may be determined, as the first characteristic position. Here, the fact that a certain position and another position are at "substantially identical position" may mean that the certain position and the other position may be the same position, or may be the certain position and another position have a positional relationship with a predetermined distance or less, for example. Furthermore, "determining a first characteristic position, based on a touch position" may refer to the following case. For example, there is a case in which a time period during which the touch position indicated by the touch position information remains at a substantially identical position in the first region is less than a predetermined time period. In this case, maintaining the current first characteristic position may be determined. "Determining a second characteristic position, based on the touch position" may refer to the following case.

For example, there is a case in which the second region is present farther in the second direction than the first region. In this case, the position based on the touch position farthest away in the second direction from the first region may be determined as the second characteristic position, in a period during which the touch position indicated by the touch position information is in the second region. Furthermore, "determining a second characteristic position, based on the touch position" may refer to the following case. For example, there is a case in which the touch position indicated by the touch position information is at the substantially identical position in the second region for at least the predetermined time period. In this case, a position based on the touch position at a substantially identical position for at least a predetermined time period may be determined as the second characteristic position. Furthermore, similar to a case of "determining a first characteristic position, based on a touch position", "determining a second characteristic position, based on the touch position" may be a determination of maintaining the current second characteristic position.

Appendix 18

The recording medium according to another aspect of the present invention is a recording medium as recited in Appendix 17, in which the arrangement determiner is configured to determine a size of the third region, based on at least one of the first characteristic position and the second characteristic position.

In this aspect, the arrangement determiner determines the size of the third region, based on at least one of the first characteristic position and the second characteristic position. For example, the arrangement determiner determines the size of the third region so as to maintain the distance between the characteristic position and the third region to be a predetermined distance. Accordingly, when the user moves a finger from the third region to any of the first region and the second region, the user can return the touch position to the third region by returning the finger by a constant amount corresponding to a predetermined distance. Consequently, according to this aspect, the operability can be improved in comparison with a case in which the size of the third region is fixed.

In the aspect described above, "determining the size of the third region, based on at least one of the first characteristic position and the second characteristic position" may be to determine the size of the third region so as to maintain the distance between the following (i) and (ii) to be constant or substantially constant: (i) the characteristic position updated by ongoing touching, among the first characteristic position and the second characteristic position, and (ii) the third region, for example. The size of the third region may be determined by adjusting the distance with the updated characteristic position, according to the size of the movement amount of the updated characteristic position in the first direction (second direction). Here, "the distance between the updated characteristic position and the third region" may be, for example, the distance from the first characteristic position (or the second characteristic position) to the boundary line (edge) of the third region, where the distance is on a line connecting the updated first characteristic position (or the second characteristic position) and the center of the third region. To be exact, the boundary line of the third region is the boundary line between the third region and the first region (the second region in a case in which the second characteristic position is an endpoint). If a line extending in the first direction (second direction) from the center of the third region is assumed as a first axis, "the distance between the updated characteristic position and the third region" may be a distance represented by the difference between the coordinate of the first characteristic position (or the second characteristic position) on the first axis and the intersection of the boundary line of the third region with the first axis.

Appendix 19

The recording medium according to another aspect of the present invention is a recording medium as recited in Appendix 17, the arrangement determiner is configured to determine a size of the third region, based on a distance between the first characteristic position and the second characteristic position.

In this aspect, for example, the arrangement determiner determines the size of the third region so as to maintain the ratio of the size of the third region (e.g., the width or the like of the third region) to the distance between the first characteristic position and the second characteristic position. In this aspect, the size of the third region is determined based on the distance between the first characteristic position and the second characteristic position. Accordingly, the third region can be prevented from having a size reducing the operability. Consequently, according to this aspect, the operability can be improved in comparison with a case in which the size of the third region is fixed.

In the aspect described above, "determining the size of the third region, based on the distance between the first characteristic position and the second characteristic position" may be, for example, to determine the size of the third region so as to maintain the ratio of (i) the distance (DCP) between the first characteristic position and the second characteristic position, to (ii) the diameter (2·r) of the third region (DCP/(2·r)=constant). The diameter (2·r) of the third region may be determined from the distance (DCP) between the first characteristic position and the second characteristic position so as to maintain the distance with the updated characteristic position to be a predetermined value (DIS) (2·r=DCP−2·DIS).

Appendix 20

The recording medium according to another aspect of the present invention is a recording medium as recited in Appendix 18 or 19, in which if the size of the third region exceeds a predetermined upper limit value, the third region being calculated based on at least one of the first characteristic position and the second characteristic position, the arrangement determiner is configured to determine the upper limit value as the size of the third region as the upper limit value.

In this aspect, when the size of the third region calculated on the basis of at least one of the first characteristic position and the second characteristic position exceeds a predetermined upper limit value, the arrangement determiner determines the size of the third region to be the upper limit value. Accordingly, the third region can be prevented from having a size reducing operability. Consequently, according to this aspect, the operability can be improved in comparison with a case in which the upper limit value of the size of the third region is not determined.

In the aspect described above, "the size of the third region calculated based on at least one of the first characteristic position and the second characteristic position" includes "the size of the third region calculated based on the distance between the first characteristic position and the second characteristic position".

Appendix 21

The recording medium according to another aspect of the present invention is a recording medium as recited in any one of Appendixes 17 to 20, in which a lower limit value is determined for the size of the third region in advance.

According to this aspect, a lower limit value is determined for the size of the third region in advance. Consequently, the third region can be prevented from having a size of reducing the operability. Therefore, in this aspect, the operability can be improved in comparison with a case in which the lower limit value of the size of the third region is not determined.

Appendix 22

The recording medium according to another aspect of the present invention is a recording medium as recited in any one of Appendixes 17 to 21, in which the arrangement determiner is configured to determine a distance between: one of the first characteristic position and the second characteristic position; and the third region, based on a distance between the first characteristic position and the second characteristic position.

In general, when the distance between the first characteristic position and the second characteristic position increases, a finger is assumed to have been moved by a large amount. When the finger is moved by a large amount, the finger slightly returns to the third region in some cases. In this case, when the distance between the characteristic position and the third region is small, the touch position that is to be in any of the first region and the second region moves to the third region, and this may cause an unintended operation input. In this aspect, as the distance between the first characteristic position and the second characteristic position increases, the distance between the characteristic position and the third region is increased, which can prevent the touch position that is to be in any of the first region and the second region from moving to the third region. As a result, probability of causing an unintended operation input is reduced.

In this aspect, as the distance between the first characteristic position and the second characteristic position increases, the distance between the characteristic position and the third region is increased, which can prevent the third region from being excessively increased in size. Consequently, in this aspect, the operability is improved in comparison with a case in which the distance between the characteristic position and the third region is fixed.

In the aspect described above, "the distance between one of the first characteristic position and the second characteristic position, and the third region" is the distance from the first characteristic position (or the second characteristic position) to the boundary line (edge) of the third region, where the distance is on a line connecting the first characteristic position (or the second characteristic position) and the center of the third region, for example. Alternatively, if a line extending in the first direction (or the second direction) from the center of the third region is assumed as a first axis, "the distance between one of the first characteristic position and the second characteristic position, and the third region" may be a distance represented by the difference between the coordinate of the first characteristic position (or the second characteristic position) on the first axis and the intersection of the boundary line of the third region with the first axis.

Appendix 23

The recording medium according to another aspect of the present invention is a recording medium as recited in any one of Appendixes 17 to 22, in which the arrangement determiner is configured to determine a position of the third region, based on a distance between the first characteristic position and the second characteristic position.

In this aspect, for example, the characteristic position determiner determines the position of the third region such that the position based on the distance between the first characteristic position and the second characteristic position (e.g., the midpoint between the first characteristic position and the second characteristic position) is the center of the third region. When the position of the third region is adjusted, only one of the first characteristic position and the second characteristic position is moved. Accordingly, there is no problem if the midpoint between the first characteristic position and the second characteristic position is regarded as "a position based on the distance between the first characteristic position and the second characteristic position". Consequently, in this aspect, even if the touch position in the first region or the second region gradually deviates, the characteristic position determiner can correct the position of the third region in response to the gap of the touch position. Accordingly, in this aspect, for example, in comparison with a case in which the position of the third region is fixed, the probability of an unintended input due to the gap of the touch position on the touch panel can be reduced.

Appendix 24

The recording medium according to another aspect of the present invention is a recording medium as recited in any one of Appendixes 17 to 23, in which if the touch position is in a first direction-region (e.g., a first direction-region RR) including the first region, the arrangement determiner is configured to determine the first characteristic position, based on the touch position, and if the touch position is in a second direction-region (e.g., a second direction-region RL) including the second region, the arrangement determiner is configured to determine the second characteristic position, based on the touch position.

In this aspect, the characteristic position determiner determines the positions of the first region and the second region using two characteristic positions that are the first characteristic position and the second characteristic position. Consequently, in this aspect, even if the touch position in the first region or the second region gradually deviates, the characteristic position determiner can correct the positions of the first region, the second region and the third region, in response to the gap of the touch position. According to this aspect, the characteristic position determiner determines the positions of the first region and the second region using the two characteristic positions. Consequently, it is possible for any user to favorably maintain the operabilities of the operation for inputting an instruction in the first operation direction, the operation for inputting an instruction in the second operation direction, and a case of inputting no instruction in any operation direction, in comparison with the comparative example. According to this aspect, the position based on the touch position in the first direction-region including the first region is identified as the first characteristic position, and the position based on the touch position in the second direction-region including the second region is identified as the second characteristic position. That is, according to this aspect, even if the touch position goes to the outside of the first region and the second region, the positions of the first region, the second region and the third region can be corrected using the characteristic position based on the touch position. Consequently, according to this aspect, for example, the first region, the second region and the third region can be set so as to flexibly support various touch modes, in comparison with a case of correcting the positions of the first region, the second region and the third region only when the touch position is in any of the first region and the second region.

In the aspect described above, the "first direction-region" may be a region identical to the first region, or may be a region that is wider than the first region and includes the first region, for example. The "second direction-region" may be a region that does not include the first direction-region and is a region identical to the second region, or may be a region that does not include the first direction-region, and is a region that is wider than the second region and includes the second region, for example.

Appendix 25

The recording medium according to another aspect of the present invention is a recording medium as recited in any one of Appendixes 17 to 24, in which the arrangement determiner is configured to: determine a position of the first region such that the first region is at a position farther in the first direction than the third region; and determine a position of the second region such that the second region is at a position farther in a second direction than the third region, the second direction being opposite to the first direction.

In general, for example, when the touch position moves back and forth between the first region set at a position farther in the first direction than the third region, and the second region set at a position farther in the second direction than the third region in the touch period, there is a high probability that the touch position will deviate in the first direction or the second direction from a desired position. In particular, in a case in which the first region is provided on the opposite side of the second region viewed by the center of the third region, there is a high probability that the distance between any position in the first region and any position in the second region will be greater, in comparison with a case in which the first region is provided at a position that is not on the opposite side of the second region viewed from the center of the third region. That is, when the first region is provided on an opposite side of the second region viewed from the center of the third region, there is a high probability that the amount of gap of the touch position from the desired position in the first region or the second region will be large, in comparison with a case in which the first region is provided at a position that is not on the opposite side of the second region viewed by the center of the third region. In contrast, the arrangement determiner according to this aspect corrects the positions of the first region, the second region and the third region, on the basis of the first characteristic position based on the touch position in the first region, and the second characteristic position based on the touch position in the second region. That is, when the touch position is out of a desired position, the arrangement determiner according to this aspect can correct the positions of the first region, the second region and the third region, on the basis of the first characteristic position and the second characteristic position that are determined in response to the gap. In this aspect, as described above, the first region is provided on the opposite side of the second region viewed by the center of the third region. Accordingly, in comparison with a case in which the first region is provided at a position that is not on the opposite side of the second region viewed by the center of the third region, the probability that the first characteristic position and the second characteristic position are positions in which the gap of the touch position from the desired position is sharply reflected is high. Consequently, in this aspect, even if the touch position deviates in the first direction or the second direction, the arrangement determiner can correct the positions of the first region, the second region and the third region in response to the gap of the touch position. Accordingly, in this aspect, for example, in comparison with a case in which the positions of the first region, the second region and the third region are fixed, and the probability of an unintended input due to the gap of the touch position on the touch panel is reduced.

Appendix 26

An information processing apparatus according to an aspect of the present invention includes: an acquirer configured to acquire touch position information indicative of a touch position on a touch panel; a characteristic position determiner configured to: determine a first characteristic position, based on a touch position indicated by the touch position information acquired by the acquirer, if the touch position is in a first region for receiving an input of an instruction in a first operation direction, the instruction being related to a game to be input therein, in a touch period during which continuous touching of the touch panel is carried out; and determine a second characteristic position, based on the touch position, if the touch position is in a second region for receiving an input of an instruction in a second operation direction, the instruction being related to the game to be input therein, and an arrangement determiner configured to determine, based on the first characteristic position and the second characteristic position identified by the characteristic position determiner, a position of a third region, the third region being arranged between the first region and the second region, and being for not receiving an instruction for an operation direction related to the game.

In this aspect, the arrangement determiner determines the position of is the third region arranged between the first region and the second region, on the basis of the characteristic position. Consequently, in this aspect, even if the touch position in the first region or the second region gradually is out of position, the arrangement determiner can correct the positions of the first region, the second region and the third region, in response to the gap of the touch position. Accordingly, in this aspect, for example, in comparison with a case in which the position of the third region is fixed, the probability of an unintended input due to the gap of the touch position on the touch panel is reduced. According to this aspect, the arrangement determiner determines the position of the third region arranged between the first region and the second region, using the two characteristic positions. Consequently, according to this aspect, it is possible for any user to favorably maintain the operabilities of the operation for inputting an instruction in the first operation direction, the operation for inputting an instruction in the second operation direction, and a case of inputting no instruction in any operation direction, in comparison with the comparative example.

Appendix 27

A non-transitory computer readable recording medium, according to another aspect of the present invention, having recorded thereon a program, the program causes a processor to function as: an acquirer configured to acquire touch position information indicative of a touch position on a touch panel; a characteristic position determiner configured to: determine a first characteristic position, based on a touch position indicated by the touch position information acquired by the acquirer, if the touch position is in a first region for receiving an input of a first instruction, in a touch period during which continuous touching of the touch panel is carried out; and determine a second characteristic position, based on the touch position, if the touch position is in a second region for receiving an input of a second instruction; and an arrangement determiner configured to determine, based on the first characteristic position and the second characteristic position determined by the characteristic position determiner, a position of a third region, the third region being for not receiving the first instruction and the second instruction.

In this aspect, the arrangement determiner determines the position of the third region arranged between the first region and the second region, on the basis of the characteristic position. Consequently, in this aspect, even if the touch position in the first region or the second region is gradually out of position, the arrangement determiner can correct the positions of the first region, the second region and the third region, in response to the gap of the touch position. Accordingly, in this aspect, for example, in comparison with a case in which the position of the third region is fixed, the probability of an unintended input due to the gap of the touch position on the touch panel is reduced. According to this aspect, the arrangement determiner determines the position of the third region arranged between the first region and the second region, using the two characteristic positions. Consequently, according to this aspect, it is possible for any user to favorably maintain the operabilities of the operation for inputting an instruction in the first operation direction, the operation for inputting an instruction in the second operation direction, and a case of inputting no instruction in any operation direction, in comparison with the comparative example.

In the aspect described above, the "first instruction" may be, for example, an instruction related to a game provided using the touch panel, or an instruction related to any service provided using the touch panel. The "second instruction" may be an instruction that is different from the first instruction and is related to the game provided using the touch panel, or may be an instruction that is different from the first instruction and is related to any service provided using the touch panel, for example.

DESCRIPTION OF REFERENCE SIGNS 10, 10A, 10B . . . Terminal apparatus, 11, 11B . . . Controller, 12 . . . Display, 13 . . . Inputter, 14 . . . Storage, 15 . . . Vibration generator, 16 . . . Communicator, 30A . . . Server apparatus, 31 . . . Storage, 32 . . . Communicator, 111 . . . Game controller, 112 . . . Display controller, 113 . . . Touch position information acquirer, 114, 114B . . . Characteristic position determiner, 115, 115B . . . Operation region determiner, 116 . . . Vibration controller, 1000 . . . Processor, 1002 . . . Touch panel.

What is claimed is:

1. A non-transitory computer readable recording medium having recorded thereon a program that is executed by a processor, the program causing the processor to at least:
   acquire touch position information indicative of a touch position on a touch panel;
   identify a first position based on the touch position information when, during a touch period in which continuous touching of the touch panel is carried out during a game, a touch position is in a first input region of the touch panel in a first operation direction, and when the touch position satisfies a first condition related to the touch position;
   identify a second position based on the touch position information when, during the touch period, a touch position is in a second input region of the touch panel in a second operation direction, and when the touch position satisfies a second condition related to the touch position; and
   determine updated positions of the first input region and the second input region, based on the first position and the second position,
   wherein the first input region is a region of the touch panel for receiving a touch input in the first operation direction from a reference position on the touch screen, and the second input region is a region of the touch panel that is different from the first region and is for receiving a touch input in the second operation direction from the reference position on the touch screen.

2. The recording medium according to claim 1, wherein:
   when the touch position is in a first region including the first input region and the touch position satisfies the first condition during the touch period, the program causes the processor to identify a position based on the touch position as the first position, and
   when the touch position is in a second region including the second input region and the touch position satisfies the second condition during the touch period, the program causes the processor to identify a position based on the touch position as the second position.

3. The recording medium according to claim 1, wherein:
   based on the touch position changing from a state of being at a position outside of the first input region to a state of being inside the first input region during the touch period, the program causes the processor to identify a position based on the changed touch position as the first position, and
   based on the touch position changing from a state of being at a position outside of the second input region to a state of being inside the second input region during the touch period, the program causes the processor to identify a position based on the changed touch position as the second position.

4. The recording medium according to claim 1, wherein:
   based on the touch position being farthest in a first direction from a reference position and being within the first input region during a first touch period that is included in the touch period, the program causes the processor to identify a farthest position in the first direction as the first position, and
   based on the touch position being farthest in a second direction from the reference position and being within the second input region in a second touch period that is included in the touch period the program causes the processor to identify a farthest position in the second direction as the second position.

5. The recording medium according to claim 4, wherein:
the program causes the processor to:
determine a position between the first position and the second position, as the reference position;
determine the updated position of the first input region such that the first input region is at a position farther in the first direction than the reference position; and
determine the updated position of the second input region such that the second input region is at a position farther in the second direction than the reference position.

6. The recording medium according to claim 4,
wherein based on a state in which touching of the touch panel is not carried out is changed to a state in which touching of the touch panel is carried out, the program causes the processor to determine, as the reference position, a position based on the touch position indicated by the touch position information after the change to the state in which touching of the touch panel is carried out.

7. The recording medium according to claim 1, wherein:
based on the touch position being in the first input region and being at a position farther in a first direction than a first referring position in a first touch period which is included in the touch period, the program causes the processor to identify the position farther in the first direction as the first position, the first referring position being defined based on a history of the touch position during the first touch period, and
based on the touch position being in the second input region and being at a position farther in a second direction than a second referring position in a second touch period which is included in the touch period, the program causes the processor to identify the position farther in the second direction as the second position, the second referring position being defined based on a history of the touch position during the second touch period.

8. The recording medium according to claim 1, wherein:
when the touch position is at a substantially identical position in the first input region for at least a threshold time period during the touch period, the program causes the processor to identify the substantially identical position as the first position, and
when the touch position is at a substantially identical position in the second input region for at least the threshold time period during the touch period, the program causes the processor to identify the substantially identical position as the second position.

9. The recording medium according to claim 1, wherein:
the program causes the processor to:
determine the updated position of the first input region such that the first input region is in a position farther in a first direction than a reference position; and
determine the updated position of the second input region such that the second input region is in a position farther in a second direction than the reference position, the second direction being opposite to the first direction.

10. The recording medium according to claim 9, wherein:
the program causes the processor to:
determine, as the first input region, at least a part of a region having an angle that is from a first reference line extending in the first direction from the reference position and is equal to or less than a first angle; and
determine, as the second input region, at least a part of a region having an angle that is from a second reference line extending in the second direction from the reference position and is equal to or less than a second angle.

11. The recording medium according to claim 1, wherein:
the program causes the processor to:
determine the updated position of the first input region such that the first input region is at a position farther in a first direction than a reference position;
determine the updated position of the second input region such that the second input region is at a position farther in the second direction than the reference position; and
determine a position of a third input region for receiving an input of an instruction in a third operation direction,
wherein the position of the third input region is based on the first position and the second position,
the third input region is positioned farther in a third direction than the reference position,
the second direction is opposite to the first direction, and
the third direction is a direction that intersects with the first direction and intersects with the second direction.

12. The recording medium according to claim 1, wherein:
when the first position and the second position are identified, the program causes the processor to:
determine, as a first direction, a direction from the reference position to the first position;
determine, as a second direction, a direction from the reference position to the second position; and
determine the updated positions of the first input region and the second input region, based on the first direction and the second direction.

13. The recording medium according to claim 1, whether the program causes the processor to vibrate the touch panel in at least one of:
when a state in which continuous touching of the touch panel is not carried out is changed to a state in which continuous touching of the touch panel is carried out;
when the touch position is changed from a state of being at a position outside of the first input region to a state of being inside the first input region; and
when the touch position is changed from a state of being at a position outside of the second input region to a state of being inside the second input region.

14. An information processing apparatus comprising:
a memory storing instructions and;
a processor that implements the instructions to at least:
acquire touch position information indicative of a touch position on a touch panel;
identify a first position based on the touch position information when, during a touch period in which continuous touching of the touch panel is carried out during a game, a touch position is in a first input region of the touch panel in a first operation direction, and when the touch position satisfies a first condition related to the touch position;
identify a second position based on the touch position information when, during the touch period, a touch position is in a second input region of the touch panel in a second operation direction, and when the touch position satisfies a second condition related to the touch position; and
determine updated positions of the first input region and the second input region, based on the first position and the second position,
wherein the first input region is a region of the touch panel for receiving a touch input in the first operation direction from a reference position on the touch screen, and the second input region is a region of the touch panel that is different from the first region and is for receiving a touch input in the second operation direction from the reference position on the touch screen.

15. A non-transitory computer readable recording medium having recorded thereon a program that is executed by a processor, the program causing the processor to at least:
  acquire touch position information indicative of a touch position on a touch panel;
  determine a first characteristic position based on the touch position information when, during a touch period during which continuous touching of the touch panel is carried out, a touch position indicated by the touch position information is in a first region for receiving an input of an instruction in a first operation direction, the instruction being related to a game;
  determine a second characteristic position based on the touch position information when, during the touch period during which continuous touching of the touch panel is carried out, a touch position indicated by the touch position information is in a second region for receiving an input of an instruction in a second operation direction, the instruction being related to the game; and
  determine, based on the first characteristic position and the second characteristic position, a position of a third region, the third region being arranged between the first region and the second region, and being for not receiving an instruction for an operation direction related to the game.

16. The recording medium according to claim 15,
  wherein the program causes the processor to determine a size of the third region, based on at least one of the first characteristic position and the second characteristic position.

17. The recording medium according to claim 16,
  wherein when the size of the third region exceeds an upper limit value,
    the program causes the processor to determine the upper limit value as the size of the third region.

18. The recording medium according to claim 16,
  wherein a lower limit value is determined in advance for the size of the third region.

19. The recording medium according to claim 15,
  wherein the program causes the processor to determine a size of the third region, based on a distance between the first characteristic position and the second characteristic position.

20. The recording medium according to claim 15,
  wherein the program causes the processor to determine a distance between:
  one of the first characteristic position and the second characteristic position; and
  the third region,
  based on a distance between the first characteristic position and the second characteristic position.

21. The recording medium according to claim 15,
  wherein the program causes the processor to determine a position of the third region, based on a distance between the first characteristic position and the second characteristic position.

22. The recording medium according to claim 15, wherein:
  when the touch position is in a first direction-region including the first region, the program causes the processor to determine the first characteristic position, based on the touch position, and
  when the touch position is in a second direction-region including the second region, the program causes the processor to determine the second characteristic position, based on the touch position.

23. The recording medium according to claim 15,
  wherein the program causes the processor to:
  determine an updated position of the first region such that the first region is at a position farther in the first direction than the third region; and
  determine an updated position of the second region such that the second region is at a position farther in a second direction than the third region, the second direction being opposite to the first direction.

24. An information processing apparatus comprising:
  a memory storing instructions and;
  a processor that implements the instructions to at least:
  acquire touch position information indicative of a touch position on a touch panel;
  determine a first characteristic position based on the touch position information when, during a touch period during which continuous touching of the touch panel is carried out, a touch position indicated by the touch position information is in a first region for receiving an input of an instruction in a first operation direction, the instruction being related to a game;
  determine a second characteristic position based on the touch position information when, during the touch period during which continuous touching of the touch panel is carried out, a touch position indicated by the touch position information is in a second region for receiving an input of an instruction in a second operation direction, the instruction being related to the game; and
  determine, based on the first characteristic position and the second characteristic position, a position of a third region, the third region being arranged between the first region and the second region, and being for not receiving an instruction for an operation direction related to the game.

* * * * *